(12) United States Patent
O'Connor et al.

(10) Patent No.: US 11,103,878 B2
(45) Date of Patent: Aug. 31, 2021

(54) ELECTROCHEMICAL SEPARATION AND RECOVERY OF METALS

(71) Applicant: YALE UNIVERSITY, New Haven, CT (US)

(72) Inventors: Megan O'Connor, Guilford, CT (US); Desiree Plata, Guilford, CT (US)

(73) Assignee: Yale University, New Haven, CT (US)

( * ) Notice: Subject to any disclaimer, the term of this patent is extended or adjusted under 35 U.S.C. 154(b) by 148 days.

(21) Appl. No.: 15/941,679

(22) Filed: Mar. 30, 2018

(65) Prior Publication Data

US 2018/0318843 A1 Nov. 8, 2018

Related U.S. Application Data

(60) Provisional application No. 62/636,719, filed on Feb. 28, 2018, provisional application No. 62/480,930, filed on Apr. 3, 2017.

(51) Int. Cl.
| | |
|---|---|
| *B03B 5/00* | (2006.01) |
| *C02F 1/44* | (2006.01) |
| *C02F 1/463* | (2006.01) |
| *B01J 20/28* | (2006.01) |
| *B01J 20/20* | (2006.01) |
| *B82Y 30/00* | (2011.01) |
| *C02F 101/20* | (2006.01) |
| *C01B 32/172* | (2017.01) |
| *C02F 1/28* | (2006.01) |

(52) U.S. Cl.
CPC .............. *B03B 5/00* (2013.01); *B01J 20/205* (2013.01); *B01J 20/28026* (2013.01); *C01B 32/172* (2017.08); *C02F 1/283* (2013.01); *C02F 1/44* (2013.01); *C02F 1/463* (2013.01); *B82Y 30/00* (2013.01); *C02F 2101/20* (2013.01); *C02F 2305/08* (2013.01)

(58) Field of Classification Search
None
See application file for complete search history.

(56) References Cited

U.S. PATENT DOCUMENTS

| | | | | |
|---|---|---|---|---|
| 2,334,790 | A | | 11/1943 | Roffy |
| 3,832,443 | A | * | 8/1974 | Hass ............... B01D 53/945 423/213.7 |
| 4,226,695 | A | * | 10/1980 | Matson ............ C02F 1/46104 204/230.1 |
| 5,043,048 | A | | 8/1991 | Muralidhara |

(Continued)

FOREIGN PATENT DOCUMENTS

| | | |
|---|---|---|
| WO | 2010126686 | 11/2010 |
| WO | WO-2016110597 A1 * 7/2016 | ............... C25B 1/30 |

OTHER PUBLICATIONS

Sadia A. Jame & Zhi Zhou, Electrochemical carbon nanotube filters for water and wastewater treatment, 5 Nanotechnol Rev., 41, 41-50 (2016). (Year: 2016).*

(Continued)

*Primary Examiner* — Krishnan S Menon
*Assistant Examiner* — Brad Gordon
(74) *Attorney, Agent, or Firm* — Riverside Law LLP

(57) ABSTRACT

The invention provides a novel filtration apparatus for the selective separation of metals from a mixture thereof. The invention also provides a method for the separation and isolation of metals from a sample using electrochemical precipitation.

8 Claims, 50 Drawing Sheets

(56) References Cited

U.S. PATENT DOCUMENTS

| | | | |
|---|---|---|---|
| 5,332,485 A | 7/1994 | Thompson | |
| 5,956,242 A | 9/1999 | Majid | |
| 2005/0249917 A1 | 11/2005 | Trentacosta | |
| 2009/0131835 A1 | 5/2009 | Voorhees | |
| 2009/0131858 A1 | 5/2009 | Fissell | |
| 2012/0211367 A1* | 8/2012 | Vecitis | B82Y 30/00 204/554 |
| 2012/0234694 A1* | 9/2012 | Vecitis | B01D 35/06 205/747 |
| 2018/0187320 A1* | 7/2018 | Chung | C25C 1/22 |

OTHER PUBLICATIONS

Guandao Gao & Chad D. Vecitis, Doped Carbon Nanotube Networks for Electrochemical Filtration of Aqueous Phenol: Electrolyte Precipitation and Phenol Polymerization, 4 ACS Appl. Mater. Interfaces, 1478, 1478-1489 (2012). (Year: 2012).*

Gao et al., CNT-PVDF composite flow-through electrode for single-pass sequential reduction-oxidation, 2 J. Mater. Chem. A, 6185, 6185-6190 (2014). (Year: 2014).*

Guandao Gao & Chad D. Vecitis, Electrochemical Carbon Nanotube Filter Oxidative Performance as a Function of Surface Chemistry, 45 Environ. Sci. Technol. 9726, 9726-9734 (2011). (Year: 2011).*

Mary H. Schnoor & Chad D. Vecitis, Quantitative Examination of Aqueous Ferrocyanide Oxidation in a Carbon Nanotube Electrochemical Filter: Effects of Flow Rate, Ionic Strength, and Cathode Material, 117 J. Phys. Chem. C, 2855, 2855-2867 (2013). (Year: 2013).*

Liu et al., Quantitative 2D electrooxidative carbon nanotube filter model: Insight into reactive sites, 80 Carbon, 651, 651-664 (2014). (Year: 2014).*

Han Liu, CNT-based Electrochemical Filter for Water Treatment: Mechanisms and Applications (2015) (Ph.D. dissertation, Harvard University). (Year: 2015).*

Afnan Mashat, Functional Materials Based on Surface Modification of Carbon Nanotubes for Biomedical and Environmental Applications (2015) (Ph.D. dissertation, King Abdullah University of Science and Technology). (Year: 2015).*

Khattab et al., Electrochemical removal of copper ions from dilute solutions using packed bed electrode. Part I, 22 Egypt. J. Petrol., 199, 199-203 (2013). (Year: 2013).*

Khattab et al., Electrochemical removal of copper ions from dilute solutions using packed bed electrode. Part II, 22 Egypt. J. Petrol., 205, 205-210 (2013). (Year: 2013).*

United States Patent and Trademark Office, Classification Definitions: p. 75-5 (Dec. 2004 ed.), (Year:2004).*

O'Connor, et al. Environ. Sci.: Water Res. Technol., 2018, 4, 58-66.

Sander, et al. Environ. Sci. Technol. 2015, 49, 5862-5878.

Megan O'Connor, "Strategies to Enable a Circular Economy in the Electronics Industry: Electrochemical Recovery of Metals" Ph.D. Dissertation, Duke University, 2017, 169 pages.

Rahaman, et al. Environ. Sci. Technol. 2012, 46, 1556-1564.

Arai et al., Journal of The Electrochemical Society 2010, 157, (3), D147-D153.

Zhan, et al. International Journal of Electrochemistry, vol. 2011, Article ID 572862, 8 pages.

Al-Johani, H. and Salam, M. A.; Kinetics and thermodynamic study of aniline adsorption by multi-walled carbon nanotubes from aqueous solution. J. Colloid Interface Sci. 2011, 360 (2), 760-767.

Cho, H.H. et al.; 'Sorption of aqueous Zn[II] and Cd[II] by multiwall carbon nanotubes: The relative roles of oxygen containing functional groups and graphenic carbon'. Langmuir 2010, 26 (2), 967-981.

Cho, H.H. et al. Influence of surface oxides on the adsorption of naphthalene onto multiwalled carbon nanotubes. Environ. Sci. Technol. 2008, 42 (8), 2899-2905.

Di, Z.-C. et al.; 'Chromium adsorption by aligned carbon nanotubes supported ceria nanoparticles'. Chemosphere 2006, 62, 861-865.

Gui et al.; "Soft, highly conductive nanotube sponges and composites with controlled compressibility," ACS Nano 4, 2010, 2320-2326.

Hyung and Kim; "Natural organic matter (NOM) adsorption to multi-walled carbon nanotubes: effect of NOM characteristics and water quality parameters," Environ. Sci. Technol. 2008, 42 (12), 4416-4421.

Matsunaga et al.; Electrochemical disinfection of bacteria in drinking water using activated carbon fibers, Biotechnol. Bioeng. 1994, 43:429-433.

Moon et al.; High-yield purification process of single-walled carbon nanotubes. J. Phys. Chem. B 2001, 105 (24):5677-5681.

Peigney et al.; Specific surface area of carbon nanotubes and bundles of carbon nanotubes. Carbon 2001, 39 (4), 507-514.

Peng et al.; Mater. Lett. 2005, 59, 399-403. Ceria nanoparticles supported on carbon nanotubes for the removal of arsenate from water.

Vecitis et al.; Electrochemical carbon nanotube filter for adsorption, desorption, and oxidation of aqueous dyes and anions. J. Phys. Chem. C 2011, 115 (9), 3621-3629.

Vecitis et al.; Electrochemical multi walled carbon nanotube filter for viral and bacterial removal and inactivation. Environ. Sci. Technol. 2011, 45 (8), 3672-3679.

Vecitis et al.; Electronic-Structure-Dependent Bacterial Cytotoxicity of Single-Walled Carbon Nanotubes. ACS Nano 4, 2010, (9), 5471-5479.

Wang et al.; Multiwalled carbon nanotubes coated fibers for solid-phase microextraction of polybrominated diphenyl ethers in water and milk samples before gas chromatography with electron-capture detection J. Chromatogr. A 2006, 1137, 8-14.

Wiggins-Camacho et al.; Effect of nitrogen concentration on capacitance, density of states, electronic conductivity, and morphology of N-doped carbon nanotube electrodes, J. Phys. Chem. C 2009, 113 (44), 19082-19090.

Yang et al. Improvement of electrochemical wastewater treatment through mass transfer in a seepage carbon nanotube electrode reactor, Environ. Sci. Technol. 2009, 43 (10), 3796-3802.

Yang et al.; Competitive adsorption of naphthalene with 2,4-dichlorophenol and 4-chloroaniline on multiwalled carbon nanotubes. Environ. Sci. Technol. 2010, 44 (8), 3021-3027.

Yuan et al.; Deposition of silver nanoparticles on multiwalled carbon nanotubes grafted with hyperbranched poly ( amidoamine) and their antimicrobial effects, J. Phys. Chem. C 2008, 112, 18754-18759.

Zhang et al.; Adsorption of aromatic compounds by carbonaceous adsorbents: a comparative study on granular activated carbon, activated carbon fiber, and carbon nanotubes, Environ. Sci. Technol. 2010, 44 (16), 6377-6383.

* cited by examiner

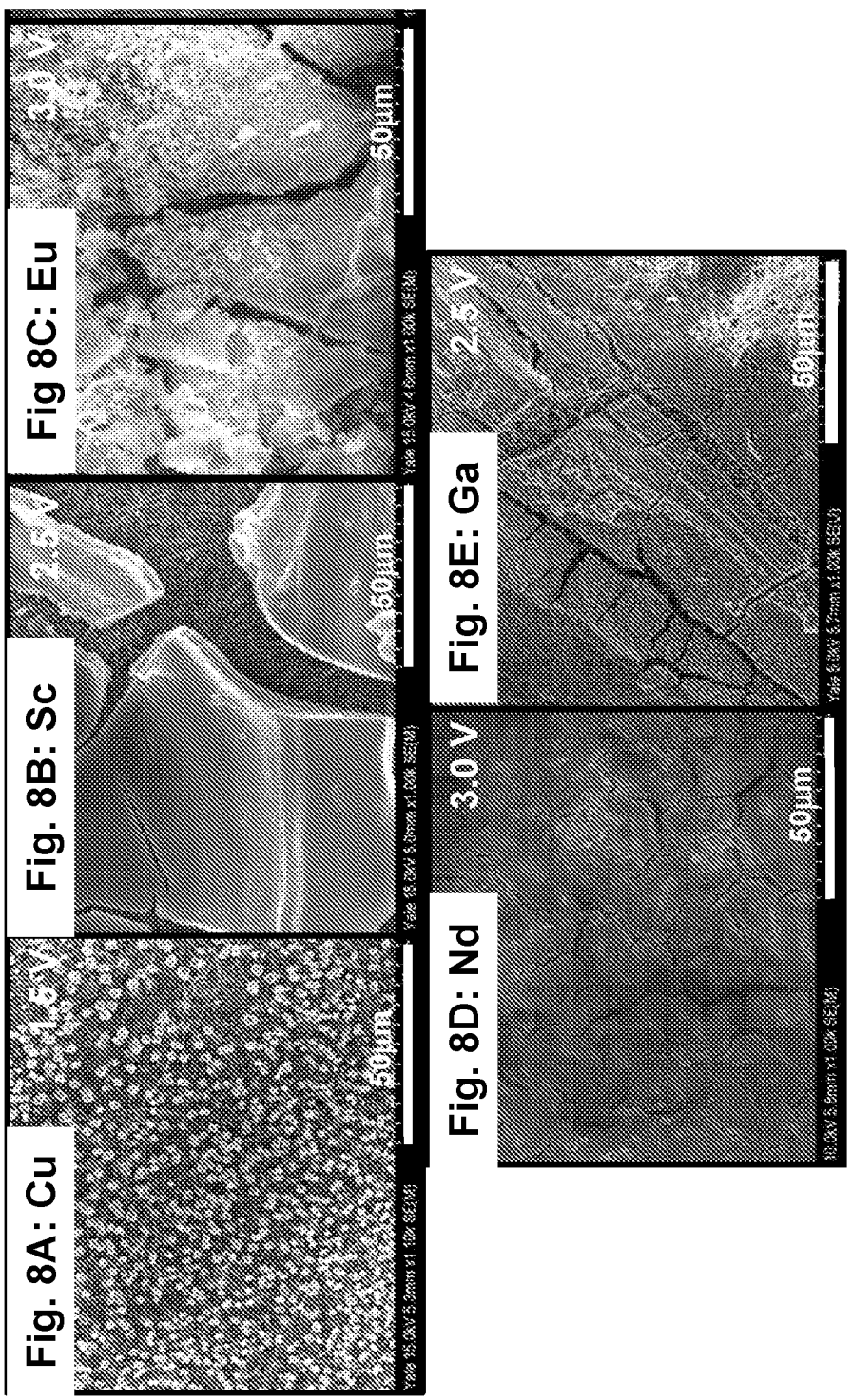

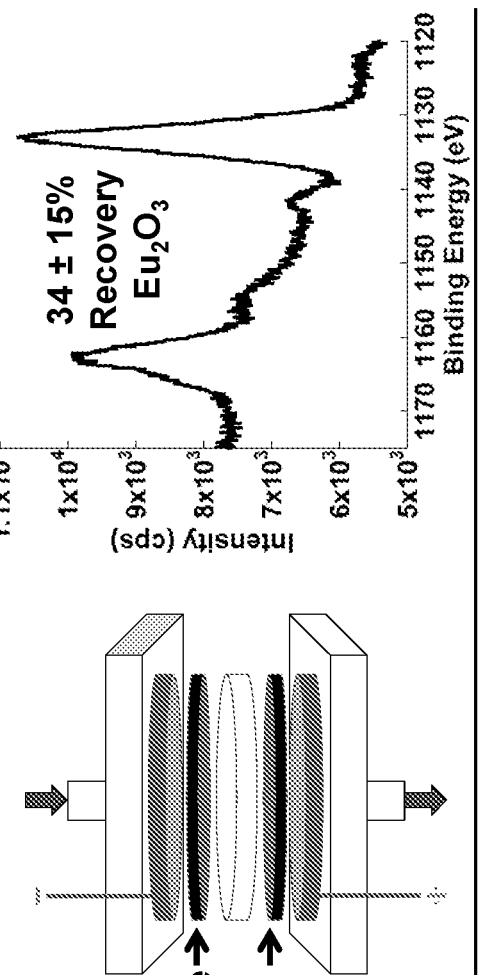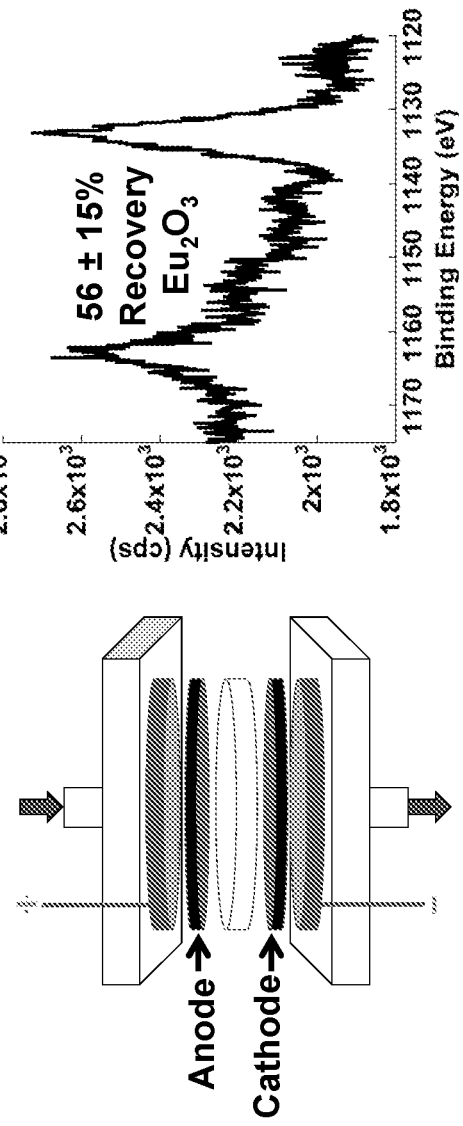
Fig. 9A
Fig. 9B

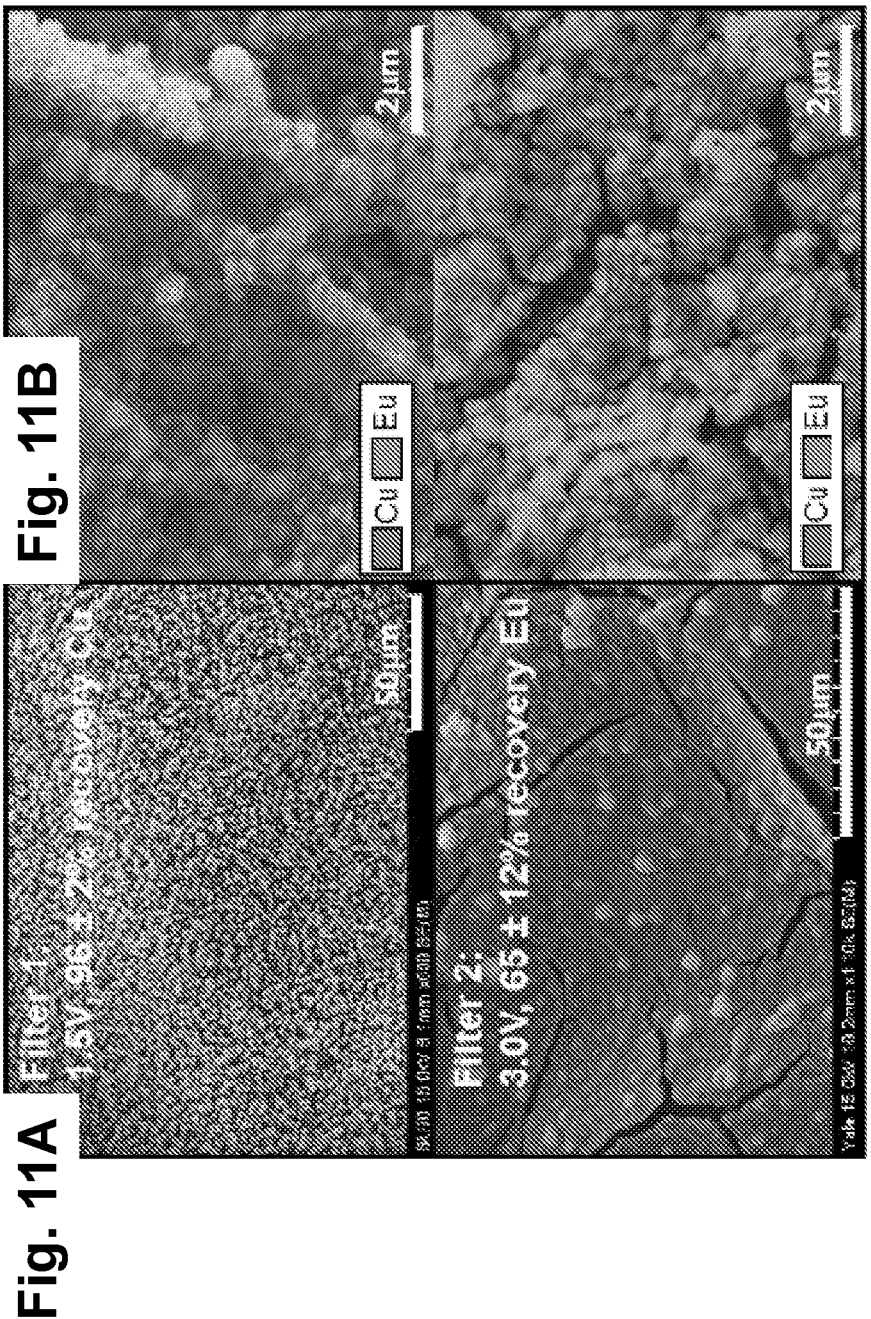

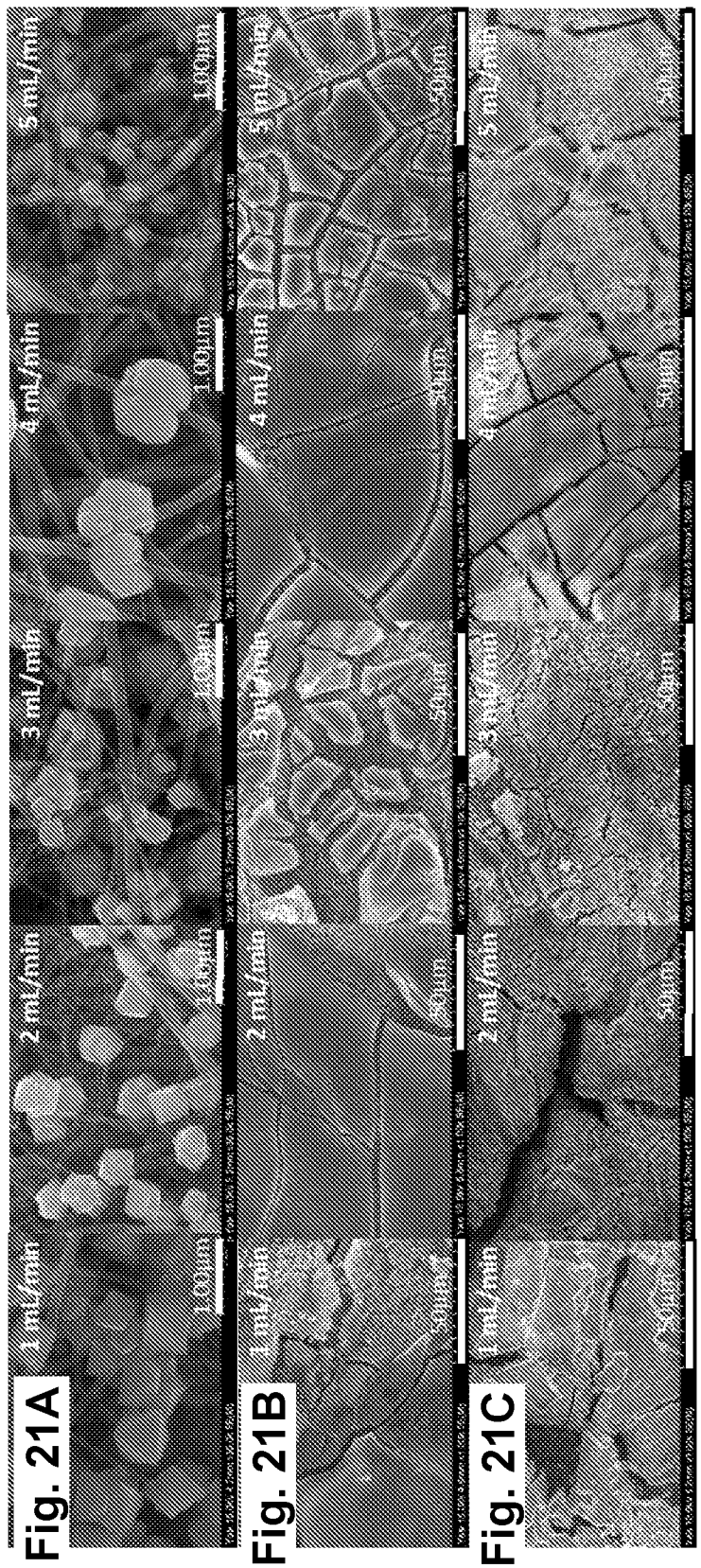

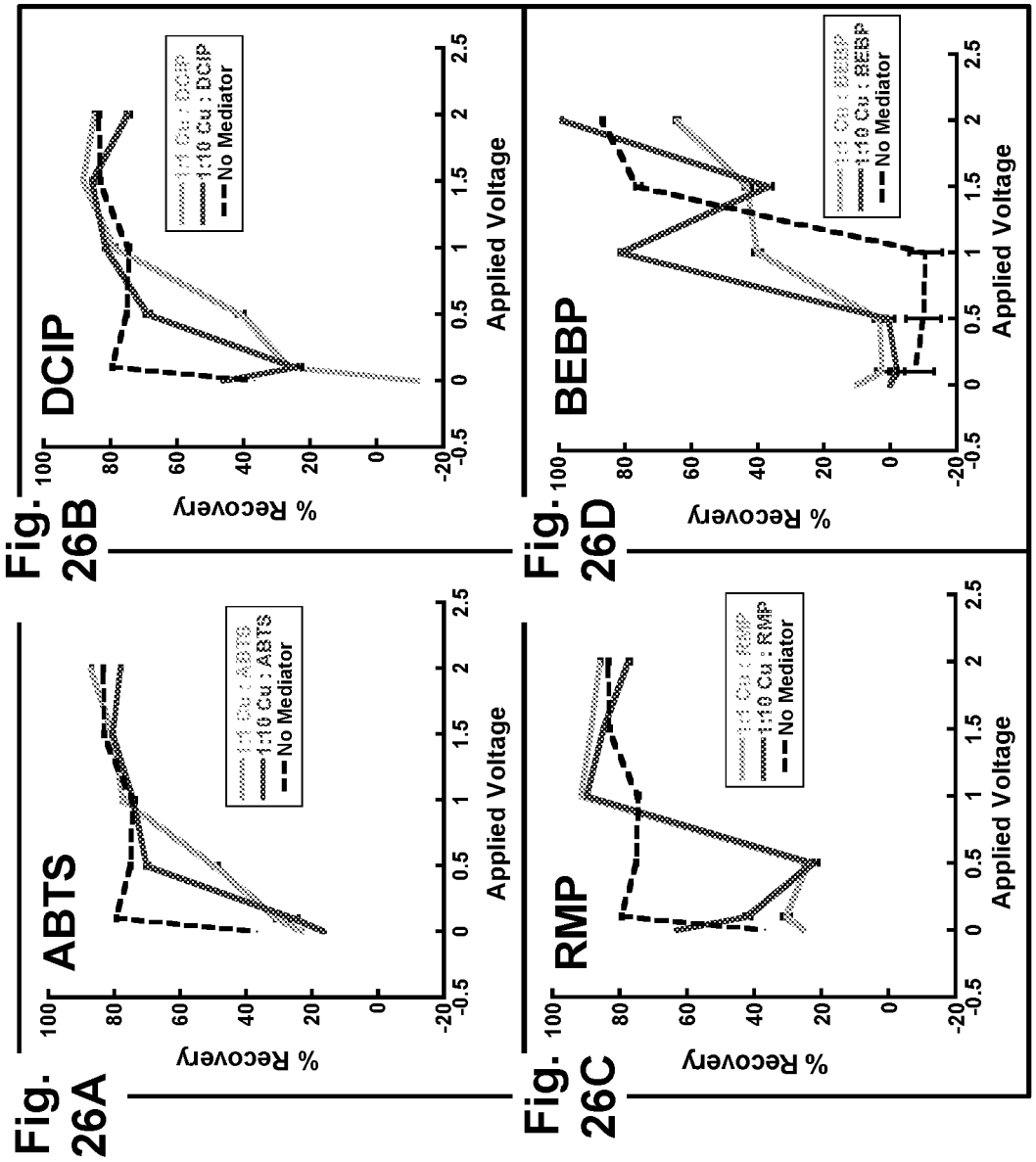

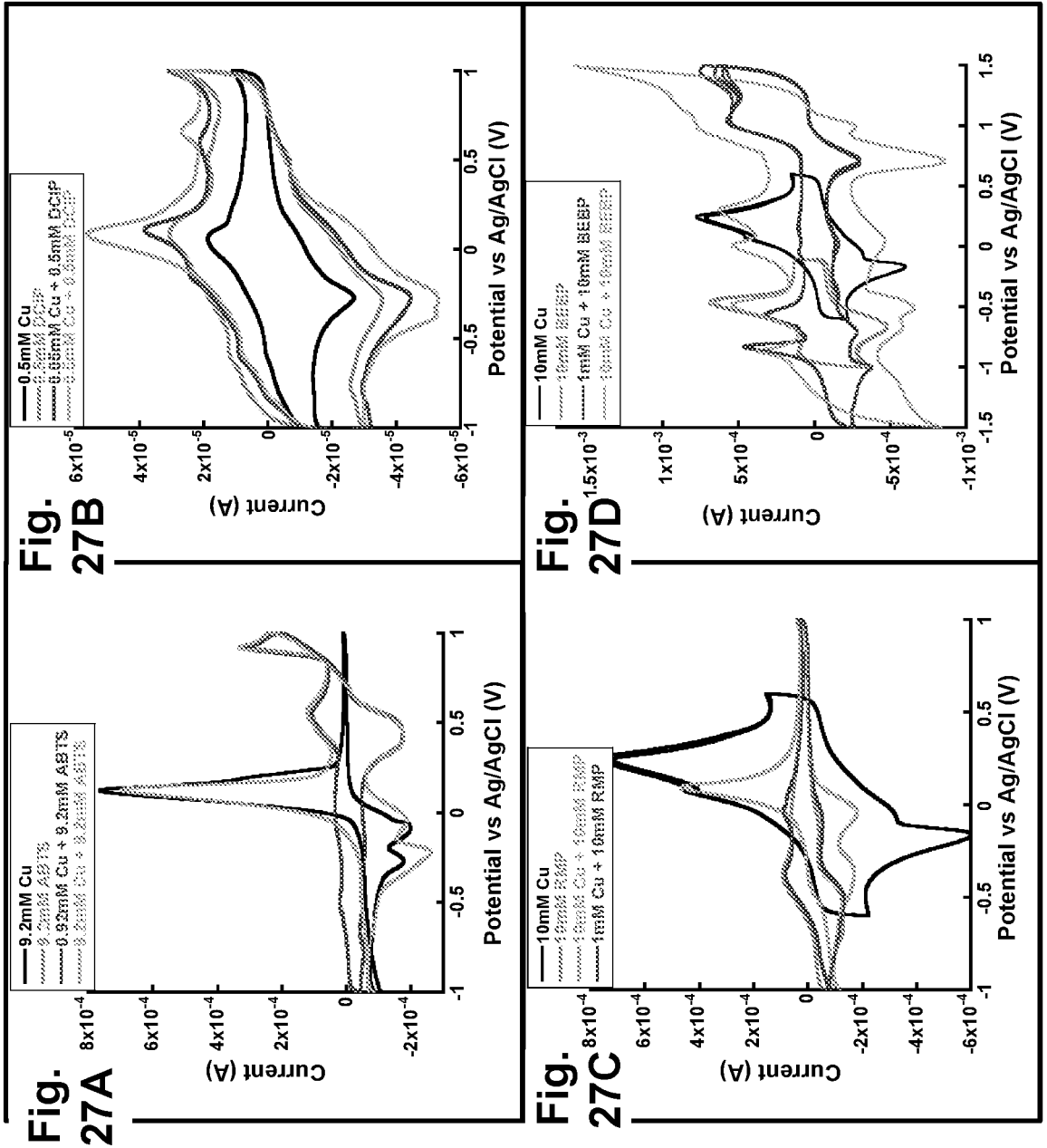

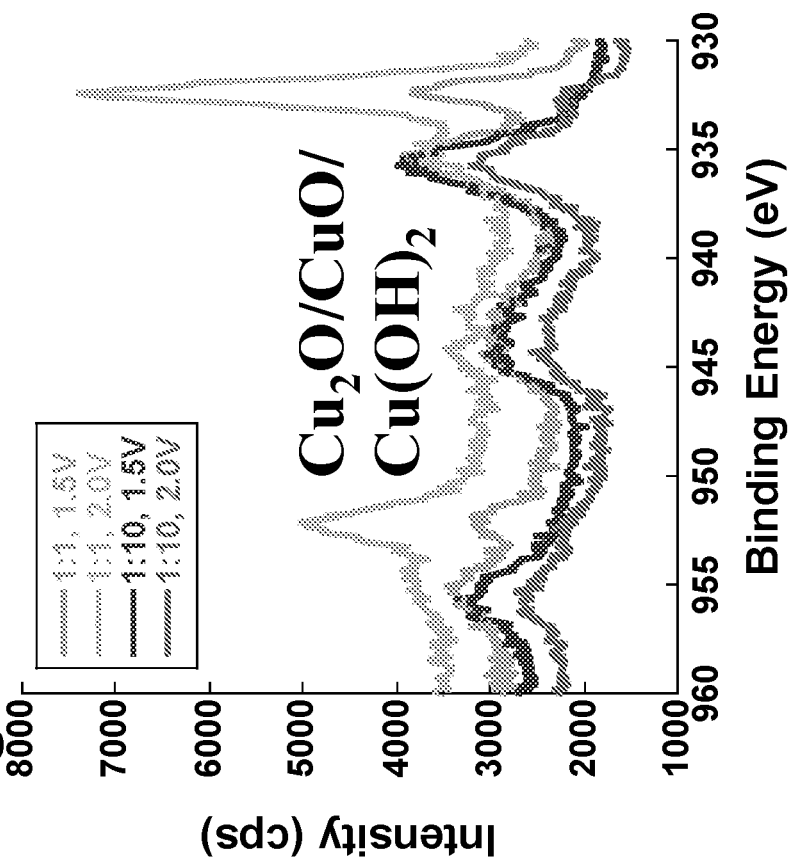
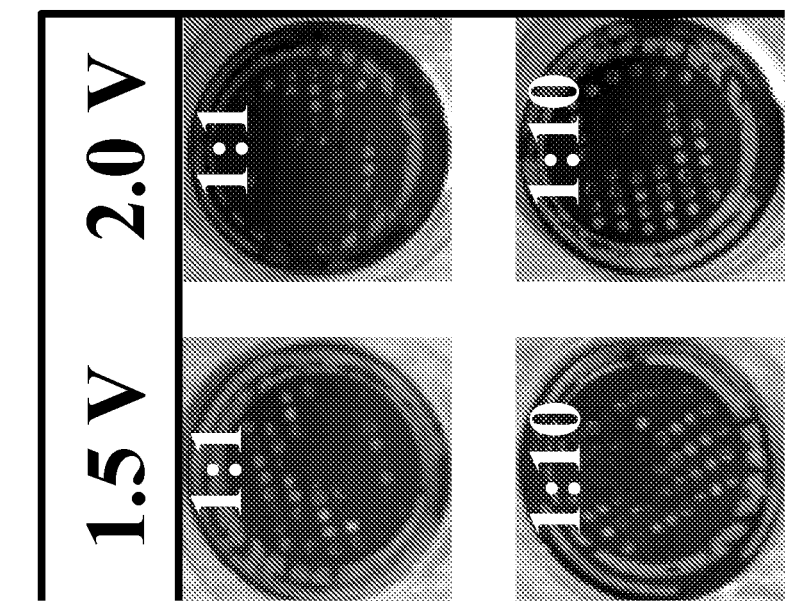
Fig. 28A
Fig. 28B

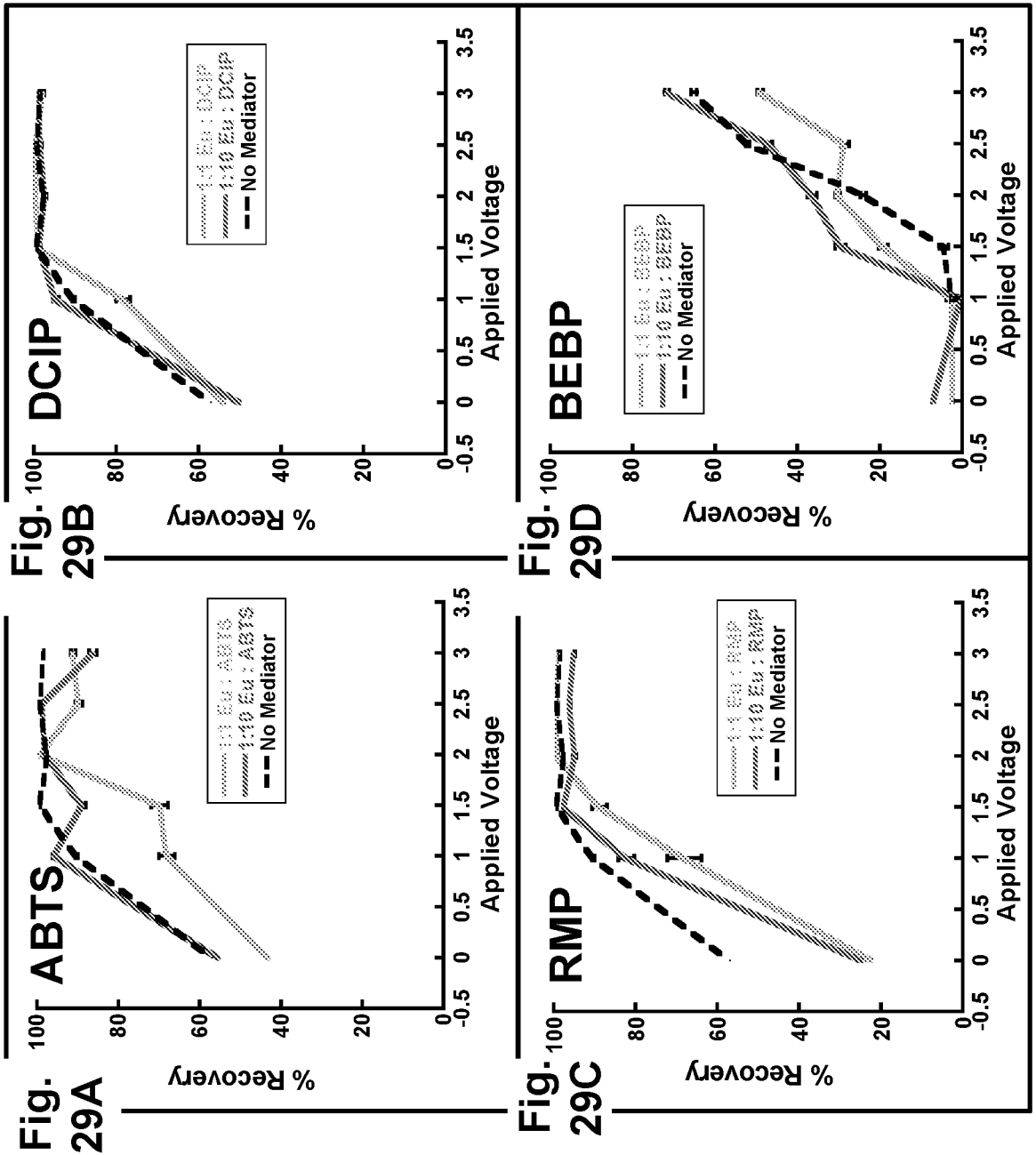

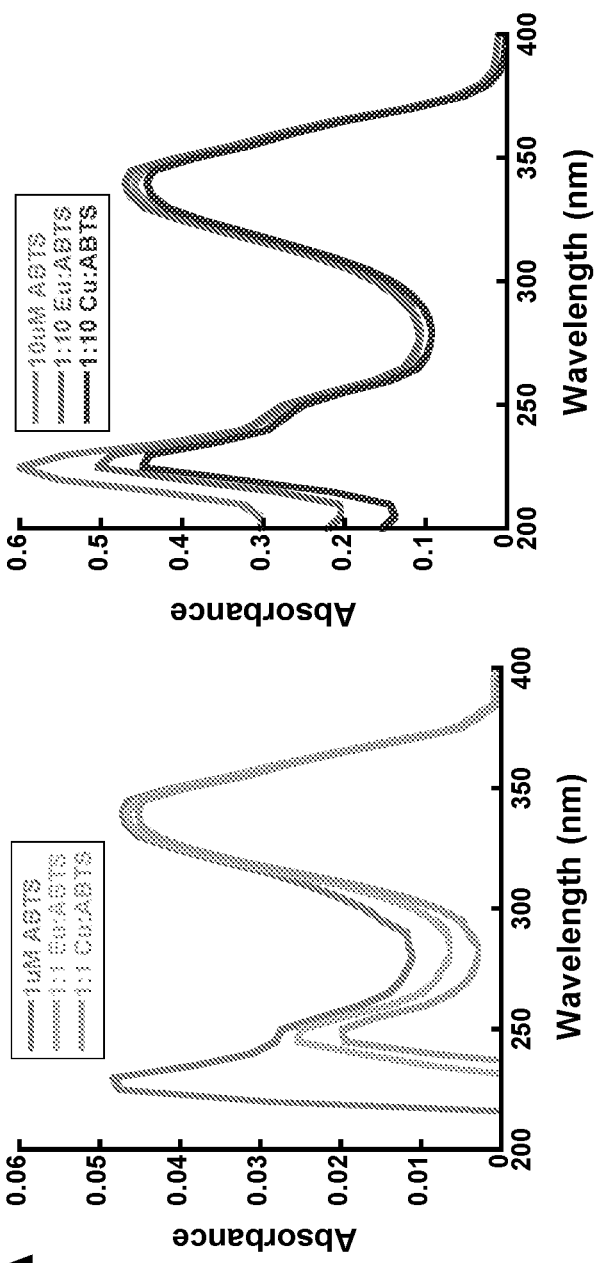
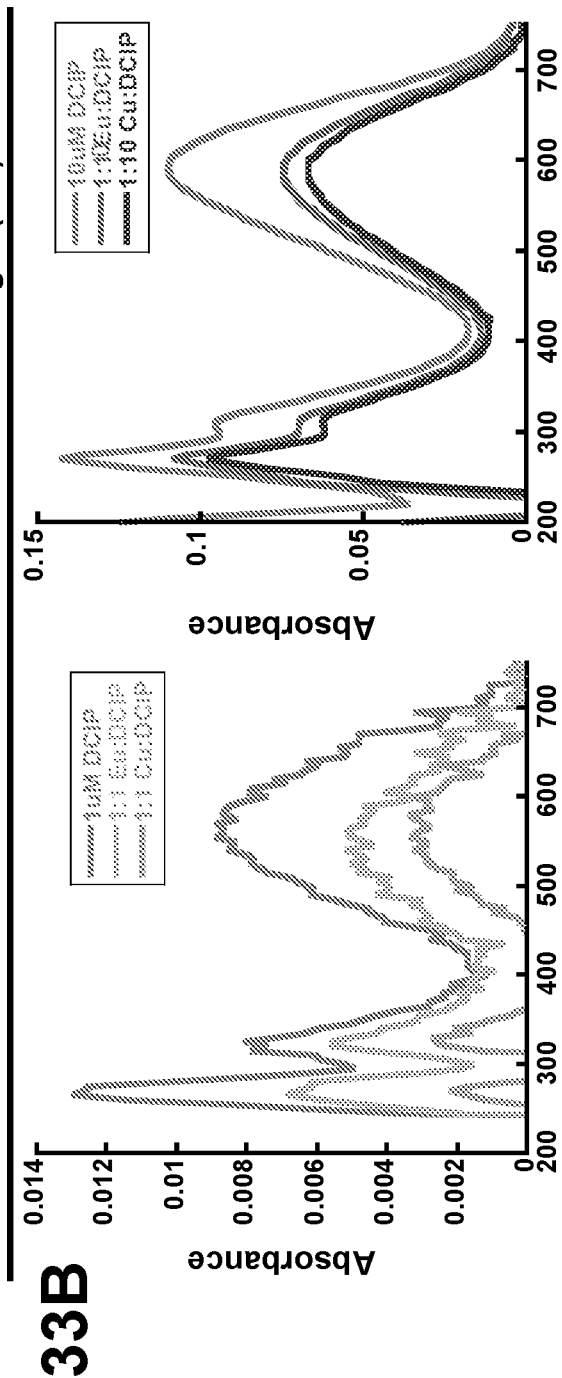
Fig. 33A
Fig. 33B

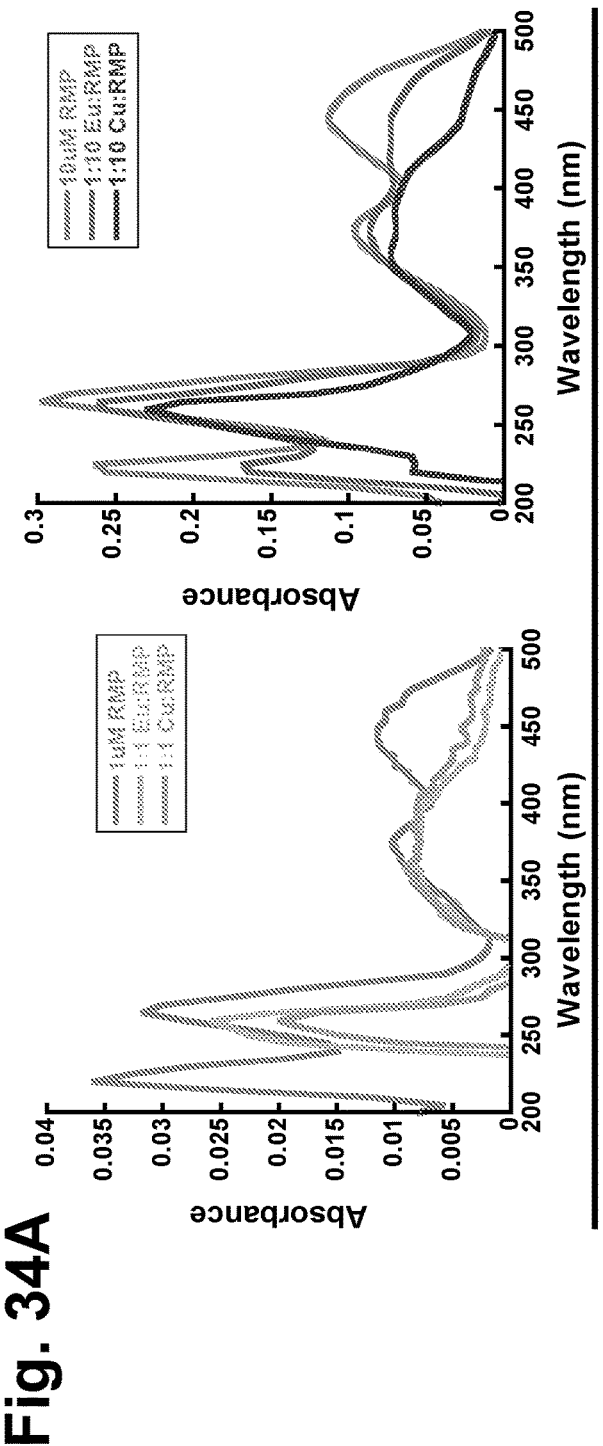
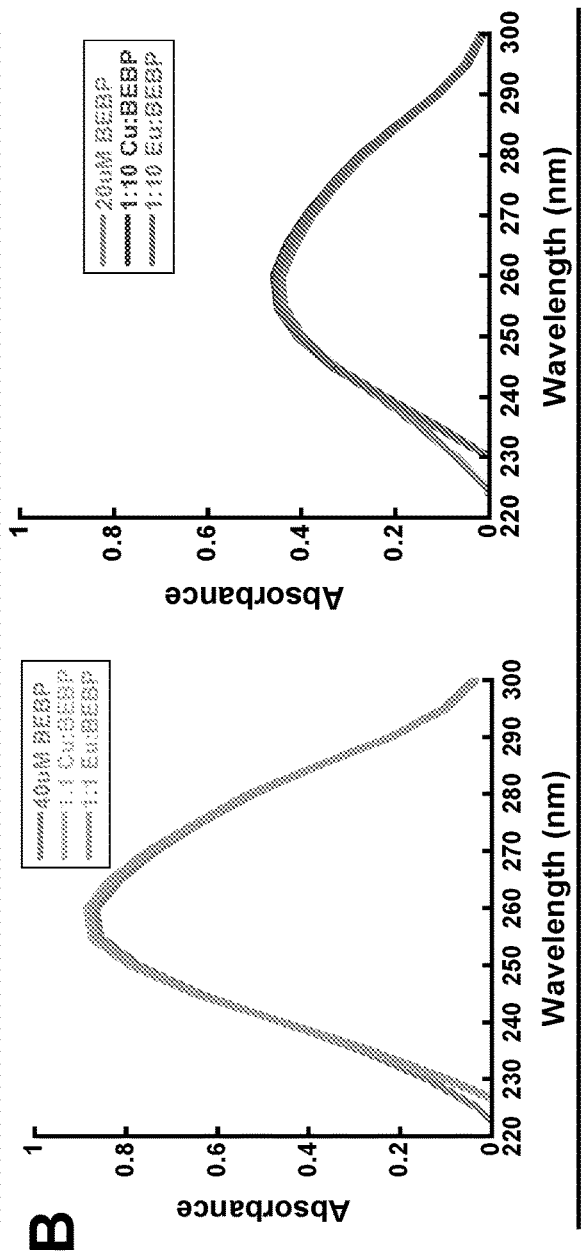
Fig. 34A
Fig. 34B

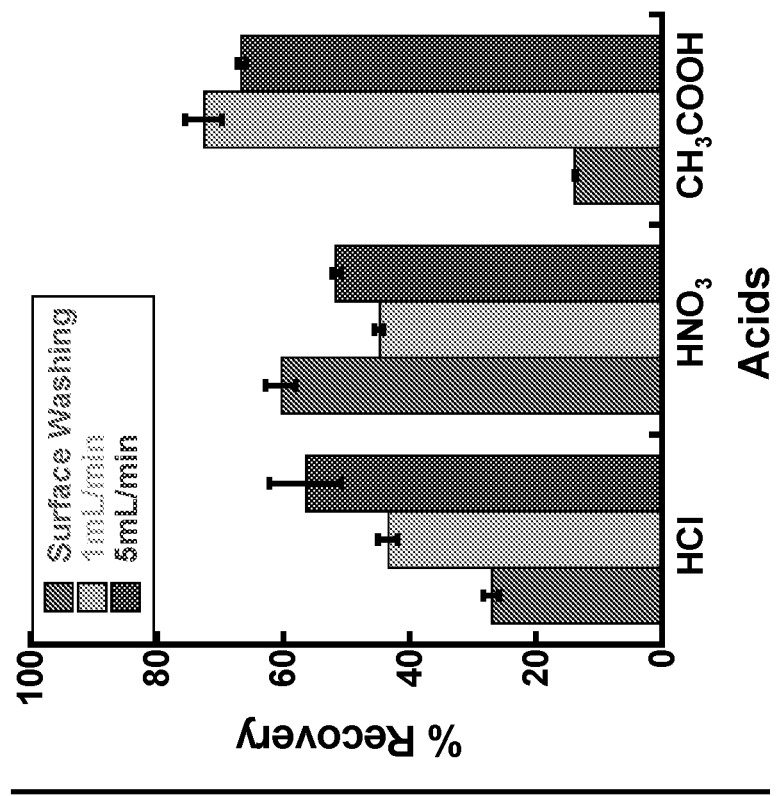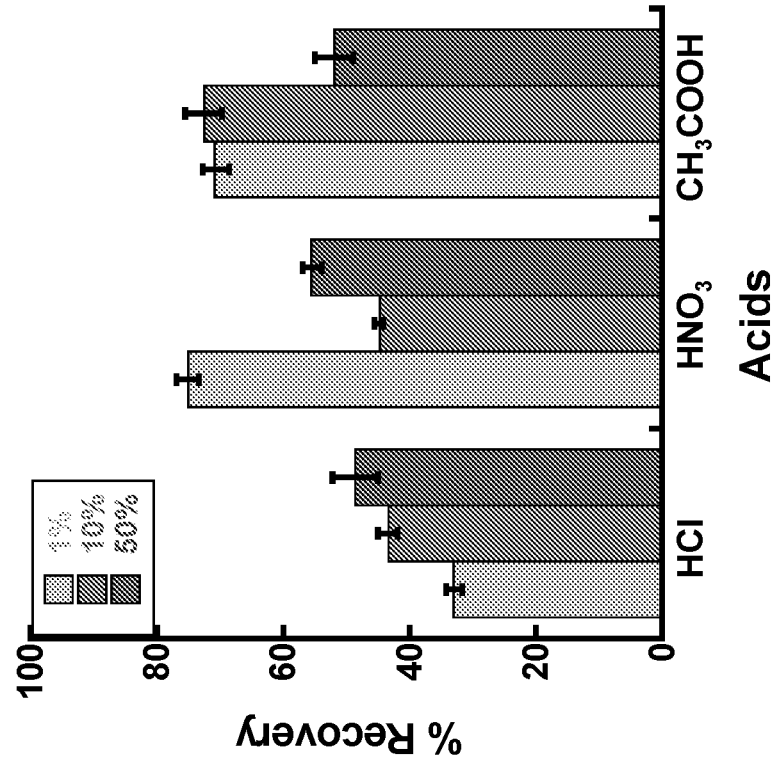

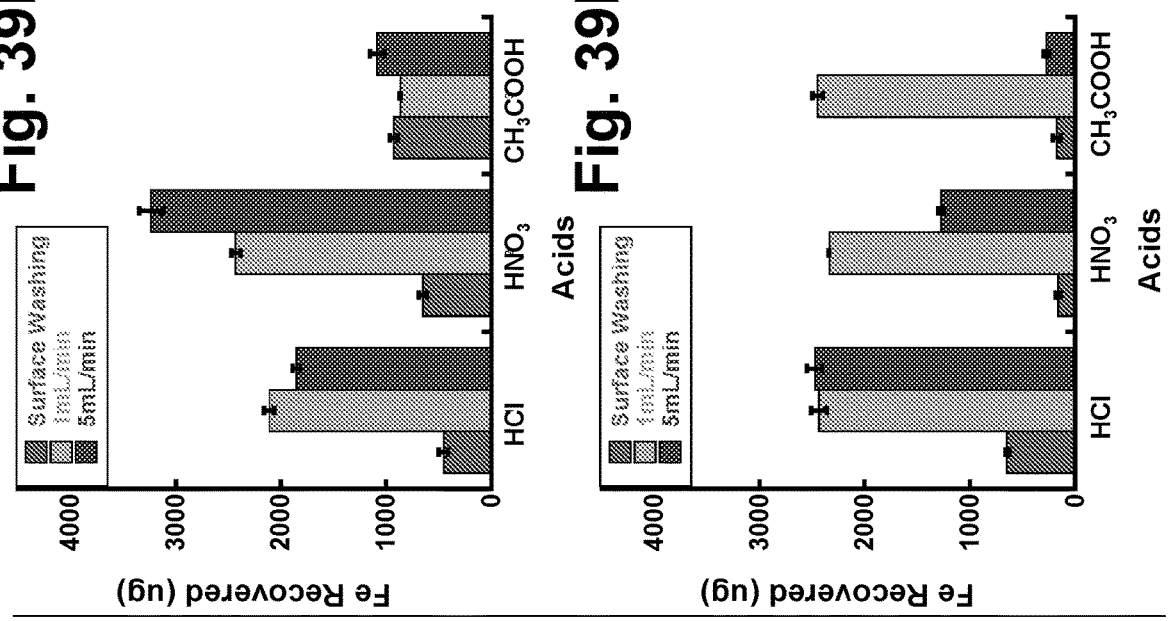
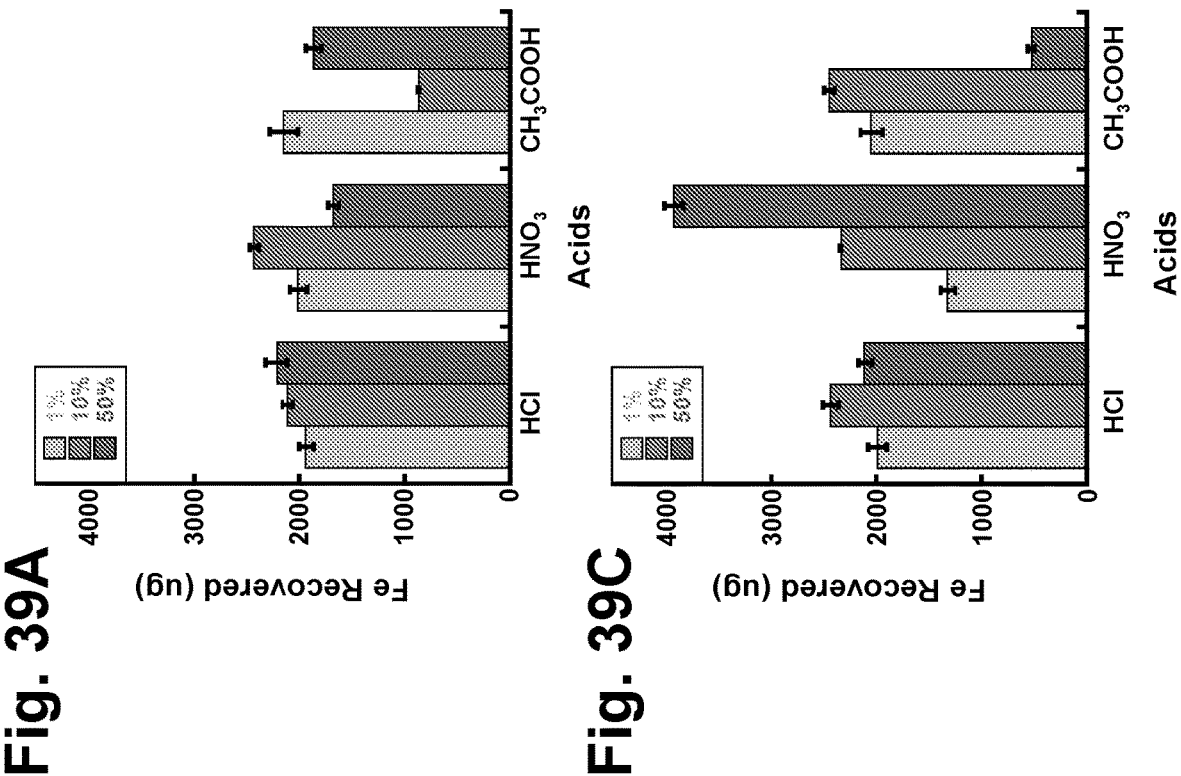
Fig. 39A  Fig. 39B  Fig. 39C  Fig. 39D

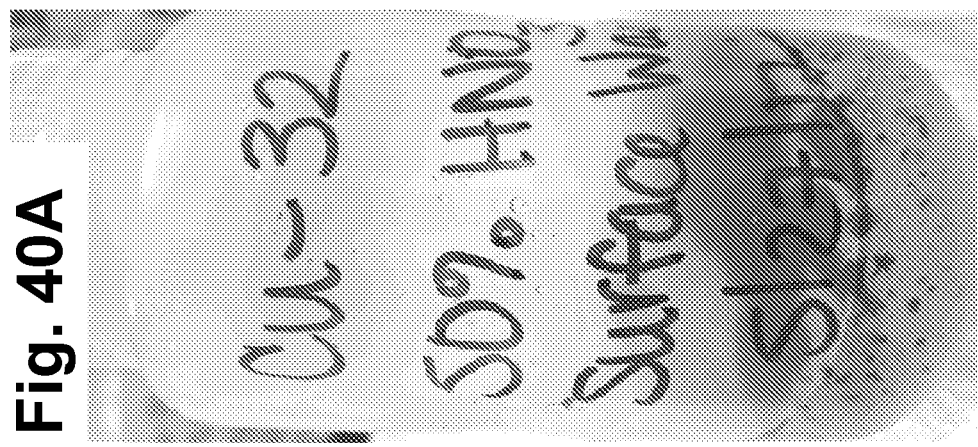
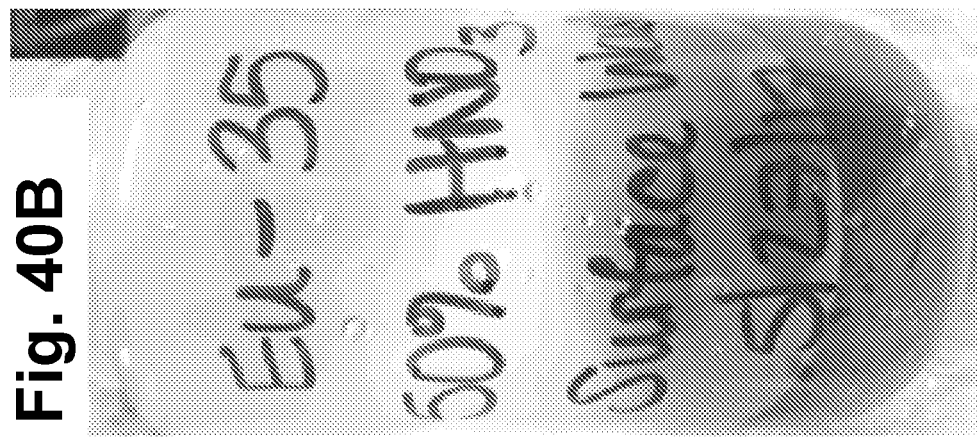

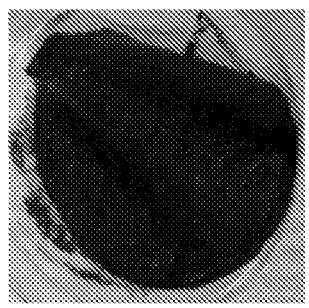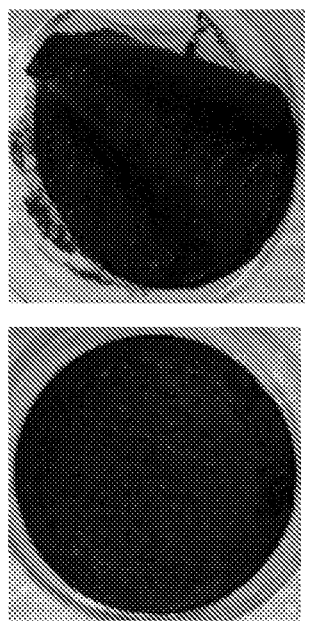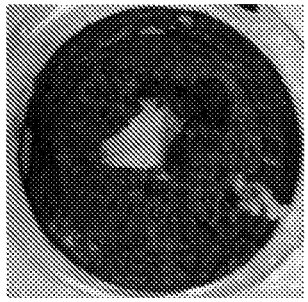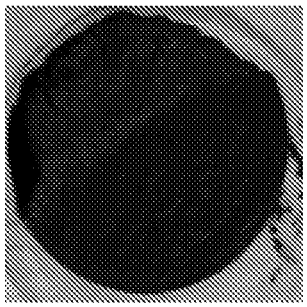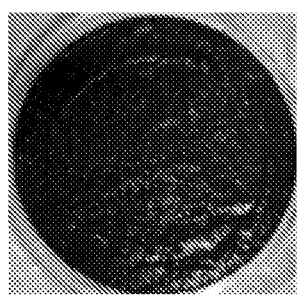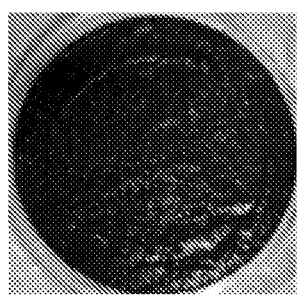
Fig. 45

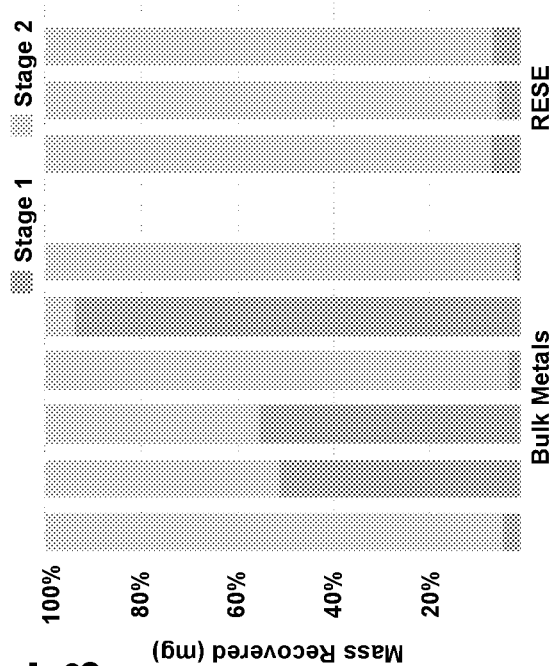
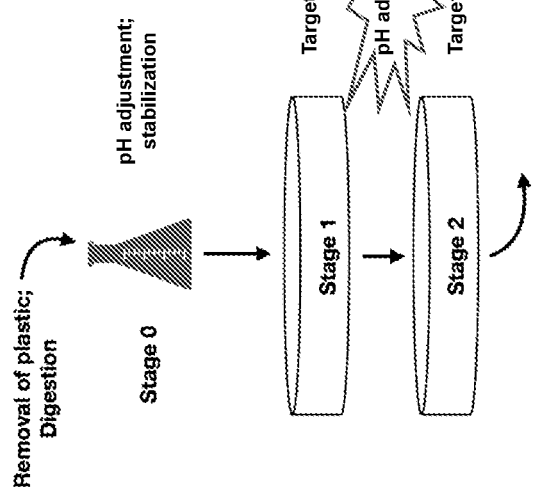
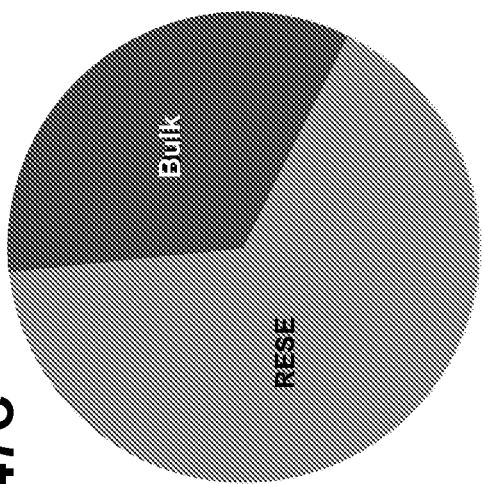
Fig. 47A
Fig. 47B
Fig. 47C

ELECTROCHEMICAL SEPARATION AND RECOVERY OF METALS

STATEMENT REGARDING FEDERALLY SPONSORED RESEARCH OR DEVELOPMENT

This invention was made with government support under Grant No. RD-83558001, awarded by the EPA, and DE-FE0026952, awarded by the Department of Energy. The government has certain rights in the invention.

CROSS-REFERENCE TO RELATED APPLICATIONS

This application is a non-provisional of U.S. Provisional Patent Application Ser. No. 62/480,930, filed Apr. 3, 2017, and 62/636,719, filed Feb. 28, 2018, the entire contents of which are incorporated herein by reference.

BACKGROUND OF THE INVENTION

Limiting the reliance on greenhouse gas producing energy sources will rely on clean energy technologies (e.g., permanent magnets, batteries, and catalysts for the wind, solar, and automotive industries), which require rare earth and specialty elements (RESE) (O'Connor, et al. ACS Sustainable Chemistry & Engineering 2016, 4, (11), 5879-5888). However, the U.S. Department of Energy (DOE) and European Commission have labeled some RESE critical (i.e., some combination of factors create an imbalance wherein there is a large demand and insufficient supply) (U.S. Dept. of Energy, Critical Materials Strategy, 2011).

Increasing reliance on RESE in developing technologies has caused a bottleneck effect, where the primary supply of these metals can no longer support demand (Kingsnorth, D. J. In Rare earths: facing new challenges in the new decade, 2010). Without intervention, the supply chain imbalance or instability could be exacerbated as clean energy technologies continue to grow (Grandell, et al. Renewable Energy 2016, 95, 53-62). In order to create a secondary supply of these metals, novel materials management strategies and supporting technologies will be needed to enhance reuse and recycling at the end-of-life and in the manufacturing stages. Such systematic changes will not only secure the supply of metals for the requisite technologies, but also have the ancillary benefit of further reducing emissions by reducing mining and refining of primary metal.

While there are no standard recovery technologies (i.e., commercialized and readily integrated onto an assembly line) available to manufacturers seeking to remove valuable materials from their own waste streams, end-of-life waste management strategies currently recycle 20% of global municipal solid waste and less than 1% of RESE (Reck & Graedel, Science 2012, 337, 690-695). These low recycling rates result from many interrelated factors including consumer behavior, government policy, and lack of infrastructure. In addition, there are few recycling technologies sufficiently advanced to reclaim the critical materials or separate the metals from one another for reuse. Present solid waste recycling techniques include: disassembly and targeting of valuable and hazardous components, upgrading the valuable components via magnetic and mechanical sorting processes, and finally, refining. Refining is used to recover the materials of interest, typically via pyrometallurgical and hydrometallurgical processes, which consist of either melting or dissolving the waste (Veit & Moura Bernardes., Electronic Waste: Recycling Techniques. 2015) Both work well for bulk metals: the recycling rates of copper, nickel, and zinc are above 50%, (Reck & Graedel, Science 2012, 337, 690-695.) but neither can capture all RESE at such high rates.

Following acid digestions, recovery strategies vary. One such strategy is electrowinning, which involves applying a voltage to a cathodic material in a large tank of metal-rich waste, where the metal of interest is reduced out of solution onto the cathode surface. The cathode is generally made out of large stainless steel or aluminum sheets and the anode is an inert metal, such as titanium or lead. This electrodeposition technique yields high recovery for bulk metals such as Cu, Ni, and Co (Bertuol, et al., Chemical Engineering & Technology 2012, 35, 2084-2092; Veit & Moura Bernardes, Electronic Waste: Recycling Techniques. 2015), but suffers high space requirements due to the large surface area of smooth cathodic material needed. This limitation makes the recycling method impractical for the low concentrations of RESE metals found in many waste streams and smaller processes important for clean energy and nanotechnologies, including advanced metal-deposition techniques such as e-beam sputtering, lithography, and printing in semiconductors (O'Connor, et al. ACS Sustainable Chemistry & Engineering 2016, 4, (11), 5879-5888).

High surface area, conductive materials could enable adaption of the basic principles of electrowinning to a broader range of elements and at lower area and volume requirements. Recently, carbon nanotube (CNT) membranes and filters with high surface area-to-mass ratios and excellent conductivity have been developed for water treatment technologies. These research endeavors are well documented, with significant efforts toward anti-fouling membranes (de Lannoy, et al., Environmental Science & Technology 2013, 47, (6), 2760-2768), virus inactivation (Rahaman, et al., Environmental Science & Technology 2012, 46, (3), 1556-1564) and the oxidative treatment of organic matter (Vecitis, et al., The Journal of Physical Chemistry C 2011, 115, (9), 3621-3629; Schnoor & Vecitis, The Journal of Physical Chemistry C 2013, 117, (6), 2855-2867), but few studies explore metal recovery (Arai et al., Journal of The Electrochemical Society 2010, 157, (3), D147-D153; Zhan, et al., Water Science and Technology 2010, 61, (6), 1427-1432).

There is great need in the art for improved devices, systems and methods to separate and extract industrial metals from waste streams. This invention fulfills this unmet need.

SUMMARY OF INVENTION

In one aspect, the present invention relates to a filtration apparatus for the separation of metals from a mixture thereof, comprising at least one filtration chamber in a non-conductive casing with an inlet port and an outlet port; said filtration chamber comprising: a conducting metal anode shim; a conducting metal cathode shim; a CNT(−) filter, comprising carbon nanotubes, between the anode and the cathode; and a non-conducting material between the CNT(−) filter and the anode; wherein the anode and cathode are connected to a voltage source that applies a potential between the anode and the cathode; and wherein a sample can be passed from the inlet port, through the filtration chamber, and out the outlet port. In one embodiment, at least one filtration chamber comprises a CNT(+) filter comprising carbon nanotubes between the anode and the non-conducting material. In one embodiment, the at least one filtration chamber comprises a pressure release valve. In one embodiment, a plurality of filtration chambers are arranged in series. In one embodiment, at least one of the conducting metal anode and the conducing metal cathode comprise stainless steel. In one embodiment, at least one of the conducting metal anode and the conducting metal cathode is mesh.

In one embodiment, the carbon nanotubes are encapsulated in a polymer matrix. In one embodiment, the polymer matrix is selected from the group consisting of poly(vinyl alcohol), poly(tetrafluoroethylene), poly(vinylidene fluoride), and silicone alcohol), poly(tetrafluoroethylene), poly(vinylidene fluoride), and silicone. In one embodiment, the CNT(−) filter comprises a chelating agent. In one embodiment, the CNT(−) filter comprises a redox mediator. In one embodiment, the carbon nanotubes of the CNT(−) filter are randomly oriented. In one embodiment, the carbon nanotubes are multi-walled.

In one aspect, the present invention relates to a method for the separation of metals from a sample, the method comprising: passing a sample through a filtration apparatus comprising a plurality of filtration chambers, each having a CNT(−) filtering layer between an anode and cathode, housed in a non-conductive casing with an inlet port and an outlet port, wherein the plurality of filtration chambers are arranged in series; applying an electric potential between the anode and the cathode of each filtration chamber; precipitating metal salts on the filtering layer; and isolating the metal salts from the filtering layer. In one embodiment, the method further comprises the step of adding a chemical agent to the sample. In one embodiment, the chemical agent is selected from the group consisting of an acid, a base, and a redox mediator.

In one embodiment, the step of applying an electric potential between the anode and the cathode of each filtration chamber comprises the steps of: selecting an electric potential based on the metal to be captured in each filtration chamber; and applying a different electric potential to each filtration chamber in series. In one embodiment, the step of isolating the metal salts from the filtering layer comprises the step of passing an acid through the filtration chamber. In one embodiment, the step of isolating the metal salts from the filtering layer comprises the step of oxidizing the filter layer at a temperature greater than 400° C.

In one embodiment, the sample comprises a transition metal, a rare earth element, a specialty element, a metalloid, a lanthanide, or an actinide. In one embodiment, the sample comprises waste from a manufacturing process.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 6A shows recovery as a function of applied voltage (range 0.1-3.0 V); the pH was measured after solution preparation rather than titrated to a controlled value. FIG. 6B shows recovery as a function of pH (range 2-10). FIG. 6C shows recovery as a function of flow rate (1-5 mL min$^{-1}$).

FIG. 7A is a plot of the recovery of Co, Ni, and Li as a function of applied voltage. FIG. 7B is a plot of the recovery of Ga and As as a function of applied voltage.

FIGS. 8A-8E depict scanning electron micrographs (SEMs) of the five test metals at reported voltages. The flow rate was held constant at 3 mL min$^{-1}$ for each metal and pH was 5.6, 4.5, 5.7, 5.5, and 3.3, respectively. FIG. 8A is a SEM of recovered Cu. FIG. 8B is a SEM of recovered Sc. FIG. 8C is a SEM of recovered Eu. FIG. 8D is a SEM of recovered Nd. FIG. 8E is a SEM of recovered Ga.

FIGS. 9A and 9B are schematics of oxygen purge lead arrangement and confirmation of $Eu_2O_3$ formation via x-ray photoelectron spectroscopy. FIG. 9A shows a deaerated experiment with normal leads (i.e., cathode on top) with 34±15% recovery. FIG. 9B shows a deaerated experiment with reverse leads (i.e., anode on top; enhanced $O_2$ transport) with 56±15% recovery. Note that XPS is a surface technique, so the intensity in spectrum (B) is lower (with a correspondingly higher signal-to-noise ratio) due to metal deposition within the filter compared to surface deposition seen in (A).

FIG. 10A is a scheme showing that molecular oxygen ($O_2$) can form hydroxide at the cathode through oxygen reduction. FIG. 10B is a scheme showing that molecular oxygen ($O_2$) can form hydroxide at the cathode through water splitting. Note that water splitting contributes additional molecular oxygen ($O_2$) via anodic water splitting.

FIGS. 11A-11C show the characterization of materials collected on a dual filter stage arranged in series from a mixed metal medium containing Cu and Eu. The influent solution was prepared with 1 mM Cu, 1 mM Eu, and 100 mM $Na_2SO_4$. FIG. 11A shows the SEM micrograms of the two resulting filters. FIG. 11B shows the SEM-EDX mapping of the two filters. FIG. 11C shows the EDX spectra of the two filters.

FIG. 15A is a schematic representing the general process for processing an e-waste component. FIG. 15B is a pie chart representing the metal groups captured on stage two in the preliminary e-waste trial. Moderate selective recovery was achieved, with 68% RESE purity, along with unforeseen As recovery.

FIG. 17A depicts XPS spectra for Sc. FIG. 17B depicts XPS spectra for Eu. FIG. 17C depicts XPS spectra for Cu. Cu was recovered as Cu$_2$O at low pH and CuO at high pH.

FIG. 18A depicts XPS spectra for Ga. FIG. 18B depicts XPS spectra for Nd.

FIG. 19A depicts SEM images of Cu. FIG. 19B depicts SEM images of Sc. FIG. 19C depicts SEM images of Eu. FIG. 19D depicts SEM images of Nd. FIG. 19E depicts SEM images of Ga.

FIG. 20A depicts SEM images of Cu. FIG. 20B depicts SEM images of Sc. FIG. 20C depicts SEM images of Eu. FIG. 20D depicts SEM images of Nd. FIG. 20E depicts SEM images of Ga.

FIGS. 21A-21C depict SEM images of three metals as a function of flow rate. Cu crystallinity showed a sensitivity to flow rate with near perfect crystals at lower flow rates, growing less crystalline as the flow rate increased. In contrast, Sc and Eu did not show any sensitivity. FIG. 21A depicts SEM images of Cu. FIG. 21B depicts SEM images of Sc. FIG. 21C depicts SEM images of Eu.

FIG. 22A depicts a stability diagram of Cu. FIG. 22B depicts a stability diagram of Ga. FIG. 22C depicts a stability diagram of Nd. FIG. 22D depicts a stability diagram of Sc.

FIG. 23A depicts a stability diagram of Eu. FIG. 23B depicts a stability diagram of As.

FIGS. 26A-26D depict mediator-amended and mediator-free recovery of Cu. FIG. 26A is a plot of the recovery of Cu (1 μM) with and without ABTS. FIG. 26B is a plot of the recovery of Cu (1 μM) with and without DCIP. FIG. 26C is a plot of the recovery of Cu (1 μM) with and without RMP. FIG. 26D is a plot of the recovery of Cu (1 mM) with and without BEBP. All ratios are molar ratios and all experiments were conducted over 0.0-2.0V. Error bars represent standard deviations on triplicate (BEBP) or duplicate (ABTS, RMP, and DCIP) measurements.

FIGS. 27A-27D depict the results of cyclic voltammetry experiments for 1:1 and 1:10 Cu: [redox mediator] ratios. All experiments were performed over the range of potentials −0.5 to 0.5V, −1.0 V to +1.0 V, or −1.5 to +1.5 V with 100 mM Na$_2$SO$_4$ and at a scan rate of 0.1 V/s. FIG. 27A is a cyclic voltammogram of Cu with and without the redox mediator ABTS.

FIG. 27B is a cyclic voltammogram of Cu with and without the redox mediator DCIP. FIG. 27C is a cyclic voltammogram of Cu with and without the redox mediator RMP. FIG. 27D is a cyclic voltammogram of Cu with and without the redox mediator BEBP.

FIGS. 28A and 28B depict the capture of a mix of Cu$_2$O, CuO, and Cu(OH)$_2$ in Cu:BEBP experiments. FIG. 28A depicts photographs of the CNT cathode for 1:1 and 1:10 Cu:BEBP experiments at 1.5 and 2.0 V. Note the mixed colors of Cu, suggesting mixed recovery of Cu (I) and Cu (II) oxides. FIG. 28B shows the XPS confirmation of Cu(I) oxide at 2.0 V for both 1:1 and 1:10 Cu:BEBP molar ratios.

FIGS. 29A to 29D depict mediator-amended and mediator-free recovery of Eu. FIG. 29A is a plot of the recovery of Eu$^{3+}$ (1 μM) with and without ABTS. FIG. 29B is a plot of the recovery of Eu$^{3+}$ (1 μM) with and without DCIP. FIG. 29C is a plot of the recovery of Eu$^{3+}$ (1 μM) with and without RMP. FIG. 29D is a plot of the recovery of Eu$^{3+}$ (1 mM) with and without BEBP. All ratios are molar ratios and all experiments were conducted over 0.0-3.0 V at 0.5 V intervals. Error bars represent standard deviations on triplicate (BEBP) or duplicate (ABTS, RMP, and DCIP) measurements.

FIG. 30A depicts photographs of the CNT cathode for 1:1 and 1:10 Eu:BEBP experiments at 2.0, 2.5, and 3.0 V. Note the discoloration is likely due to the presence of mediator on the deposited metal. FIG. 30B shows the XPS confirmation of Eu(III) oxide at all voltages for both 1:1 and 1:10 Eu:BEBP molar ratios.

FIG. 31A shows the absorption results for ABTS with 1 μM Eu$^{3+}$ and 1 μM of Cu$^{2+}$. FIG. 31B shows the absorption results for DCIP with 1 μM Eu$^{3+}$ and 1 μM of Cu$^{2+}$. Sample include initial concentration, effluent from the sorption experiment, and effluents from across the range of voltages 0.0-3.0V. Error bars represent standard deviations on duplicate measurements.

FIG. 32A shows the absorption results for RMP with 1 µM $Eu^{3+}$ and 1 µM of $Cu^{2+}$. FIG. 32B shows the absorption results for BEBP with 1 mM $Eu^{3+}$ and 1 mM of $Cu^{2+}$. Sample include initial concentration, effluent from the sorption experiment, and effluents from across the range of voltages 0.0-3.0V. Error bars represent standard deviations on duplicate measurements.

FIGS. 33A and 33B depict absorbance spectra for 1:1 and 1:10 Cu and Eu at two concentrations. FIG. 33A shows the absorbance spectra for Cu and Eu with ABTS. FIG. 33B shows the absorbance spectra for Cu and Eu with DCIP. Note the shift in the peaks for ABTS and RMP, and DCIP Cu and Eu are added to solution.

FIGS. 34A and 34B depict absorbance spectra for 1:1 and 1:10 Cu and Eu at two concentrations. FIG. 34A shows the absorbance spectra for Cu and Eu with RMP. FIG. 34B shows the absorbance spectra for Cu and Eu with BEBP. Note the shift in the peaks for DCIP when Cu and Eu are added to solution, and no shift is present in the BEBP spectra when Cu and Eu are added.

FIG. 37A shows copper recovery at 1 mL/min at with varying acids and varying acid concentration. FIG. 37B shows copper recovery with 10% acid at three different flow rates. The error bars represent analytical error.

FIGS. 38A and 38B depict the results of europium recovery experiments. FIG. 38A shows europium recovery at 1 mL/min at with varying acids and varying acid concentration. FIG. 38B shows europium recovery with 10% acid at three different flow rates. The error bars represent analytical error.

FIGS. 39A to 39D depict the amount of Fe leached from the CNT filter in Cu and Eu recovery experiments. FIG. 39A shows the amount of Fe leached from Cu samples at 1 mL/min flow rate and various concentrations. FIG. 39B shows the amount of Fe leached from Cu samples at 10% acid and various flow rates. FIG. 39C shows the amount of Fe leached from Eu samples at 1 mL/min flow rate and various concentrations. FIG. 39D shows the amount of Fe leached from Eu samples at 10% acid and various flow rates.

FIGS. 40A and 40B depict the destruction of CNT filters by concentrated acid rinses. FIG. 40A depicts a Cu filter destroyed by 50% $HNO_3$ during surface washing. FIG. 40B depicts a Eu filter destroyed by 50% $HNO_3$ during surface washing. In normal surface washing experiments, the filter was rinsed with acid over the effluent bottle and effluent was analyzed via ICPMS to calculate metal recovery for this method (i.e., no CNT filter was in the bottle). Here, the filters were held over the plastic effluent bottles and rinsed with 50% $HNO_3$ and were instantly degraded, falling into the effluent bottle before the experiment was complete.

FIG. 41A is a chart showing Cu and Fe recovered from a blank filter, the Cu cathode, and Cu anode. FIG. 41B is a chart showing Eu and Fe recovered from a blank filter, the Eu cathode, and Eu anode. FIG. 41C is a chart showing the mass balance of material recovered from this digestion technique (i.e., the sum of the cathodic and the anodic deposited metal relative to the calculated deposited amount; 102±3% Cu; 94±1% Eu). The error bars represent analytical error, and the blank filter in (a) and (b) are the same filter, shown twice for comparison to each metal.

FIG. 43A is a plot of the molar flux over the flow rate range of 1 to 5 mL/min. FIG. 43B is a plot of the mass flux over the flow rate range of 1 to 5 mL/min.

FIG. 44A is a representative filter showing the Eu metal deposition pattern, dictated by the Ti shim. FIG. 44B is a representative filter showing the heterogeneous Cu metal deposition from gas bubbles blocking metal deposition sites.

FIG. 45 is a series of photographs of the anode and cathode and anode of three backflushing experiments with 1, 10 and 50% $HNO_3$. The integrity of the filters decreases as the acid concentration increases.

FIG. 46A is a design schematic of the modified commercial filtration casting (not drawn to scale) consisting of (1) a stainless steel mesh, (2) CNT membrane cathode, (3) PVDF membrane acting as an insulating layer, (4) CNT membrane anode, (5) stainless steel mesh. FIG. 46B is a photograph showing the assembled apparatus from the cartridge to the electrochemical filter with the (6) anodic electrode in contact with the stainless steel mesh, and the (7) cathodic electrode in contact with the stainless steel mesh.

FIGS. 47A to 47C depict the effect of adjusting pH between individual filtration chambers in an exemplary apparatus. FIG. 47A is a schematic of the method. FIG. 47B is a plot showing the distribution of bulk metals and RESE between stages of an exemplary two-chamber apparatus. FIG. 47C is pie chart showing the composition of the stage 2 filter.

DETAILED DESCRIPTION

Figure 1:
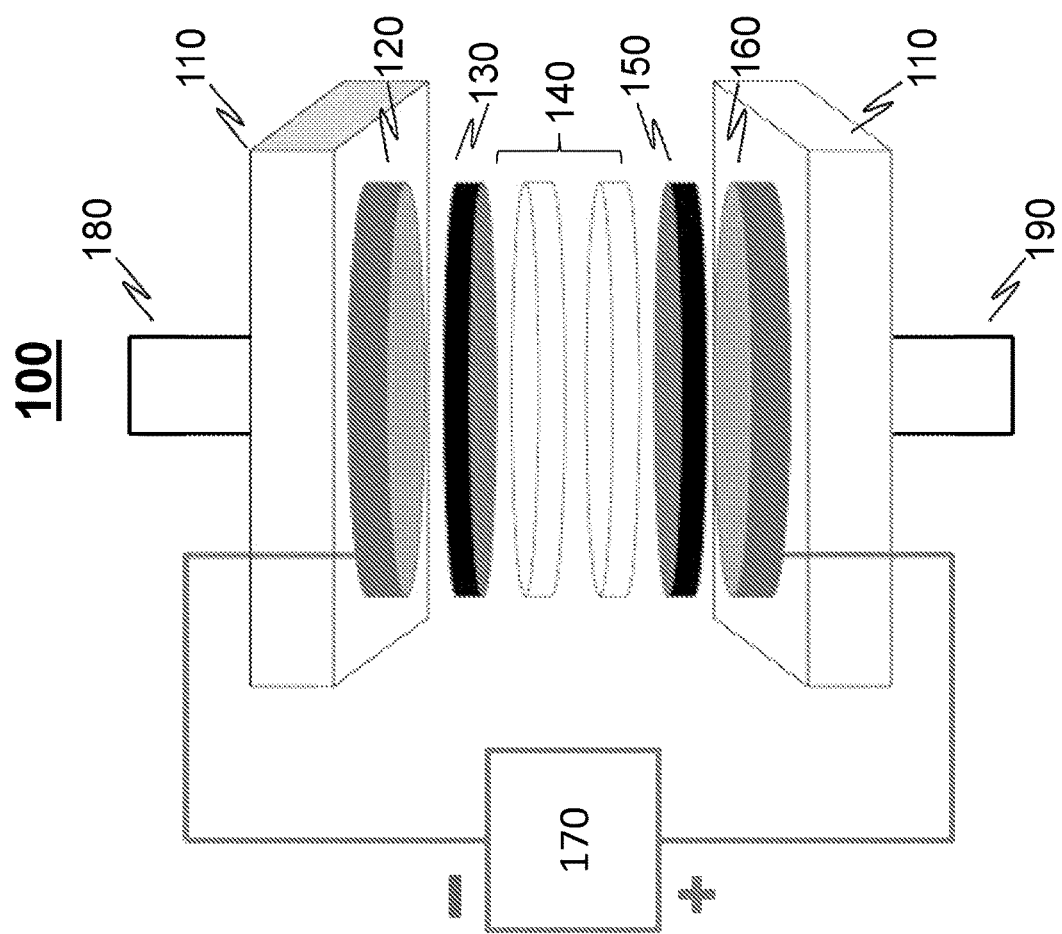
FIG. 1 is a schematic of exemplary filtration chamber 100.

It is to be understood that the Figures and descriptions of the present invention have been simplified to illustrate elements that are relevant for a clear understanding of the present invention, while eliminating, for the purpose of clarity, many other elements found in the art related to filtration apparatuses and the recovery of metals. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods, materials and components similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

DESCRIPTION

In one aspect, the present invention utilizes the concept of electrochemical precipitation and the exceptional properties of conductive carbon nanotube (CNT) filters as a cathode material to exploit differences in reduction potentials and/or solubility to recover metals of interest (Schnoor and Vecitis, The Journal of Physical Chemistry C 2013, 117, (6), 2855-2867). The present invention introduces a new method to reclaim and separate valuable materials from industrial waste streams (e.g., e-waste and manufacturing process waters), facilitating closed loop manufacturing and decreasing losses from the material supply chain at a product's end-of-life.

As contemplated herein, the present invention relates in part to a novel filtration apparatus for the separation of multiple metals from a solution thereof by passing the solution through one filtration chamber or a plurality of filtration chamber, inside which voltages are applied to a carbon nanotube filter. Metals that are easily reduced are removed from the solution by the first filters in the series, while metals that are not easily reduced are removed from the later filters. The carbon nanotubes provide at least two functions: (1) transport of electrons and (2) a high surface area on which metals can nucleate and grow larger metal crystals and/or on which metals can be collected.

In another aspect, the invention relates to a method of recovering metals from a sample such as a solution passing the sample through a plurality of filtration chambers. Metals that are more easily reduced are captured on the carbon nanotube filters of early filtration chambers, while metals that are less easily reduced are captured on the carbon nanotubes filters of later filtration chambers.

Filtration Apparatus

As contemplated herein, the present invention relates to a filtration apparatus for the separation of metals from a mixture thereof. The apparatus comprises at least one filtration chamber 100. The filtration chamber is surrounded by a non-conductive casing 110, and consists of a conducting metal anode shim 120, a conducting metal cathode shim 160, a CNT(−) filter 130 comprising carbon nanotubes, and a non-conducting material 140 between the CNT(−) filter and the anode. The anode and the cathode are connected to a voltage source 170 that applies a potential between the anode and the cathode. The filtration chamber further comprises inlet port 180 and outlet port 190.

In some embodiments, the filtration apparatus comprises one filtration chamber. In some embodiments, the filtration apparatus comprises a plurality of filtration chambers. In some embodiments, the plurality of filtration chambers are connected in series.

The non-conductive casing 110 can be made of any non-conducting material as is familiar to those of ordinary skill in the art, including plastics, composite polymers, glass, porcelain, Teflon, and rubber. In some embodiments, the non-conductive casing is made of polycarbonate or polypropylene.

Conducting metal anode shim 120 and conducting metal cathode shim 160 serve as electrical contacts. The shims are perforated in such a way as to allow the passage of solution through the shims. The shims can be made of any conducting material known in the art, including, but not limited to, metals and metal alloys. In one embodiment, at least one shim is made of titanium. In one embodiment, at least one shim is made of stainless steel. In some embodiments, the shims are perforated with multiples holes across the surface. In some embodiments, there is no particular limit to the size or arrangement of the holes on the surface of the shims. In some embodiments, the shims have a single hole to allow the passage of solution. In some embodiments, the shims are mesh or mesh-like. In some embodiments, the shims are disc-shaped.

Conducting metal anode shim 120 and conducting metal cathode shim 160 are connected to a voltage source 170. In some embodiments, voltage source 170 is integrated with a computing platform capable of data presentation and analysis, as would be understood by one skilled in the art. In some embodiments, voltage source 170 is integrated with a computing platform capable of applying a different voltage to each filtration chamber in series.

CNT(−) filter 130 is a carbon nanotube filter and comprises carbon nanotubes. The carbon nanotube filter can be manufactured by any method known in the art. In one embodiment, the carbon nanotubes are multi-walled. In another embodiment, the carbon nanotubes are single-walled. The carbon nanotubes can be randomly oriented, oriented normal to the flow of solution, oriented parallel to the flow of solution, or any combination of orientations. In some embodiments, filtration chamber 100 further comprises CNT(+) filter 150, which is a carbon nanotube filter and comprises carbon nanotubes.

The carbon nanotube filter can have a uniform pore size or a distribution of pore sizes. In some embodiments, the carbon nanotube filter can have a pore size distribution ranging from about 0.1 nm to about 5 μm, about 0.5 nm to about 5 μm, about 1 nm to about 5 μm, about 5 nm to about 5 μm, from about 10 nm to about 2 μm, from about 30 nm to about 1 μm, from about 50 nm to about 500 nm, or from about 50 nm to about 200 nm. In one embodiment, the carbon nanotube filter material has a pore size of about 50 nm to about 200 nm. In some embodiments, the carbon nanotube filter has an average pore size of at least about 0.1 nm, at least about 0.5 nm, at least about 1 nm, at least about 5 nm, at least about 10 nm, at least about 20 nm, at least about 30 nm, at least about 40 nm, at least about 50 nm, at least about 60 nm, at least about 70 nm, at least about 80 nm, at least about 90 nm, at least about 100 nm, at least about 250 nm, at least about 500 nm, or at least about 1 µm.

In some embodiments, the carbon nanotube filter is disc-shaped. In some embodiments, the thickness of the carbon nanotube filter can range from about 5 µm to about 1000 µm, from about 5 µm to about 500 µm, from about 5 µm to about 250 µm, from about 10 nm to about 100 µm, or from about 15 µm to about 80 µm. In one embodiment, the filter material has a thickness of about 10 µm to about 30 µm. In one embodiment, the filter material has a thickness of about 25 µm to about 80 µm.

In some embodiments, at least a portion of the carbon nanotubes are doped carbon nanotubes. As used herein, the term "doped" is used in reference to the presence of at least one ion or atom, other than carbon, in the crystal structure of the carbon nanotubes. That is, doped carbon nanotubes have at least one carbon in the hexagonal ring replaced with a non-carbon atom. Examples of non-carbon atoms include, without limitations, a trivalent atom or p-type dopant (e.g., elements with three valence electrons such as boron or aluminum), a pentavalent atom or a n-type dopant (e.g., elements with five valence electrons such as nitrogen and phosphorous), a halogen (e.g., F, Cl, or Br) and any combinations thereof. In some embodiments, the doped carbon nanotubes can be nitrogen-doped carbon nanotubes. In some embodiments, the doped carbon nanotubes can be boron-doped carbon nanotubes. In some embodiments, the doped carbon nanotubes can be fluorine-doped carbon nanotubes, e.g., by fluorination. Doping can influence the physical and/or chemical properties of the carbon nanotubes such as conductivity and specific capacitance, and thus the electrochemical activity of the CNT filter material.

In some embodiments, the carbon nanotubes are processed using treatments that modify their structure and modulate their electrochemical or metal-binding properties relative to unmodified carbon nanotubes. In one embodiment, the carbon nanotubes are subjected to processing treatments to modify surface chemistry, such as is known in the art. Examples of such processing treatments include, but are not limited to, plasma polymerization, high-temperature heating, silanization, acid-oxidation, calcination, and any combinations thereof. Depending on desired properties of the CNTs, one of skill in the art can perform appropriate art-recognized surface treatments accordingly.

In some embodiments of the invention, the carbon nanotubes are encapsulated in an encapsulating material that modulates the metal-binding activity, the electrochemical activity, the average pore size, or the mechanical strength of the carbon nanotube filters. In some embodiments, the carbon nanotubes are encapsulated in a polymer matrix. Exemplary materials include, but are not limited to: polyvinyls, polyacrylates, polyurethanes, boron nitride, peptides, silicones, polysiloxanes/silicones, and combinations thereof. In one embodiment, the carbon nanotubes are encapsulated in poly(vinyl alcohol). In one embodiment, the carbon nanotubes are encapsulated in polyurethane. In one embodiment, the carbon nanotubes are encapsulated in polytetrafluoroethylene or polyvinylidene fluoride. In some embodiments, the carbon nanotube filter comprises a polymer matrix that modulates the metal-binding activity, the electrochemical activity, the average pore size, or the mechanical strength of the carbon nanotube filter.

In some embodiments, the carbon nanotubes or the encapsulating material is derivatized or functionalized with one or more functional groups. The functionalization of the carbon nanotubes or the encapsulating material can be covalent or non-covalent. In some embodiments, the carbon nanotubes or the encapsulating material can be derivatized or functionalized on their ends or sides with functional groups, such as carboxylic acid, alkyl, acyl, aryl, aralkyl, halogen; substituted or unsubstituted thiol; unsubstituted or substituted amino; hydroxy, and OR' wherein R' is selected from the group consisting of alkyl, acyl, aryl aralkyl, unsubstituted or substituted amino; substituted or unsubstituted thiol, and halogen; and a linear or cyclic carbon chain optionally substituted with one or more heteroatom. The number of carbon atoms in the alkyl, acyl, aryl, aralkyl groups can vary depending on types and/or sizes of the functional groups. In some embodiments, the number of carbon atoms in the alky, acyl, aryl, aralkyl groups can be in the range of about 1 to about 30, and in some embodiments in the range of about 1 to about 10. In some embodiments, the carbon nanotubes or the encapsulating material can be derivatized or functionalized with at least one aryl group or at least one aromatic-type molecules such as pyrene and naphthalene.

In some embodiments, the derivatization or functionalization of the carbon nanotubes or encapsulating material can provide additional metal support to enhance metal binding and promote reduction in the presence of the carbon nanotubes, e.g., by promoting chemical bonding, chelating or creating a polar attraction of the metal to the ends and/or sidewalls of the carbon nanotubes. For example, carboxylic acid functional groups on a carbon nanotube can bond, chelate or provide a polar attraction to a metal ion and promote a metal-nanotube interaction. The functionality on the carbon nanotubes can provide "docking sites" for the metal.

In some embodiments, the carbon nanotubes or encapsulating material comprise a chelating agent. In some embodiments, the chelating agent is an oligomeric chelating agent present along with the carbon nanotubes within the filter. Exemplary oligomeric chelating agents include, but are not limited to, poly(styrene sulfonic acid), poly(vinyl sulfonic acid), poly(acrylic acid), poly(methacrylic acid), poly(acrylate), poly(methacrylate), poly(alkacrylate), poly(maleic acid), poly(vinyl acetate), poly(vinyl alcohol), poly(acrylamide), poly(cyanoacrylate), cellulosic materials, or mixtures or copolymers thereof. In some embodiments, the chelating agent is a small molecule or non-oligomeric chelating agent. In some embodiments, the chelating agent is selected for its ability to bind a particular metal. In another embodiment, the chelating agent is non-selective. Appropriate chelating agents will be known to those of skill in the art. Examples of chelating agents include, but are not limited to, aminopolyacetic acid-type chelating agents such as EDTA (ethylene diamine tetraacetate), DTPA (diethylenetriaminepentaacetic acid), HEDTA ((N-(hydroxyethyl)-ethylenediaminetriacetic acid)), NTA (N,N-bis(carboxymethyl)glycine), acrylic and polyacrylic acid-type stabilizing agents, phosphonic acid, and phosphonate salts including 1-hydroxy ethylidene-1,1-diphosphonic acid ($CH_3C(PO_3H_2)_2OH$) (HEDP), amino[tri(methylene phosphonic acid)] (ATMP), ethylene diamine[tetra methylene-phosphonic acid)], 2-phosphene butane-1,2,4-tricarboxylic acid (PBTC), diglycoamides, diones, crown ethers, cyclodextrins, calixarenes, diamines, polyamines, heteroaromatic chelating agents, and salts and/or combinations thereof.

In some embodiments, the chelating agent is covalently bound to the carbon nanotubes. In some embodiments, the chelating agent is covalently bound to the encapsulating material. In some embodiments, the chelating agent is bound to the carbon nanotube through a tether moiety. In some embodiments, the chelating agent is bound to the encapsulating material through a tether moiety. Exemplary tethers include polysiloxanes, polyolefins, polyacrylates, polyalkacrylates, polycarbonates, perfluorinated polymers, halogenated polymers, polyimides, polyimines, conjugated polymers, polyketones, polyethers, polyurethanes, polylactides, perfluorinated polymers such as PTFE, halogenated polymers such as PVDF, PVC, PVDC, and the like, polyimides such as poly(alkacrylamide)s, e.g., poly(methacrylamide), and/or poly(acrylamide); polyimines such as PEI copolymers, or a combination or copolymer thereof. Ideally the tether is inert to electrochemical processes at the voltages supplied to the filter system and to acid treatment.

In some embodiments, the carbon nanotubes are functionalized with electron shuttle molecules. Electron shuttle molecules induce the tunneling of electrons from a negative electrode to a metallic particle. Exemplary electron shuttles include gold nanoparticles, bis-oxazoles, oligoanilines, and n- and p-type organic molecules as known to those of skill in the art. In some embodiments, the electron shuttle molecule is a redox mediator. Exemplary redox mediators include, but are not limited to, 2,2'-azino-bis(3-ethylbenzothiazoline-6-sulfonic acid) (ABTS), 2,6-dichloroindophenol (DCIP), riboflavin 5'-monophosphate (RMP), ethyl viologen (1,1'-bis(ethyl)-4,4'-bipyridinium or BEBP), Paraquat, ferrocene monocarboxylic acid, ferrocyanide, hexaamine ruthenium, 1,4-naphthoquione, resorufine, cyanomethylviologen, diquat, triquat, 1,1'-bis(2-sulfoethyl)-4,4'-bipyridinium, 1,1'-dibenzyl-4,4'-bipyridinium, 4,4'-dicarboxy-2,2'-bipyridyl, 1-hydroxybenzotriazole, veratryl alcohol, violuric acid, 2-methoxy-phenothiazone, 3-hydroxyanthranilic acid, anthraquinone 2,6-disulfonic acid, N-hydroxyacetanilide, phenol red, 3,3',5,5'-tetramethyl benzidine, dichlorophenol red, 2,2',6,6'-tetramethylpiperidine-N-oxyl radical, syringaldehyde and acetosyringone, 2,2,6,6-tetramethylpiperidin-1-yl)oxyl (TEMPO), 2,2'7,7'-tetrakis-(N,N-di-p-methoxyphenyl-amine)-9,9'-spirobifluorene (spiro-MeO-TAD), sodium anthraquinone-2,6-di sulphonate (AQDS), and analogs, salts, and/or combinations thereof.

In one embodiment, the redox mediator is covalently bound to the carbon nanotubes or to the encapsulating material. In one embodiment, the redox mediator is non-covalently bound to the carbon nanotubes or to the encapsulating material. In one embodiment, the redox mediator is bound to the carbon nanotubes or to the encapsulating material via electrostatic, hydrophobic, or pi-stacking interactions. In one embodiment, the redox mediator is bound to the carbon nanotubes or to the encapsulating material via a tether moiety.

Non-conducting layer 140 comprises an electrochemically inert material and is present between the two electrodes to prevent a short-circuit of the system. The non-conducting layer can be made of any non-conducting material as is familiar to those of ordinary skill in the art, including plastics, composite polymers, glass, porcelain, Teflon, and rubber. In one embodiment, the non-conducting layer comprises PTFE (poly(tetrafluoroethylene)). In one embodiment, the non-conducting layer comprises PVDF (poly(vinylidene difluoride)) In some embodiments, the non-conducting layer is perforated to allow the passage of a solution. In some embodiments, the non-conducting layer is a mesh or is mesh-like.

Inlet port 180 allows for the flow of a sample into the filtration chamber. Outlet port 190 allows for the flow of a processed sample out of the filtration chamber. There is no particular limit to the size, shape, or composition of inlet port 180 or outlet port 190. In one embodiment, inlet port 180 and outlet port 190 comprise fittings that allow multiple filtration chambers to be connected in series via said ports.

In some embodiments, the filtration apparatus comprises a pressure release valve. In one embodiment, the pressure release valve is designed to release gas generated within the filtration chamber. In one embodiment, the pressure valve prevents the release of liquids contained within the filtration apparatus. In one embodiment, the pressure valve comprises an $H_2$ separator. In one embodiment, $H_2$ generated within the filtration apparatus is collected in a separate vessel.

Methods of the Invention

Figure 2:
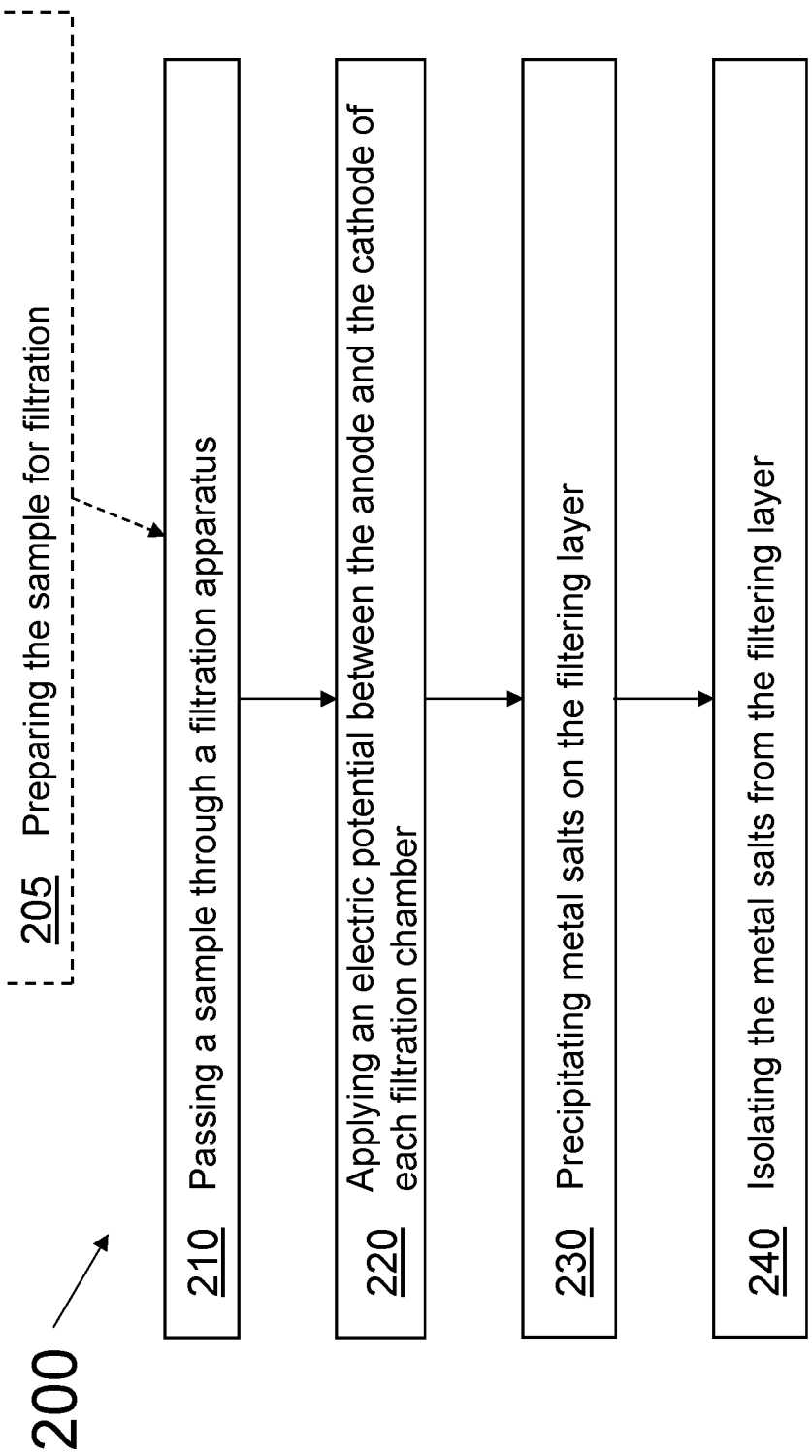
FIG. 2 is a flowchart of exemplary method 200.
Figure 3:
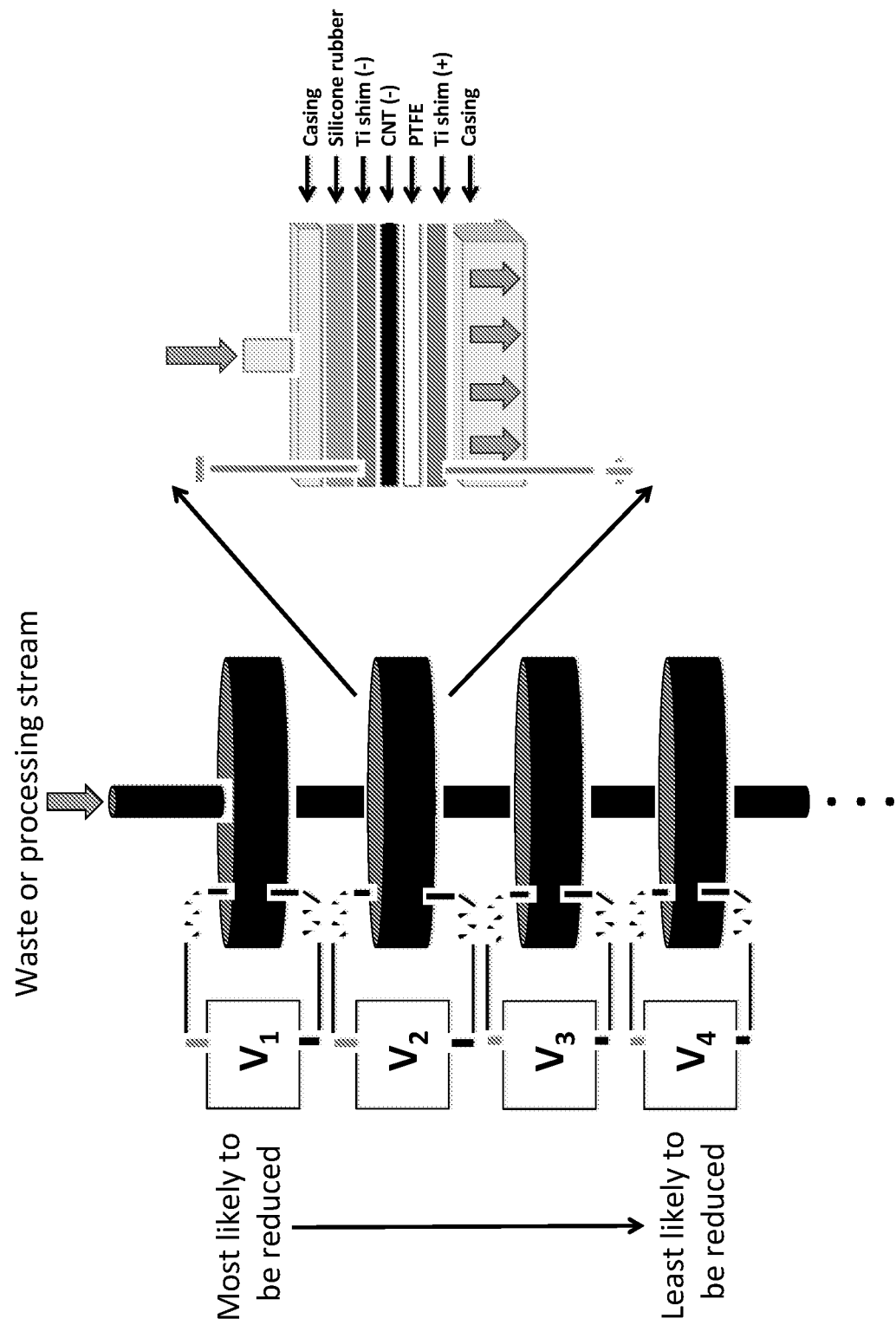
FIG. 3 depicts a schematic of an exemplary filtration apparatus. Left: Stacked filtration chambers in series where each black filtration chamber can reclaim a different metal based on a specific voltage applied, labeled $V_1$-$V_4$. Right: Representative exploded view of the filtration chamber. Each part of the chamber is labeled with the materials used in the prototype.

In one aspect, the present invention relates to a method of separating metals from a sample. Exemplary method 200 is presented in FIG. 2. In step 210, a sample is passed through a filtration apparatus. The filtration apparatus comprises a plurality of filtration chambers, each having a filtering layer between an anode and cathode, housed in a non-conductive casing with an inlet port and an outlet port, wherein the plurality of filtration chambers are arranged in series. In step 220, an electric potential is applied between the anode and the cathode of the filtration chamber. In step 230, metal salts are precipitated on the filtering layer. In step 240, the metal salts are isolated from the filtering layer.

In some embodiments, additional chambers can be connected between filtration chambers. In some embodiments, additional inlets or outlets can be connected between filtration chambers. In one embodiment, the additional chambers can be used to apply a chemical treatment to the solution before application of the next filter. Exemplary chemical treatments may include, but are not limited to, deaeration, the addition of chemical agents such as electrolytes, organic compounds, or redox mediators, and the adjustment of solution pH. In one embodiment, the pH of the sample is adjusted before the sample is passed through each filtration chamber. In one embodiment, the pH of the solution can be tuned to promote the capture of a particular metal to the exclusion of other metals. The pH of the solution can be modified using any method known in the art, including the addition of acids, bases, or buffering agents.

In one embodiment, the sample to be processed comprises an aqueous solution. In one embodiment, the sample comprises a gaseous mixture. In one embodiment, the sample comprises a solution in organic solvent. In one embodiment, the sample comprises an ionic liquid. In one embodiment, the sample comprises a non-aqueous liquid. In one embodiment, the sample comprises a suspension, colloid, or heterogenous mixture in water or any other solvent. In one embodiment, the sample comprises waste from a manufacturing process, such as the manufacturing of nanotechnology. In one embodiment, the sample comprises waste from a hydrometallurgical process. In one embodiment, the sample comprises an industrial waste stream. In one embodiment, the sample comprises e-waste. In one embodiment, the sample comprises a mixed metal stream. In one embodiment, the sample comprises waste from a silica/silicon production facility. In one embodiment, the sample is a continuous stream.

In one embodiment, the sample comprises at least one soluble metal or metal ion. In one embodiment, the sample comprises a plurality of soluble metals. In one embodiment, the sample comprises at least one of a transition metal, a rare earth element, a specialty element, a metalloid, a lanthanide, or an actinide. In one embodiment, the sample comprises a radioactive element. In one embodiment, the sample comprises a quantifiable amount of rare earth and specialty elements (RESE). In one embodiment, the sample comprises a metal selected from the group consisting of Nd, Fe, Al, Cu, Ag, Au, Co, Ni, Tb, Pr, Ga, As, Zn, Dy, Ce, Eu, and Pt.

In one embodiment, the rate at which the sample is passed through the filtration apparatus is modulated by a pump. Non-limiting examples of pumps include micromachined pumps, reciprocating pumps, peristaltic pumps, diaphragm pumps, syringe pumps, volume occlusion pumps and other pumping means known to those skilled in the art. In some embodiments, the sample can be introduced through the filter system by applying a positive force. In some embodiments, the sample is pulled through the filtration apparatus by vacuum suction. In one embodiment, the sample is forced through the filtration apparatus using the force of gravity. In one embodiment, the flow rate of the sample through the filtration apparatus can be controlled via integration with a computing platform. In one embodiment, the flow rate can be adjusted prior to each filter in the series. In one embodiment, the flow rate can range from about 500 µL/min to about 10 mL/min, from about 1 mL/min to about 8 mL/min, or from about 1 mL/min to about 5 mL/min. It should be appreciated that a higher or a lower flow rate can be accommodated with various designs of the filtration apparatus, e.g., by increasing or reducing the surface area of the carbon nanotube filter as well as the filtration chamber.

In one embodiment, the plurality of filtration chambers are connected in series. The filtration chambers comprise filtering layers as discussed elsewhere herein. In one embodiment, the filtering layer is a CNT(−) filter. When an electric potential is applied between the anode and the cathode of each filtration chamber in step 220, metal and/or oxygen reduction occurs on the CNT(−) filter or in the bulk solution, resulting in the collection of metals on the CNT(−) filter as their respective oxide salts or free metals. In some embodiments, the electric potential is selected to capture a specific metal or metal salt. In some embodiments, a lower voltage is applied to carbon nanotube filters at the start of the series and a higher voltage is applied to carbon nanotube filters at the end of the series. In some embodiments, a higher voltage is applied to carbon nanotube filters at the start of the series and a lower voltage is applied to carbon nanotube filters at the end of the series. In one embodiment, the electric potential applied between the anode and the cathode of each filtration chamber is between about 0.1 V and about 10.0 V, between about 0.1 V and about 5.0 V, or between about 0.1 V and about 3.0 V, or between about 0.25 V and about 3.0 V. In one embodiment, the applied electric potential is about 0.25 V. In one embodiment, the applied electric potential is about 0.50 V. In one embodiment, the applied electric potential is about 0.75 V. In one embodiment, the applied electric potential is about 1.00 V. In one embodiment, the applied electric potential is about 1.25 V. In one embodiment, the applied electric potential is about 1.50 V. In one embodiment, the applied electric potential is about 1.75 V. In one embodiment, the applied electric potential is about 2.00 V. In one embodiment, the applied electric potential is about 2.25 V. In one embodiment, the applied electric potential is about 2.50 V. In one embodiment, the applied electric potential is about 2.75 V. In one embodiment, the applied electric potential is about 3.00 V.

The application of electric potential in step 220 results in the precipitation of metal salts in step 230. In one embodiment, the metal salt precipitates as a metal oxide. In one embodiment, the metal salt precipitates as a metal halide. In one embodiment, the metal salt precipitates as a metal chloride. In one embodiment, the metal salt precipitates as a zero-valent metal. In one embodiment, the form of the metal salt precipitate can depend on the voltage applied and on the conditions of the sample. In one embodiment, the sample conditions such as pH and oxygen content can be tuned to precipitate a desired metal salt species.

In step 240, the metal salt is isolated from the filtering layer. In one embodiment, the plurality of filtration chambers are disconnected from the filtration apparatus prior to isolating the metal salt from the filtering layer. In one embodiment, the filtration chamber is disassembled so that the CNT(−) filter is accessible. In one embodiment, the CNT(−) filter is destroyed when the metal salt is isolated. In one embodiment, the CNT(−) filter is not destroyed when the metal salt is isolated. In one embodiment, the CNT(−) filter is reusable. In one embodiment, step 240 comprises the step of mechanically scraping the metal salt from the CNT(−) filter. In one embodiment, step 240 comprises the step of subjecting the CNT(−) filter to ultrasonic irradiation. In one embodiment, step 240 comprises the step of oxidizing the filter at a temperature greater than 400° C. followed by treatment with concentrated $HNO_3$, HCl, or a combination thereof. In some embodiments, the filter is oxidized at a temperature of about 400° C., about 450° C., about 500° C., about 550° C., about 600° C., about 650° C., or a combination or temperature program thereof.

In one embodiment, step 240 comprises the step of subjecting the CNT(−) filter or the filtration chamber to a chemical treatment. Exemplary chemical treatments include, but are not limited to, acid, base, oxidants, reductants, chelating agents, and combinations thereof. In one embodiment, the metal salt is reduced by modulating the electric potential applied to the filtration chamber. In one embodiment, the metal salt is removed by passing an acid through the filtration chamber or by rinsing the CNT(−) filter in acid. Exemplary acids include $H_2SiF_6$, HCl, HF, $HNO_3$ and $H_2SO_4$, $H_3PO_4$, and $CH_3COOH$. There is no particular limit to the concentration of the acid. In one embodiment, the acid concentration is between about 1% v/v and about 50% v/v in water. In one embodiment, the acid concentration is between about 1% v/v and about 10% v/v.

In one embodiment, method 200 further comprises step 205, wherein the sample is prepared for filtration. In one embodiment, the sample is prepared using treatments including, but not limited to, filtration, ion exchange, degassing or removal of dissolved $O_2$, adjustment of pH, dilution, concentration, and addition of chemical agents.

In one embodiment, the chemical agent is a redox mediator. Exemplary redox mediators include, but are not limited to, 2,2'-azino-bis(3-ethylbenzothiazoline-6-sulfonic acid) (ABTS), 2,6-dichloroindophenol (DCIP), riboflavin 5'-monophosphate (RMP), ethyl viologen (1,1'-bis(ethyl)-4,4'-bipyridinium or BEBP), Paraquat, ferrocene monocarboxylic acid, ferrocyanide, hexaamine ruthenium, 1,4-naphthoquinone, resorufine, cyanomethylviologen, diquat, triquat, 1,1'-bis(2-sulfoethyl)-4,4'-bipyridinium, 1,1'-dibenzyl-4,4'-bipyridinium, 4,4'-dicarboxy-2,2'-bipyridyl, 1-hydroxybenzotriazole, veratryl alcohol, violuric acid, 2-methoxy-phenothiazone, 3-hydroxyanthranilic acid, anthraquinone 2,6-disulfonic acid, N-hydroxyacetanilide, phenol red, 3,3', 5,5'-tetramethyl benzidine, dichlorophenol red, 2,2', 6,6'-tetramethylpiperidine-N-oxyl radical, syringaldehyde and acetosyringone, 2,2,6,6-tetramethylpiperidin-1-yl)oxyl (TEMPO), 2,2'7,7'-tetrakis-(N,N-di-p-methoxyphenyl-amine)-9,9'-spirobifluorene (spiro-MeOTAD), sodium anthraquinone-2,6-di sulphonate (AQDS), and analogs, salts, and/or combinations thereof.

In one embodiment, the sample concentration is increased by removal of water. In one embodiment, the sample concentration is decreased by addition of water. There is no particular limit to the concentration of soluble metal or metal ion in the sample. In one embodiment, the concentration of total metal ions in the sample is between 100 ppb and 1000 ppm. In one embodiment, the concentration of total metal ions in the sample is between 100 ppb and 100 ppm.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compositions of the present invention and practice the claimed methods. The following working examples therefore, specifically point out the preferred embodiments of the present invention, and are not to be construed as limiting in any way the remainder of the disclosure.

Example 1: Recovery Optimization

The materials and methods employed in these experiments are now described.

Materials & Methods

Copper chloride (CuCl2; 99.999% trace metals basis (TMB)), europium chloride ($EuCl_3$; 99.99% TMB), scandium chloride ($ScCl_3$; 99.99% TMB), neodymium chloride ($NdCl_3$; ≥99.99% TMB), gallium chloride ($GaCl_3$; ≥99.99% TMB), arsenic chloride ($AsCl_3$; 99.99% TMB), sodium hydroxide (NaOH; 99.99% TMB), hydrochloric acid (HCl; TraceSELECT®), and sodium chloride (NaCl; ≥99%) were all purchased from Sigma-Aldrich (St. Louis, Mo.). Multi-walled carbon nanotube buckypaper filters encapsulated in polyvinyl alcohol were custom-made by NanoTech Labs (Yadkinville, N.C.). Hydrophilic polytetrafluoroethylene (PTFE; 5 μm pore size) membranes and sodium sulfate ($Na_2SO_4$; GR ACS grade) were purchased from EMD Millipore (Darmstadt, Germany).

All solutions for the electrochemical experiments were prepared in acid washed glassware (washed for at least one week in 25% v/v HCl followed by one week in 50% v/v $HNO_3$), with 1 mM metal and 100 mM $Na_2SO_4$ (to normalize the ionic strength; Ga was prepared with 100 mM NaCl to avoid precipitation of gallium sulfate ($Ga_2(SO_4)_3$), and tested in triplicate unless otherwise noted. Effluents were collected and quantified for each metal using inductively coupled plasma mass spectrometry (ICP-MS; Perkin-Elmer ELAN DRC-e). Filters were characterized using scanning electron microscopy (SEM-EDX; Hitachi SU-70 and Hitachi SU-8230 with a BRUKER)(Flash 5060FQ Annular EDS detector) and analyzed with x-ray photoelectron spectroscopy (XPS; Kratos Axis Ultra DLD) for elemental and metal speciation identification.

The metals tested in this study include: Cu, Eu, Sc, Nd, Ga, and As. All metals were tested over a range of voltages and pH, and three of the five metals (Cu, Eu, Sc) were tested over a range of flow rates to determine the optimum operating parameters to achieve the highest recovery. Note that not all metals were tested across the range of flow rates due to the limited sensitivity to flow rate exhibited by Cu, Eu, and Sc.

Applied voltage ranged from 0.1 V to 3.0 V (depending on the metal) while flow rate and pH were kept constant. Keeping flow rate and voltage constant, a wide range of pH values (pH 2-10) were tested, to both ascertain the potential mechanisms of removal and define ranges of function for the device across a range of waste streams with variable pH. Finally, flow rate was tested to determine if typically slow redox kinetics were a limiting step in the recovery process (i.e., if bulk transport past the filter was too fast to allow for metal reduction or precipitation and capture). Here, flow rates ranged from 1-5 mL $min^{-1}$ while pH and voltage were held constant. Experimental parameters are noted where applicable.

To elucidate the mechanism of electrochemical deposition, a single-metal experiment for Eu was conducted without the presence of dissolved molecular oxygen ($O_2$ (aq)). To achieve this, 500 mL of test solution was purged with nitrogen at 200 mL $min^{-1}$ in a 500 mL Erlenmeyer flask with an aeration stone for 90 min before the experiment to ensure no oxygen was present. During the experiment, 5 mL $min^{-1}$ Eu was delivered to the filter at 3.0 V while a constant flow of $N_2$ was pushed into the vacated headspace at 5 mL $min^{-1}$ to maintain neutral pressure and an oxygen-free environment for the duration of the experiment.

Filtration Chamber Design and Operation

Figure 4:
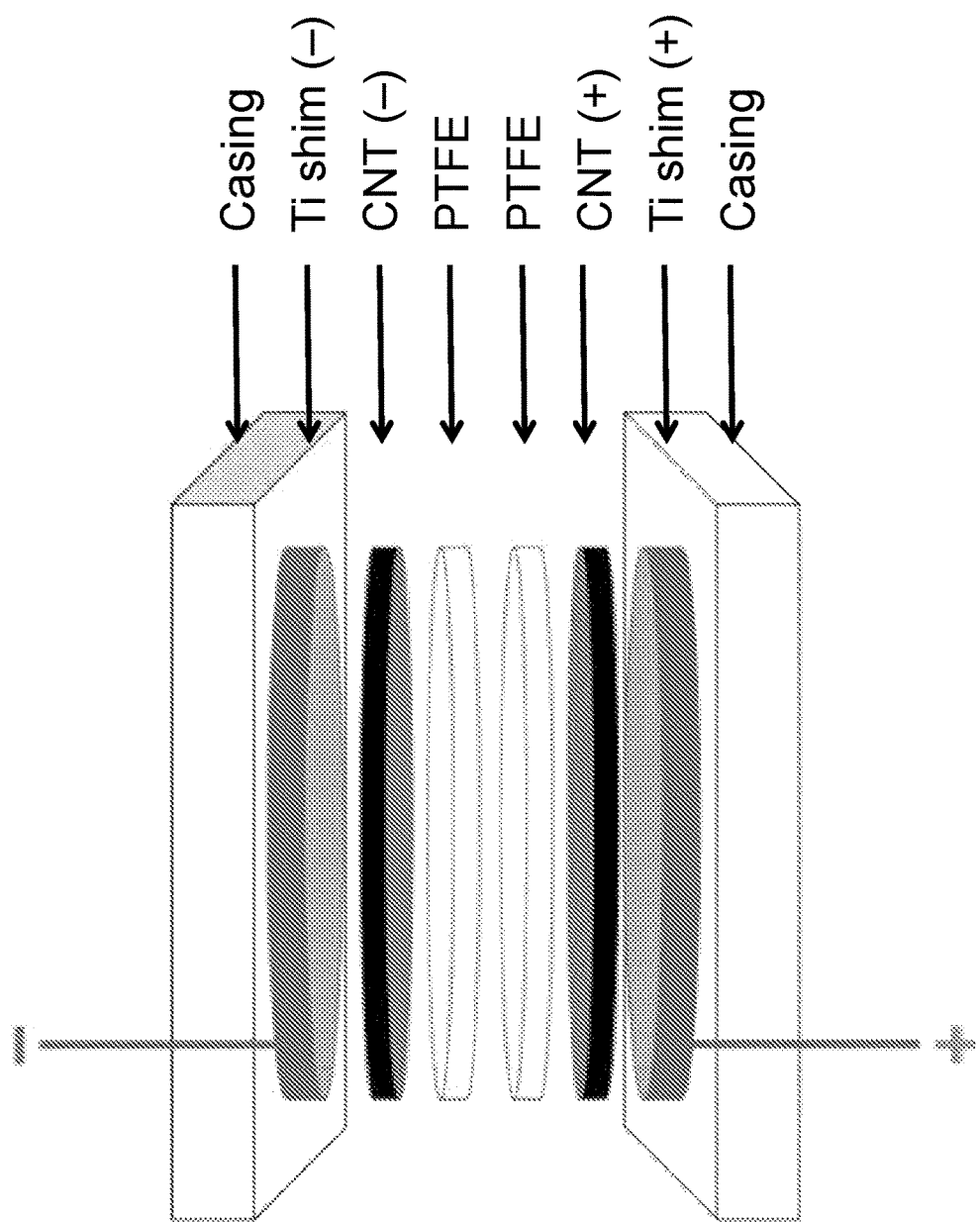
FIG. 4 depicts an exploded view of the filtration chamber stack. The components are as follows: a non-descript, non-conductive plastic casing; two perforated titanium shims (anodic and cathodic) to conduct current (a circular geometry punched with circular ports to allow bulk fluid transport); two carbon nanotube (CNT)-enabled filters (anodic and cathodic); and a teflon filter stack to enhance mechanical integrity and insulate the anodic and cathodic sides.

In the electrochemical filtration chamber (modeled after and adapted from Schnoor & Vecitis, The Journal of Physical Chemistry C 2013, 117, (6), 2855-2867), voltage was supplied to a CNT filter network to electrochemically precipitate metals. Briefly, the filtration chamber was built using a modified 47-mm polycarbonate filter housing (Whatman) with perforated Ti shims acting as the mechanical contact for both the anode and the cathode. Two, 47-mm CNT filters were inserted, one as the cathode and one as the anode, with PTFE insulation between (FIG. 4). The mechanical contacts were attached to a DC power supply (Agilent E3631A) and test solutions were delivered via a peristaltic pump to maintain a constant flow (Cole-Parmer Masterflex L/S EasyLoad Pump).

The results of the experiment are now described.

Figures 6A, 6B, 6C:
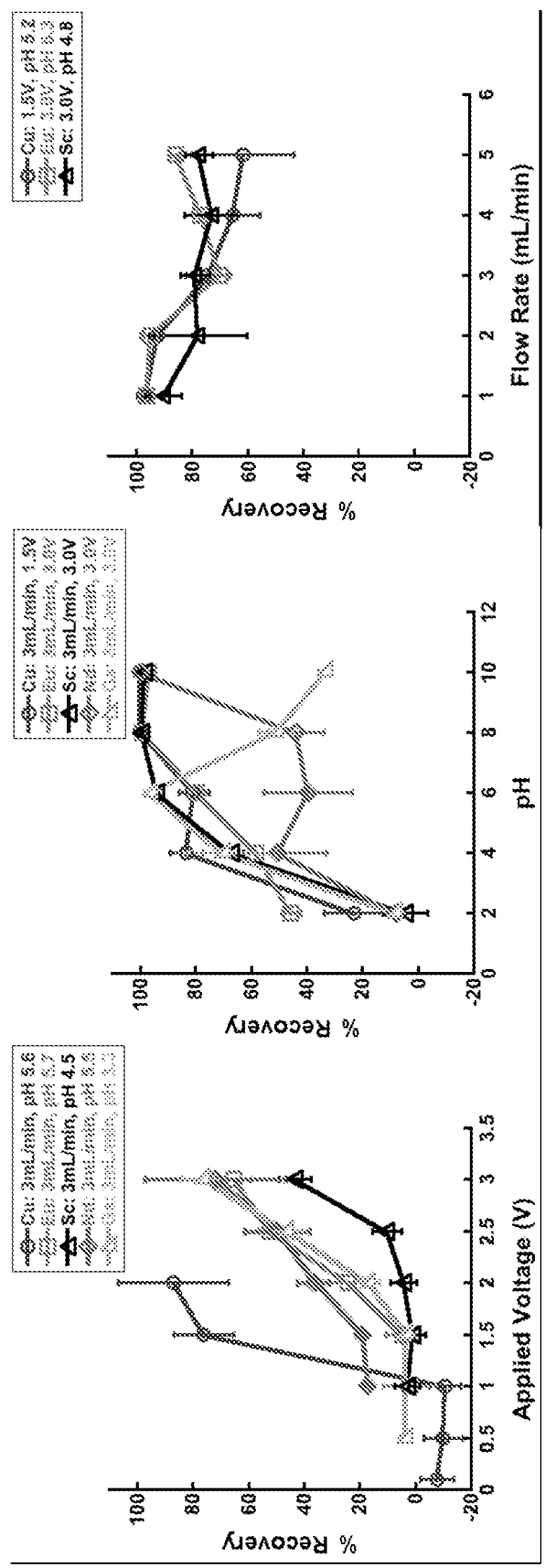
FIGS. 6A-6C, depict plots of the recovery of Cu, Sc, Eu and Nd as a function of tested variables. Blue circles represent Cu, red squares represent Eu, black triangles represent Sc, and green diamonds represent Nd. Note that only one parameter was varied at a time where others were fixed.
Figure 12:
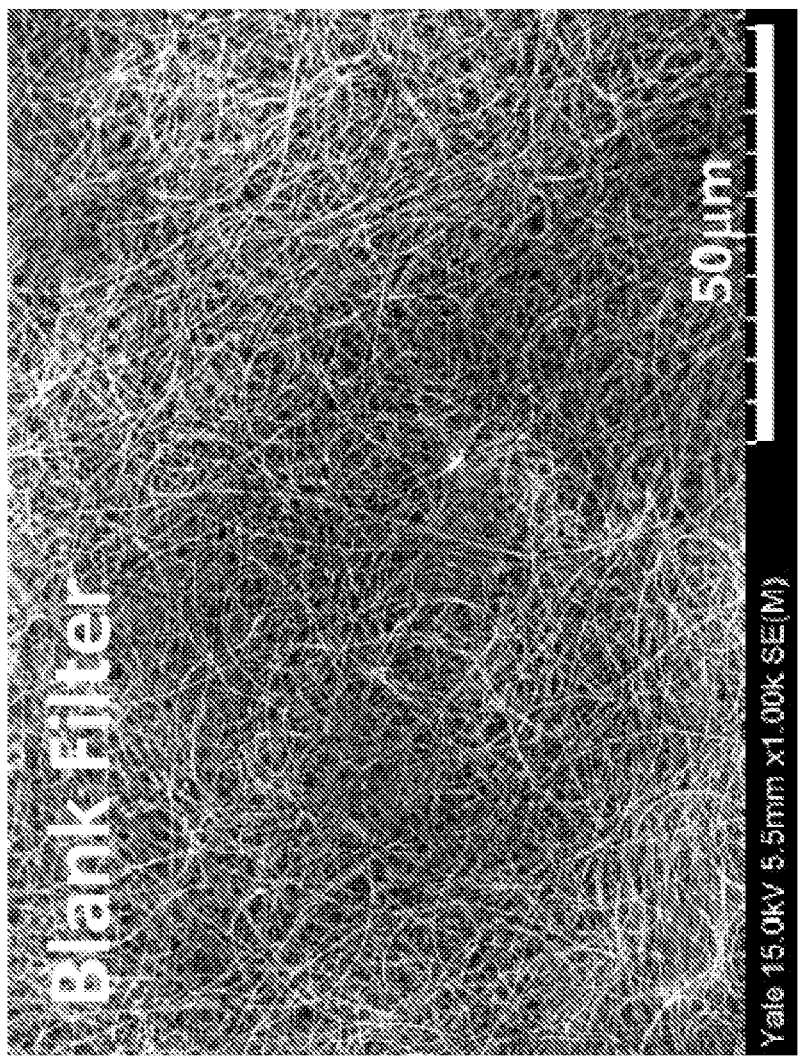
FIG. 12 is a SEM of a blank carbon nanotube filter encapsulated in polyvinyl alcohol.
Figure 13:
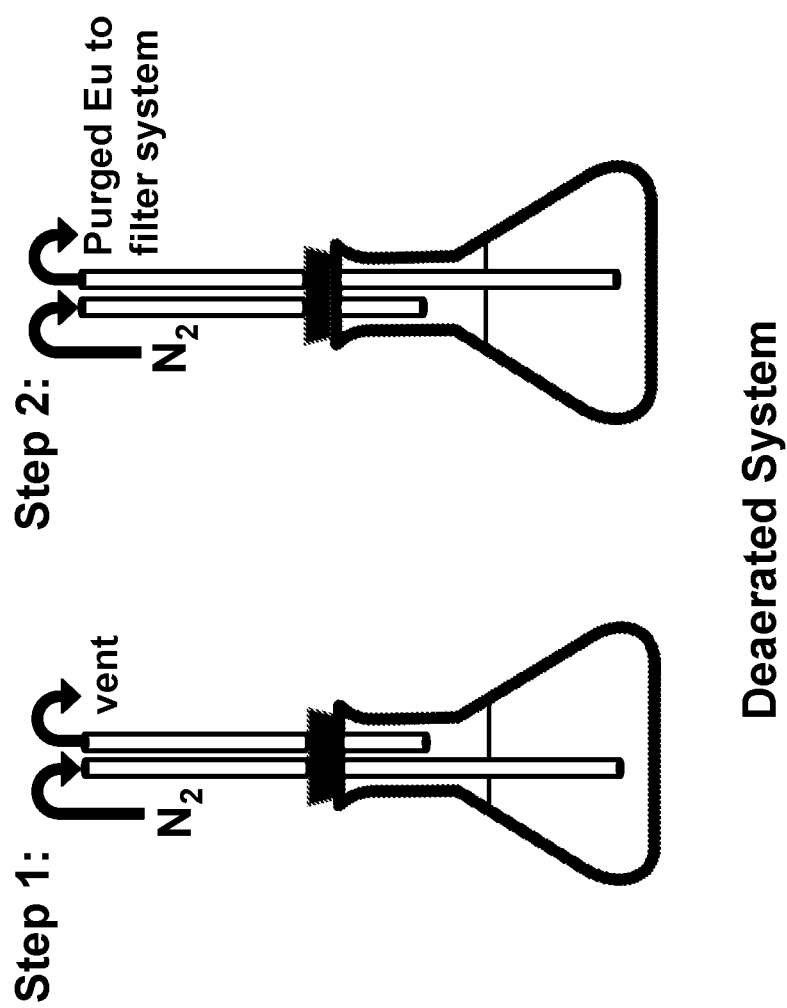
FIG. 13 is a schematic of the deaerated system. In step 1, 500 mL of test solution was purged with nitrogen at 200 mL min$^{-1}$ in a 500 mL Erlenmeyer flask with an aeration stone for 90 min before the experiment to ensure no oxygen was present. In step 2, 5 mL min$^{-1}$ Eu was delivered to the filter while a constant flow of N$_2$ was pushed into the vacated headspace at 5 mL min$^{-1}$ to maintain neutral pressure and an oxygen-free environment for the duration of the experiment.
Figure 14:
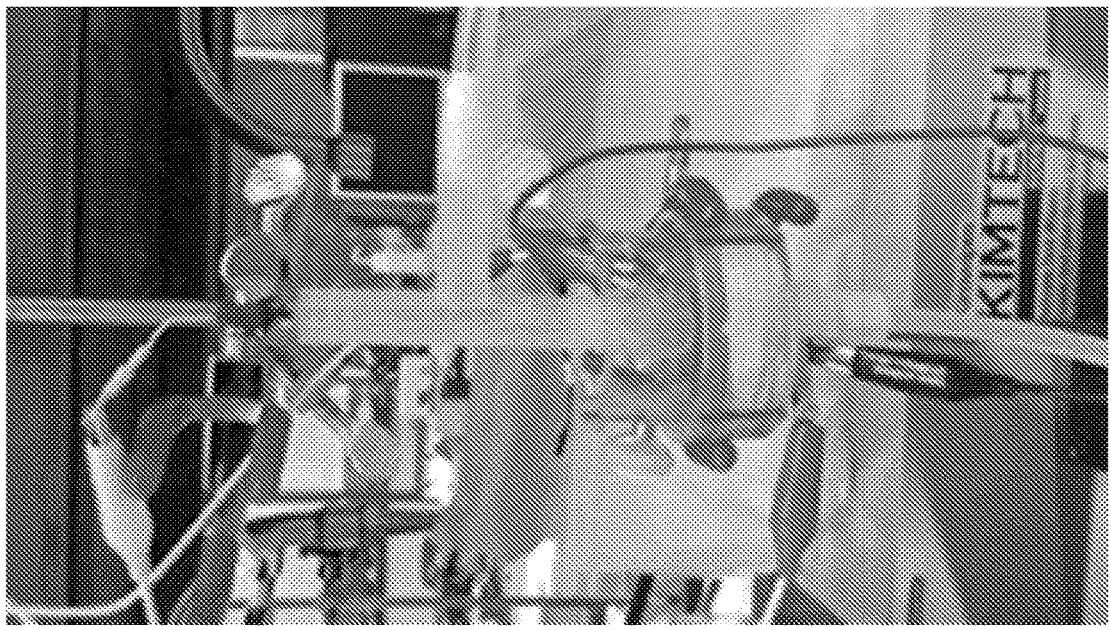
FIG. 14 is a photograph of a filtration chamber when operated with the reference electrode. The flow of the fluid is from the bottom up.
Figure 15B:
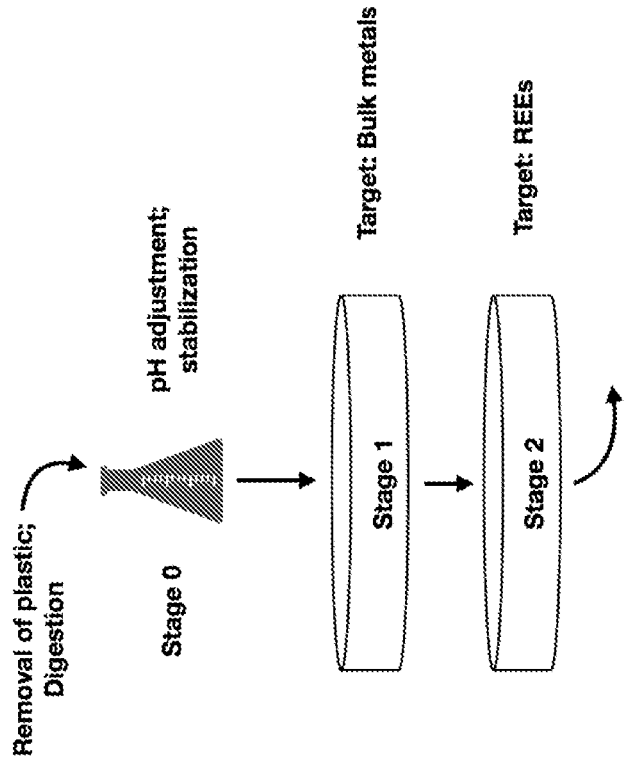
FIGS. 15A and 15B depict the results from an exemplary separation of e-wastes using a filtration system of the present invention.
Figure 15A:
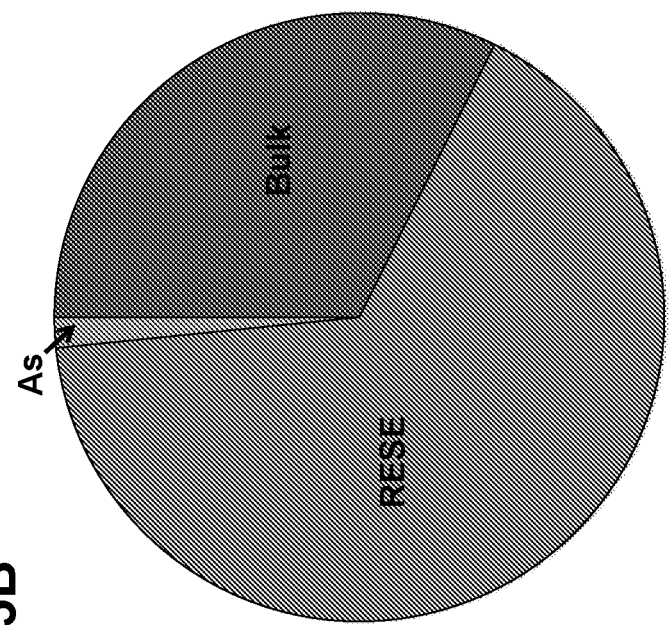

Out of the six metals tested here, Cu (reduction potential 0.13$V_{Ag/AgCl}$) had the highest recovery at 2.0V (87±20%), while Ga, Nd, Eu and Sc all exhibited the highest recoveries at 3.0V (in decreasing order: 77±8, 72±25, 65±6, 43±6% recovery, respectively (FIG. 6A); The relatively large standard errors on triplicate measurements are likely due to inherent heterogeneity in CNTs). Arsenic was unrecovered at all voltages (and pHs; see discussion below; FIG. 12). Ga, Eu, Sc, and Nd did not behave according to their standard reduction potentials to zero-valent metals (Ga: −0.76 $V_{Ag/AgCl}$, Eu: −2.20 $V_{Ag/AgCl}$, Sc: −2.29 $V_{Ag/AgCl}$, Nd: −2.53 $V_{Ag/AgCl}$), where one would anticipate Ga to show the highest recovery, followed by Eu, Sc, and, finally, Nd. Nevertheless, a zero voltage control showed no retained metal on the filters (by SEM, XPS, and confirmed with ICP-MS), indicating electrochemical activity was responsible for metal recovery rather than passive collection of natively formed precipitates.

Figure 7A:
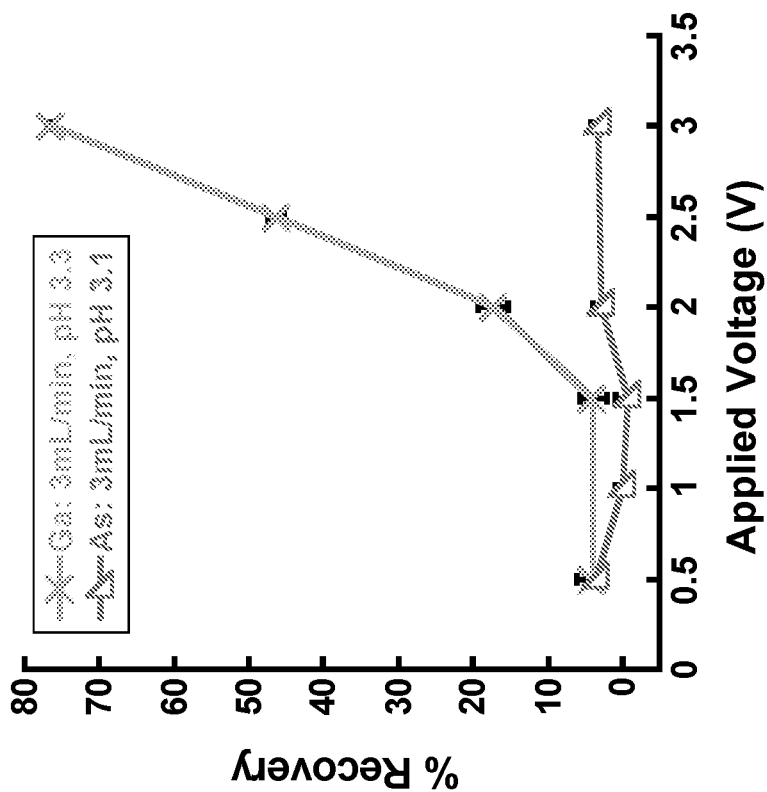
FIGS. 7A and 7B depict plots of the recovery of additional metals as a function of applied voltage.

Similar experiments show that Li is not captured at applied voltages between 0.5 and 3 V, but Co and Ni are captured at increasing percentages starting at about 1.5 V (FIG. 7A). Interestingly, these results suggest that Ni may be separated from Cu at lower voltages.

Figure 17A:
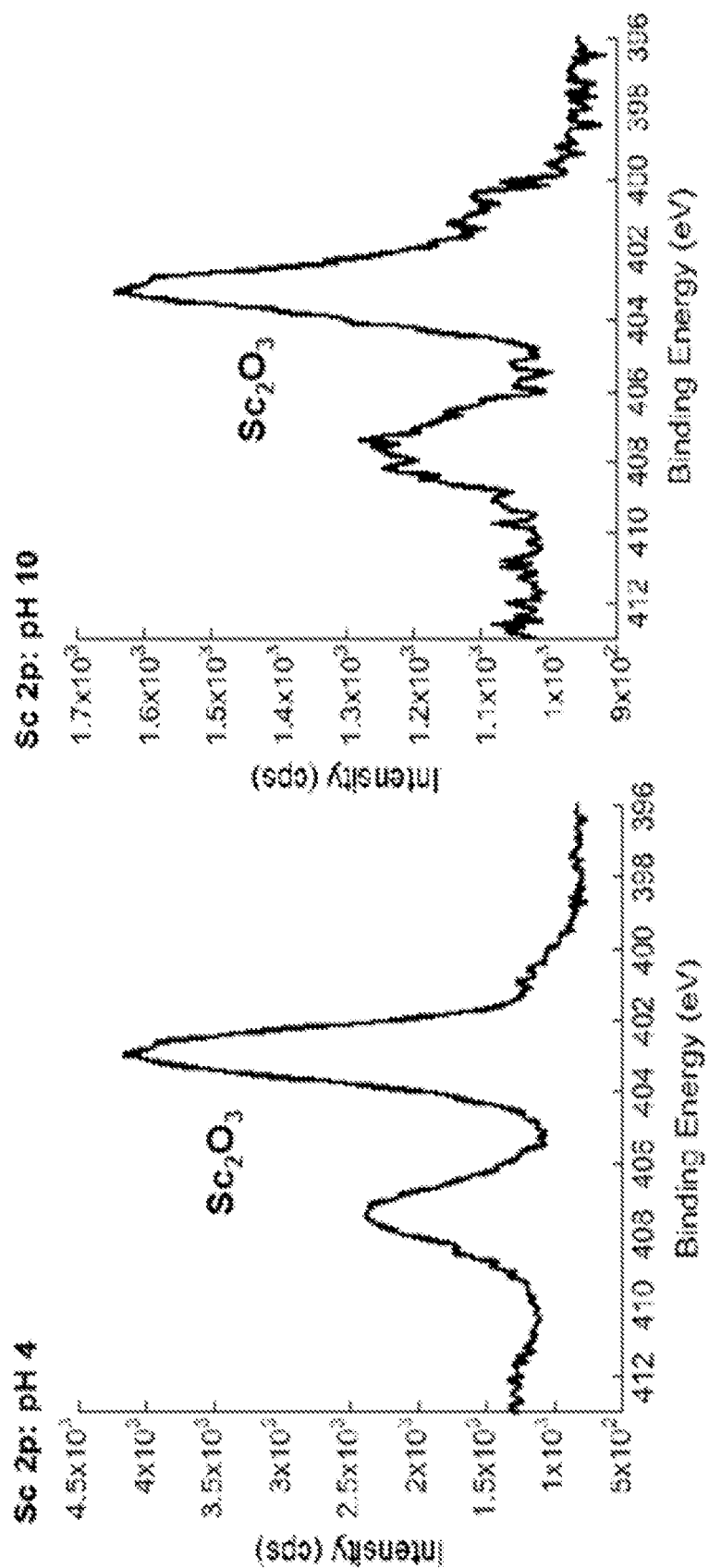
FIGS. 17A-17C depict X-ray photoelectron spectroscopy (XPS) results at pH extrema.
Figure 17B:
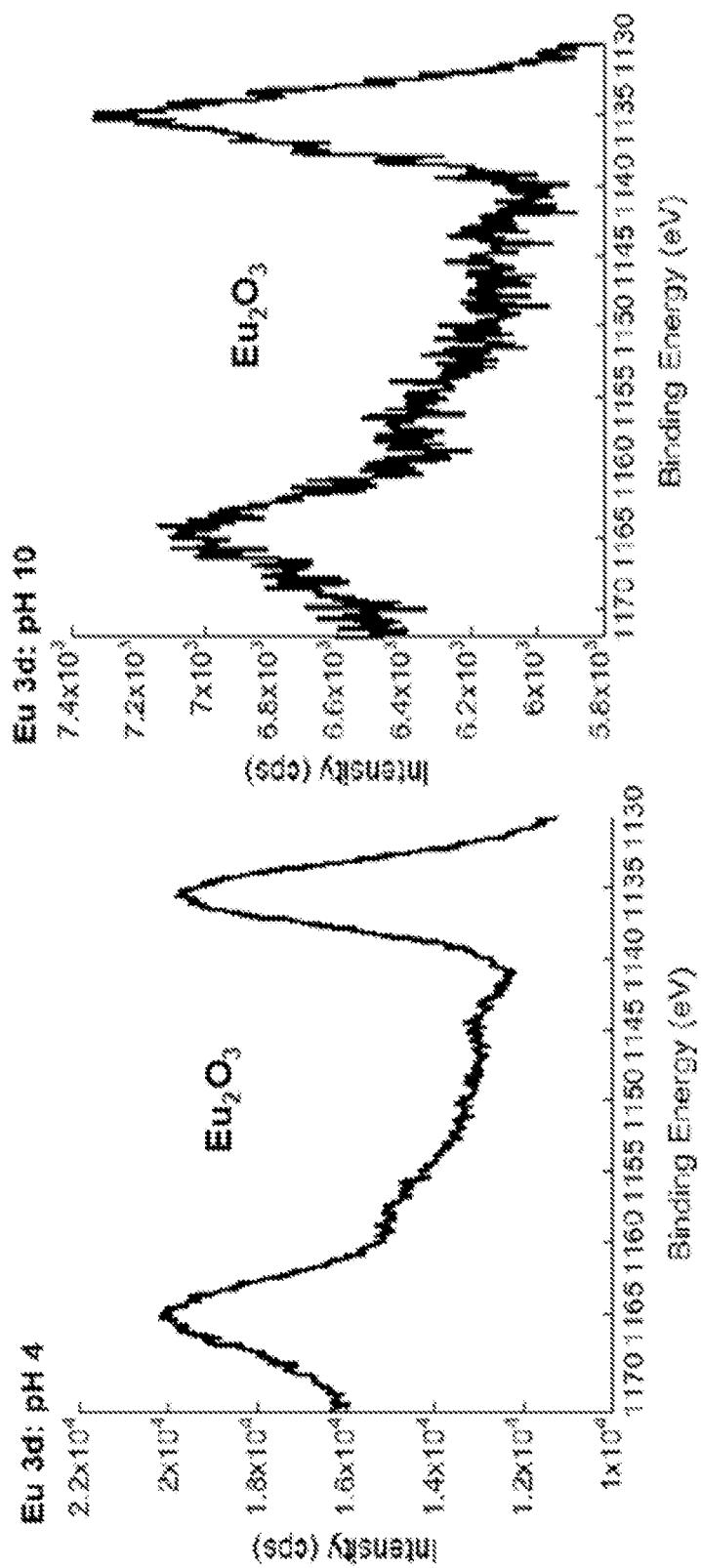
Figure 17C:
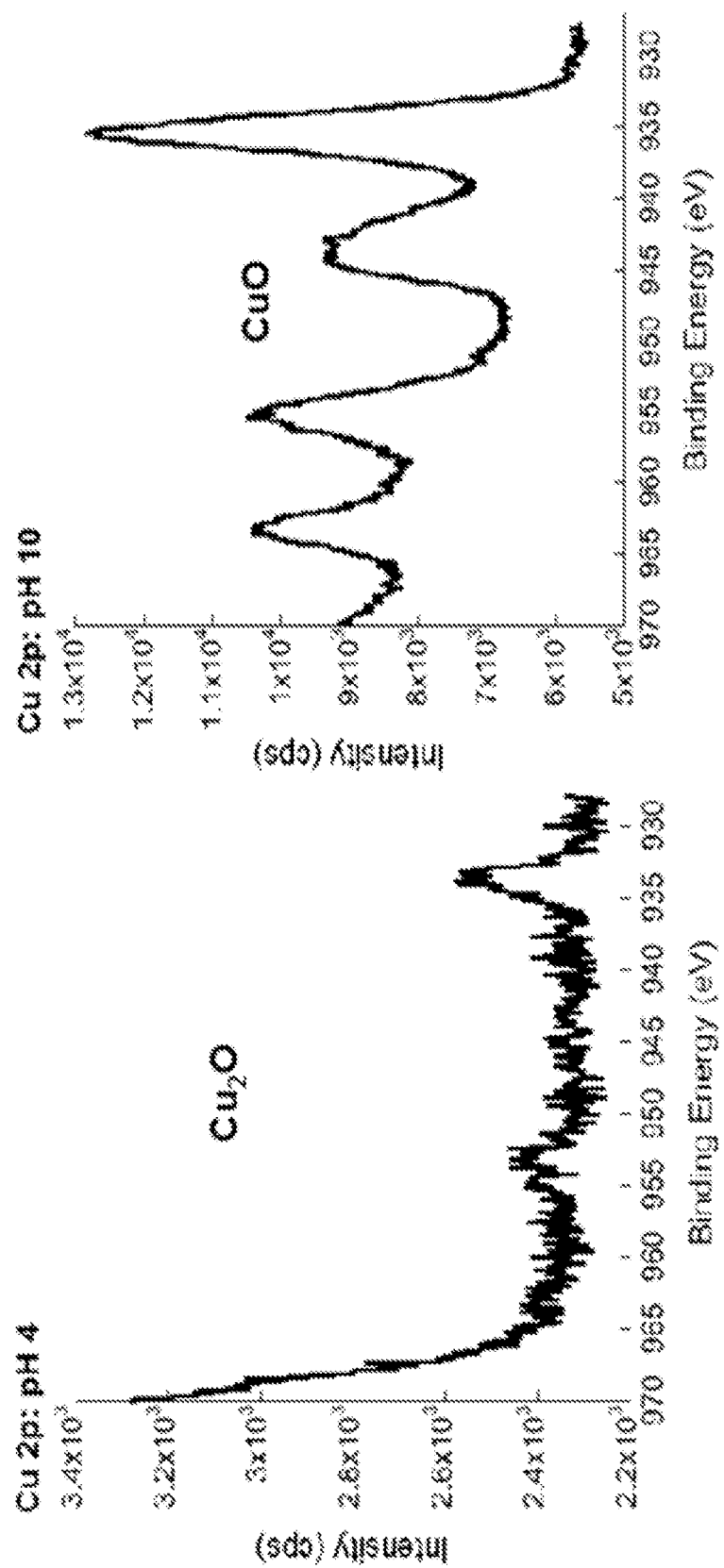
Figure 18B:
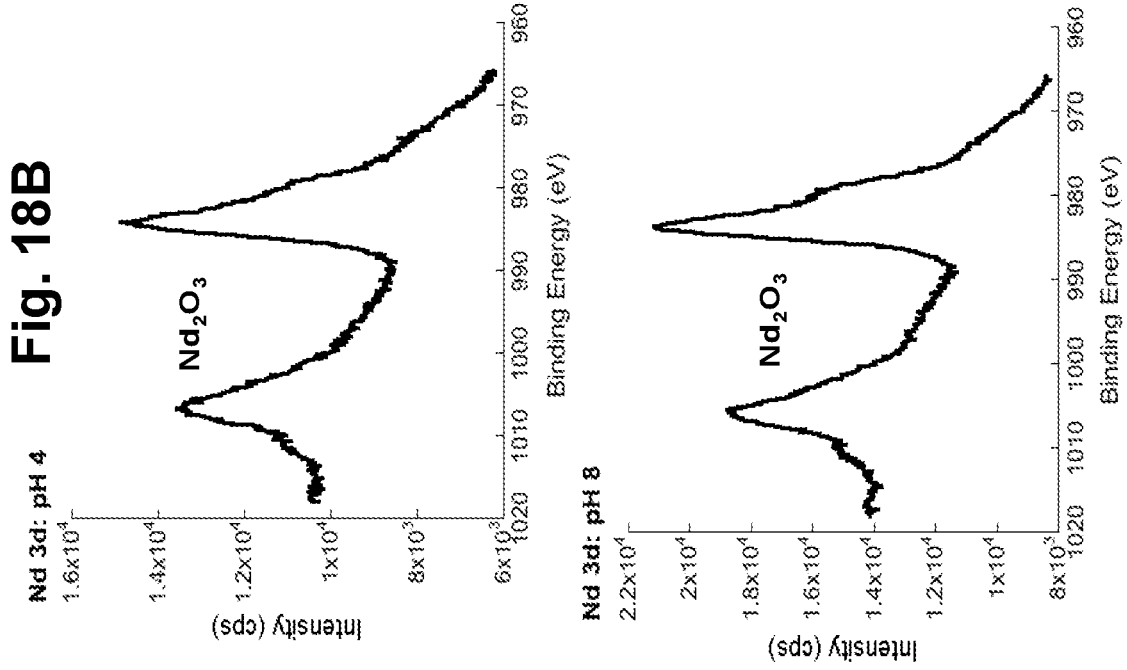
FIGS. 18A and 18B depict X-ray photoelectron spectroscopy (XPS) results at pH extrema.
Figure 18A:
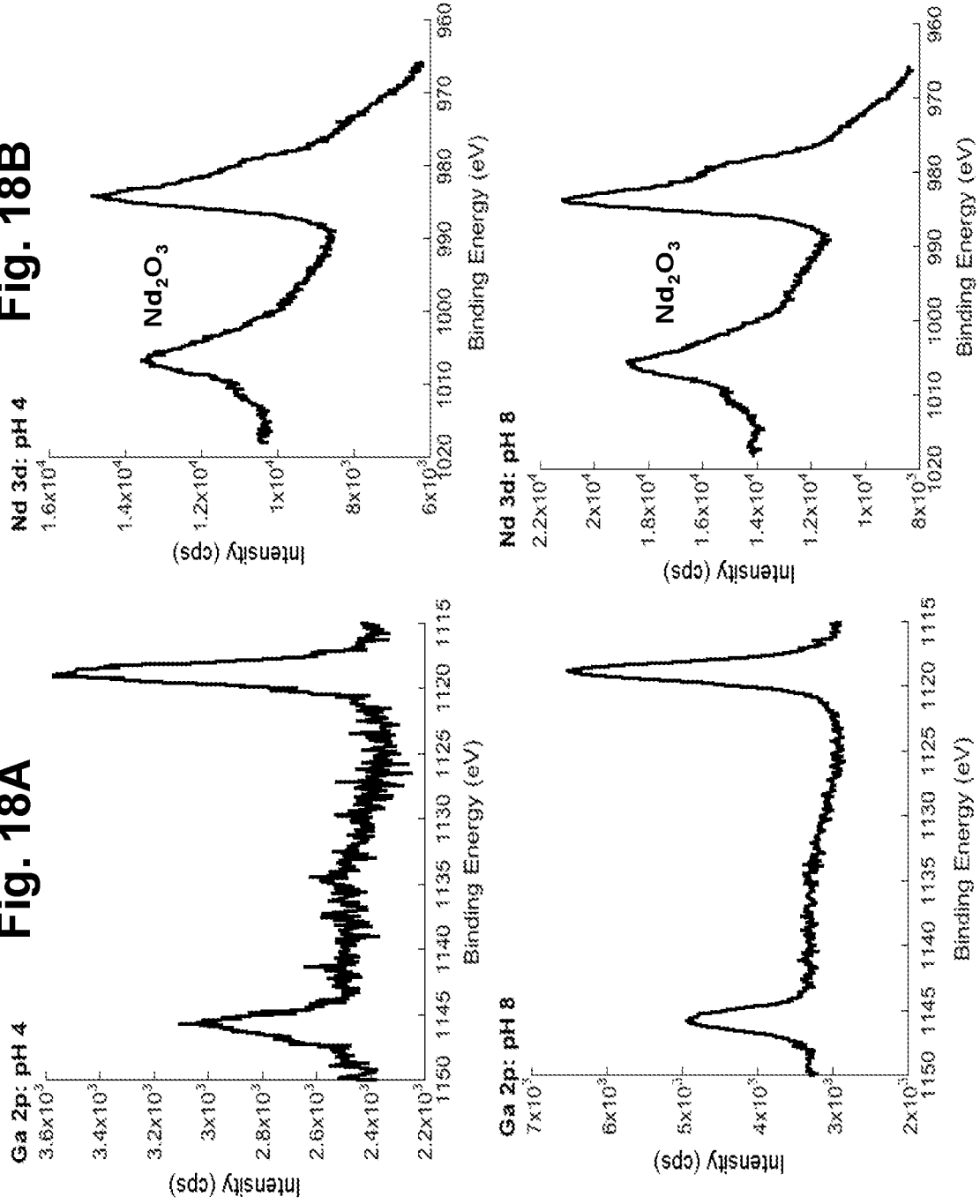
Figures 19A, 19B, 19C, 19D, 19E:
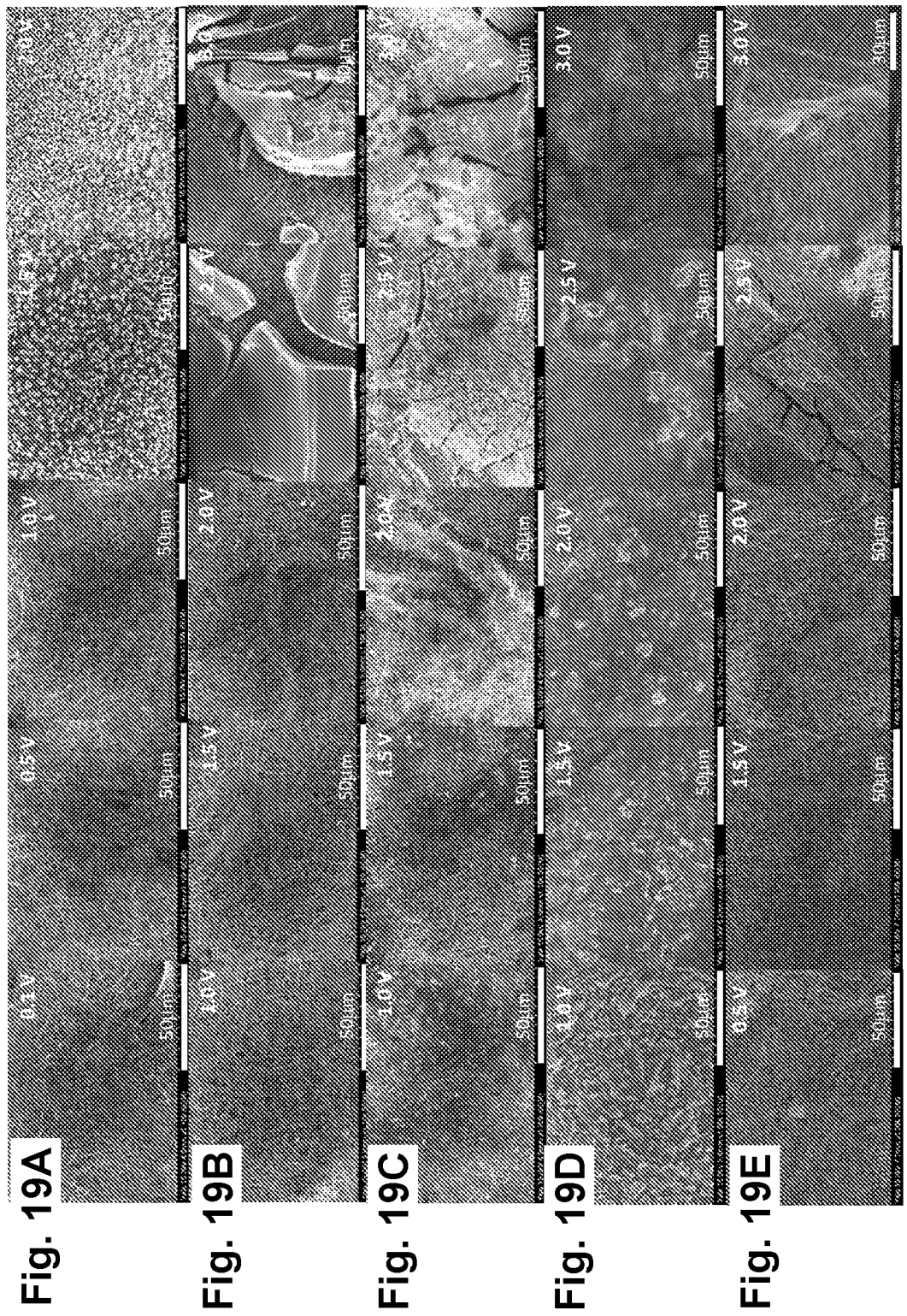
FIGS. 19A-19E depict SEM images of the tested metals as a function of voltage. All five metals had increasing recovery as the voltage increased; voltage is noted in the upper right corner of each image. Cu showed metal crystals at 1.5 V and 2.0 V, while Sc, Eu, Nd, and Ga deposited in large platelets across all voltages.
Figures 20A, 20B, 20C, 20D, 20E:
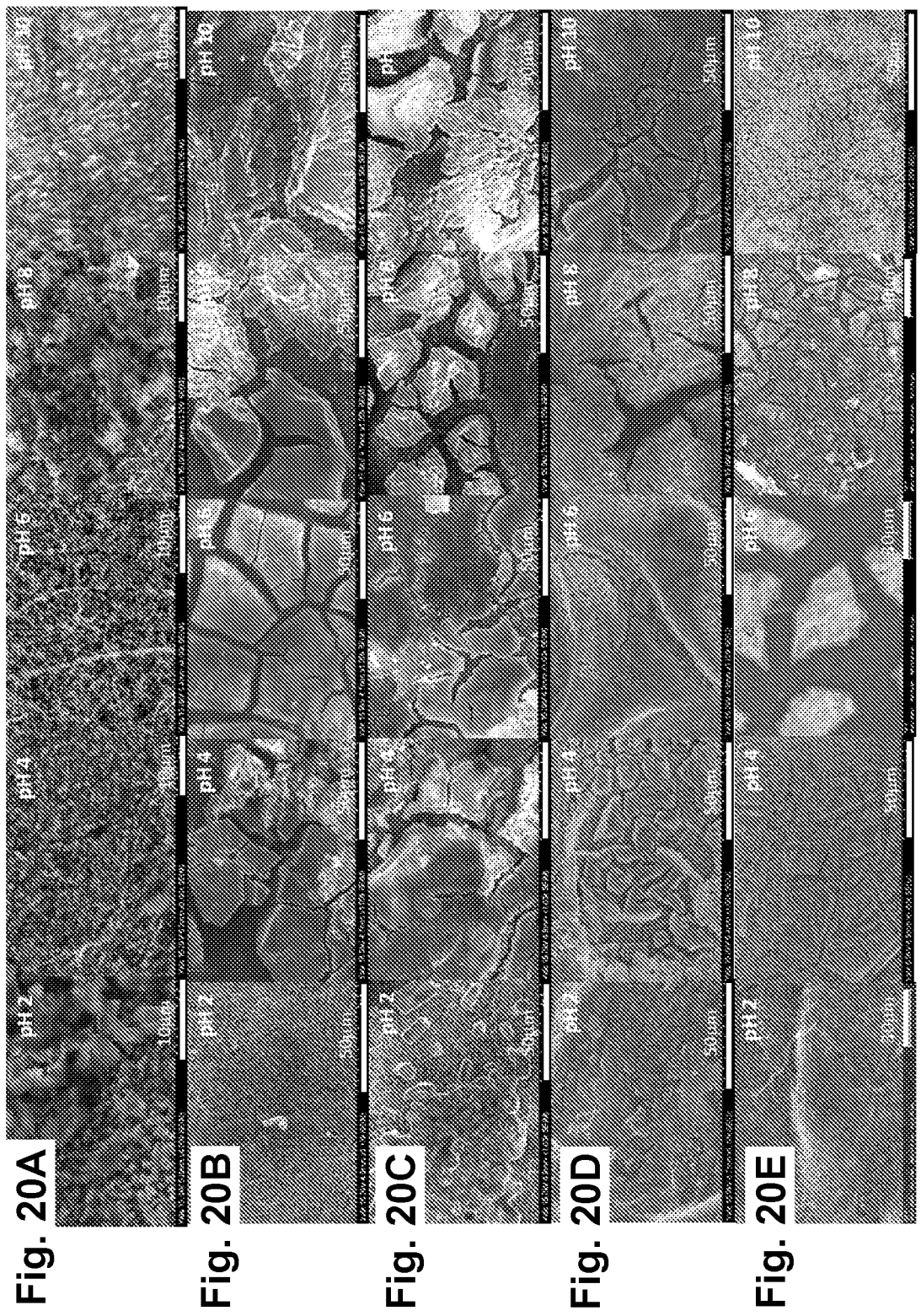
FIGS. 20A-20E depict SEM images of the tested metals as a function of pH.
Figure 22B:
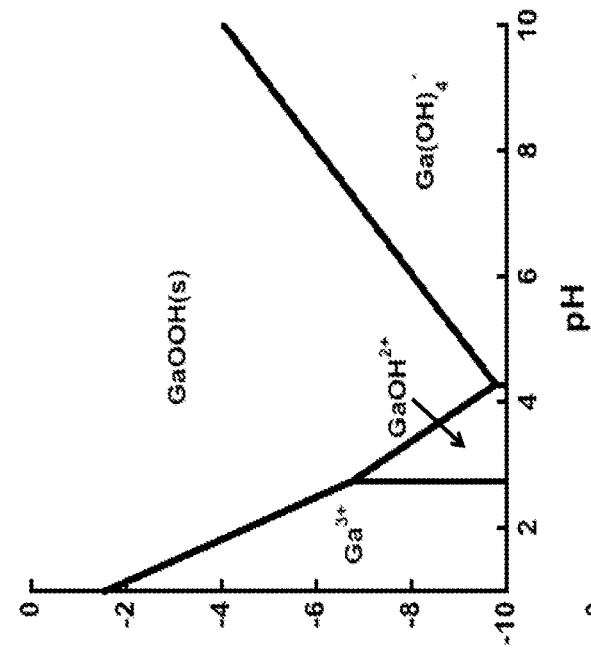
FIGS. 22A-22D depict stability diagrams of the tested metals, as adapted from the literature (Brown & Ekberg, Scandium, Yttrium and the Lanthanide Metals. In Hydrolysis of Metal Ions, Wiley-VCH Verlag GmbH & Co. KGaA: 2216; pp 225-324; Cheng, et al., Applied Clay Science 2212, 56, 90-96; Ames & Rai, Radionuclide interactions with soil and rock media. United States Environmental Protection Agency, Office of Radiation Programs: 1978; Vol. 1; Smedley and Kinniburgh Applied geochemistry 2202, 17, (5), 517-568).
Figure 22D:
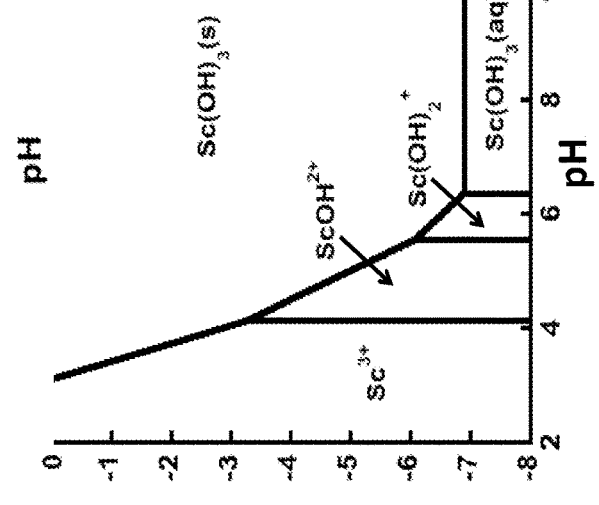
Figure 22A:
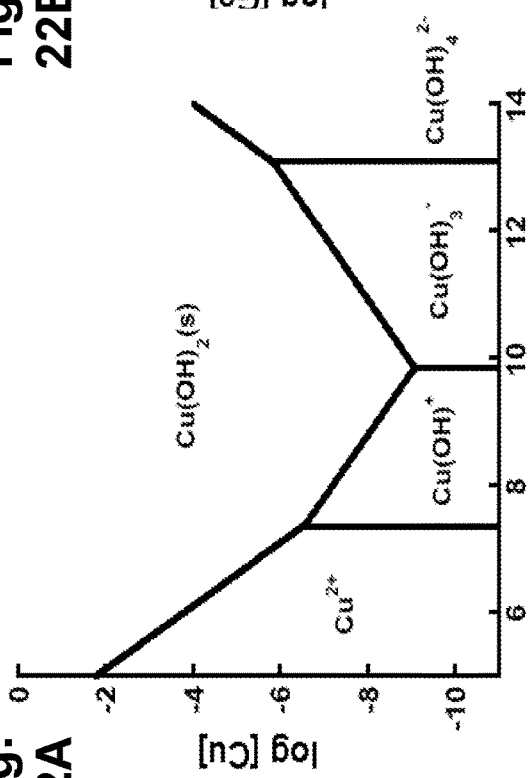
Figure 22C:
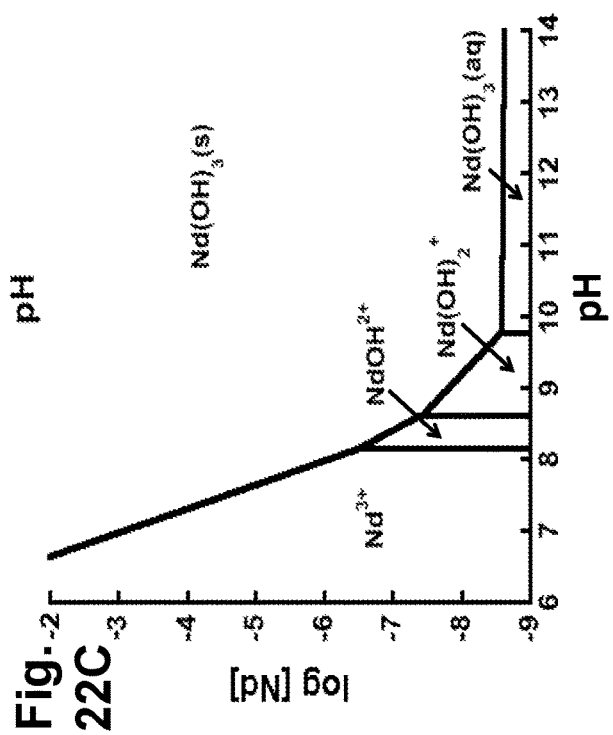
Figure 23B:
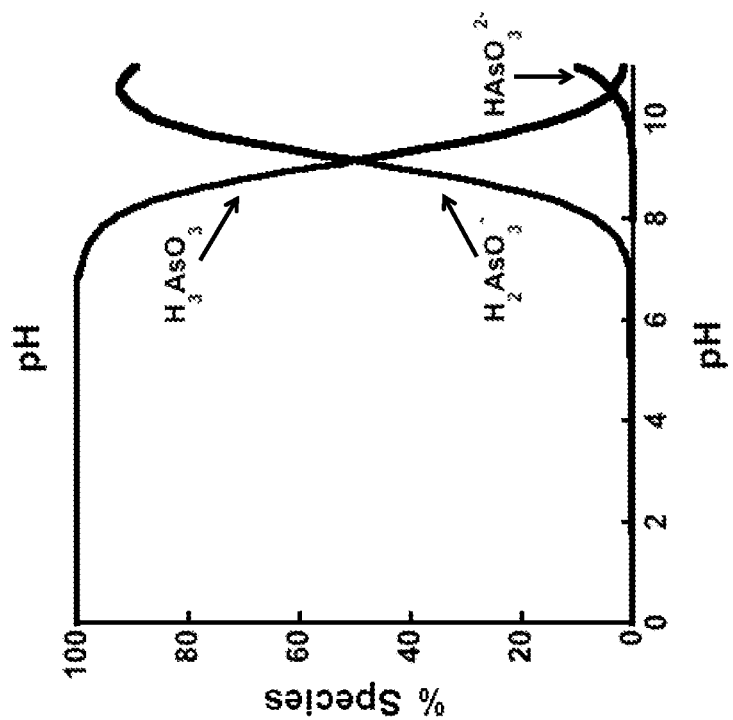
FIGS. 23A and 23B depict stability diagrams of the tested metals (most stable oxide species as a function of pH), as adapted from the literature.
Figure 23A:
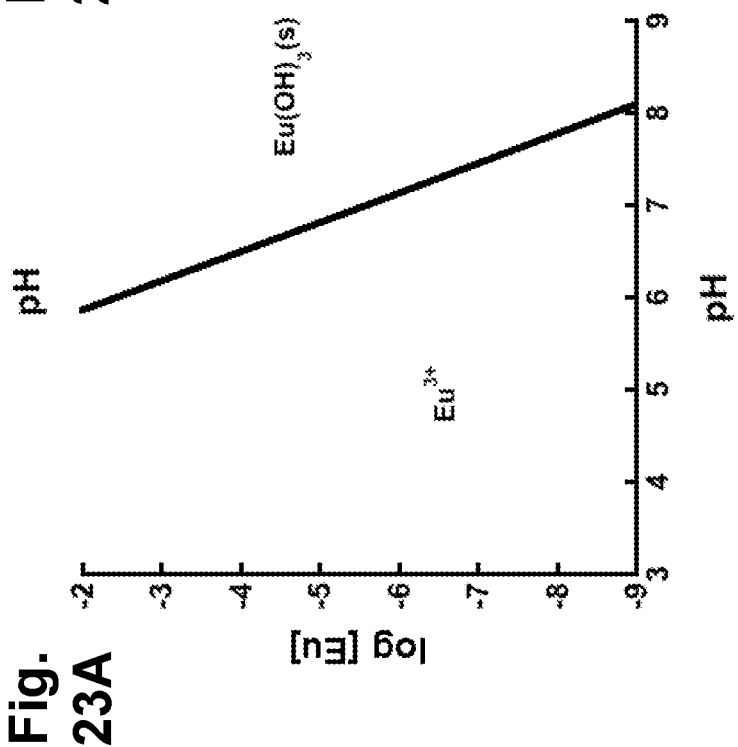

The crystallinity and speciation of the recovered material varied with metal type and, for Cu, as a function of voltage. Crystalline Cu was recovered at 1.5 and 2.0 V, consistent with Vecitis et al.'s previous finding (Vecitis & Schnoor, Abstr. Pap. Am. Chem. Soc. 2013, 245, 1), as $Cu_2O$ (i.e., Cu(II) was electrochemically reduced to Cu(I)) (FIG. 8A-8E; FIG. 17C). In contrast, Ga, Eu, Sc, and Nd formed large plates of amorphous metal, rather than individual metal crystals (FIG. 8A-8E; FIG. 19A-19E). The RESEs were recovered in their trivalent forms as $Ga_2O_3$, $Eu_2O_3$, $Sc_2O_3$, and $Nd_2O_3$. While not wishing to be bound by any particular scientific theory, it is possible that a mechanism that promotes metal oxide deposition controlled the recovery process, and recovery efficiency would not necessarily improve with increasing standard reduction potential, which would be expected if zero-valent metals were collected. Further, metal oxide formation is inconsistent with the anticipated mechanisms for electrosorption (Oren. Desalination 2008, 228, (1-3), 10-29), a process in which ions are electrochemically neutralized and consequently destabilized in solution (thereby promoting sorption to nearby surfaces, as in capacitive deionization. Instead, if electrosorption were the dominant removal mechanism, zero-valent metals/metalloids would have been recovered and the elements should be preferentially neutralized in order from highest to lowest integrated ionization energy (i.e., highest to lowest recovery would proceed Ga≈As>Sc>Eu>Nd>>Cu assuming complete neutralization; see Table 1), which was not observed (James & Lord, Macmillan's chemical and physical data. Macmillan: London, 1992).

TABLE 1

Ionization energies for Eu, Nd, Ga, Sc, As, and Cu.
Ionization Energies (kJ/mol)

| Transition | Eu | Nd | Ga | Sc | As | Cu |
|---|---|---|---|---|---|---|
| $M \rightarrow M^+ + e^-$ | 547.1 | 533.1 | 578.8 | 633.1 | 947 | 745.5 |
| $M^+ \rightarrow M^{2+} + e^-$ | 1085 | 1040 | 1979.3 | 1235 | 1798 | 1957.9 |
| $M^{2+} \rightarrow M^{3+} + e^-$ | 2404 | 2130 | 2963 | 2388.6 | 2735 | 3555 |
| $M^{3+} \rightarrow M^{4+} + e^-$ | 4120 | 3900 | 6180 | 7090.6 | 4837 | 5536 |
| $M^{2+} + 2e^- \rightarrow M$ | | | | | | 2703.4 |
| $M^{3+} + 3e^- \rightarrow M$ | 4036.1 | 3703.1 | 5521.1 | 4256.7 | 5480 | |

In the absence of pure metal recovery, these data remain encouraging for selective recovery among these metals, especially between copper and the four RESE, based on voltage alone. For example, at 1 mL min$^{-1}$ and 1.5 V, Cu was efficiently retained (97±3% recovery) while Eu recovery was minimal (5±6%), indicating an ability to capture Cu on an early, low voltage stage and Eu on a later, high voltage stage. Similarly, at 3 mL min$^{-1}$ and 1.5 V, Cu was efficiently retained (76±1% recovery) while Eu recovery was minimal (5±1%). This could be very useful, especially in the electronics industry, where most metal-rich waste streams have high Cu levels, making it difficult to capture the proportionately small amount of RESE (Wang, et al., Journal of Central South University of Technology 2005, 12, (5), 552-555; Das, et al., Resources, Conservation and Recycling 2009, 53, (8), 464-469; Hall & Williams, Resources, Conservation and Recycling 2007, 51, (3), 691-709).

Generally, the recovery of Nd, Eu, Sc, and Cu increased as a function of pH (FIG. 6A-6C), except for Ga, which exhibited maximum recovery around neutral pH. While one might anticipate these recoveries to reflect changes in solubility (e.g., enhanced formation of metal hydroxides at high pHs), metal hydroxides were not recovered (see XPS spectra, FIGS. 17A-17C and FIG. 18A-18E). In contrast, all RESE were recovered as rare earth or specialty element oxides (RESEOs; $Ga_2O_3$, $Eu_2O_3$, $Sc_2O_3$, and $Nd_2O_3$) irrespective of pH (at the extrema of pH 4 and 10; Table 2). Note, that XPS suggested all RESE were captured as RESEOs, although with the limited sample area of and standards available for this technique, it is possible some amount of REE could be present as hydroxide. (Further investigation using X-ray absorption spectroscopy (XAS) may help reduce the uncertainty of the identification). Note that this does not rule out the possibility that RESEOs were formed through some rare earth hydroxide intermediate. As observed with the voltage sweep, these RESEOs were recovered in the form of large platelets with no discernable morphological change from acidic to basic conditions (FIG. 20A-20E). Interestingly, a change in Cu crystal morphology was observed and corresponded to a change in Cu speciation from $Cu_2O$ at the low end of the pH range and CuO at higher pH (FIG. 17A-17C, FIGS. 18A and 18B, and FIG. 20A-20E). This result reflected a shift in a partial reduction mechanism at low pH, to a metal-oxide formation trapping mechanism at high pH, similar to that observed for the RESEs.

TABLE 2

X-ray photoelectron binding energies for each sample. These numbers correspond to the spectra in FIG. 17A-17C and FIG. 18A and 18B.
XPS Binding Energies

| Element | pH 4 | pH 8/10 |
|---|---|---|
| Ga 2p 3/2 | 1119.1 eV | 1118.8 eV |
| Cu 2p 3/2 | 933.8 eV | 935.4 eV |
| Sc 2p 3/2 | 403.0 eV | 403.2 eV |
| Nd 3d 5/2 | 984.3 eV | 983.7 eV |
| Eu 3d 5/2 | 1135.6 eV | 1134.9 eV |

Cu displayed a sensitivity to flow rate with 97±3% recovery at the slowest flow (1 mL min$^{-1}$) and 65±10% at the higher flows (4-5 mL min$^{-1}$), whereas there was no obvious trend for Eu or Sc (FIG. 6C). This result suggested a possible mass transfer limitation for Cu, where reduction-mediated trapping was slow compared to bulk fluid transport past the filter at high flow rates. This was reflected in the Cu crystal morphology: near perfect Cu crystals formed at low flow and became less crystalline as flow rate increased (all forms were Cu (I) as $Cu_2O$ (FIGS. 17A-17C and 21A-21C)). Eu and Sc exhibited no visible change in the platelet formation (all forms were trivalent; e.g., $Eu_2O_3$ and $Sc_2O_3$, respectively). The minor or negligible sensitivity to flow rate indicated that the redox kinetics were not severely limiting in this recovery process over the tested range. This result is promising, as it implies more industrially relevant flow rates could be achieved without a significant compromise in recovery.

Figure 11C:
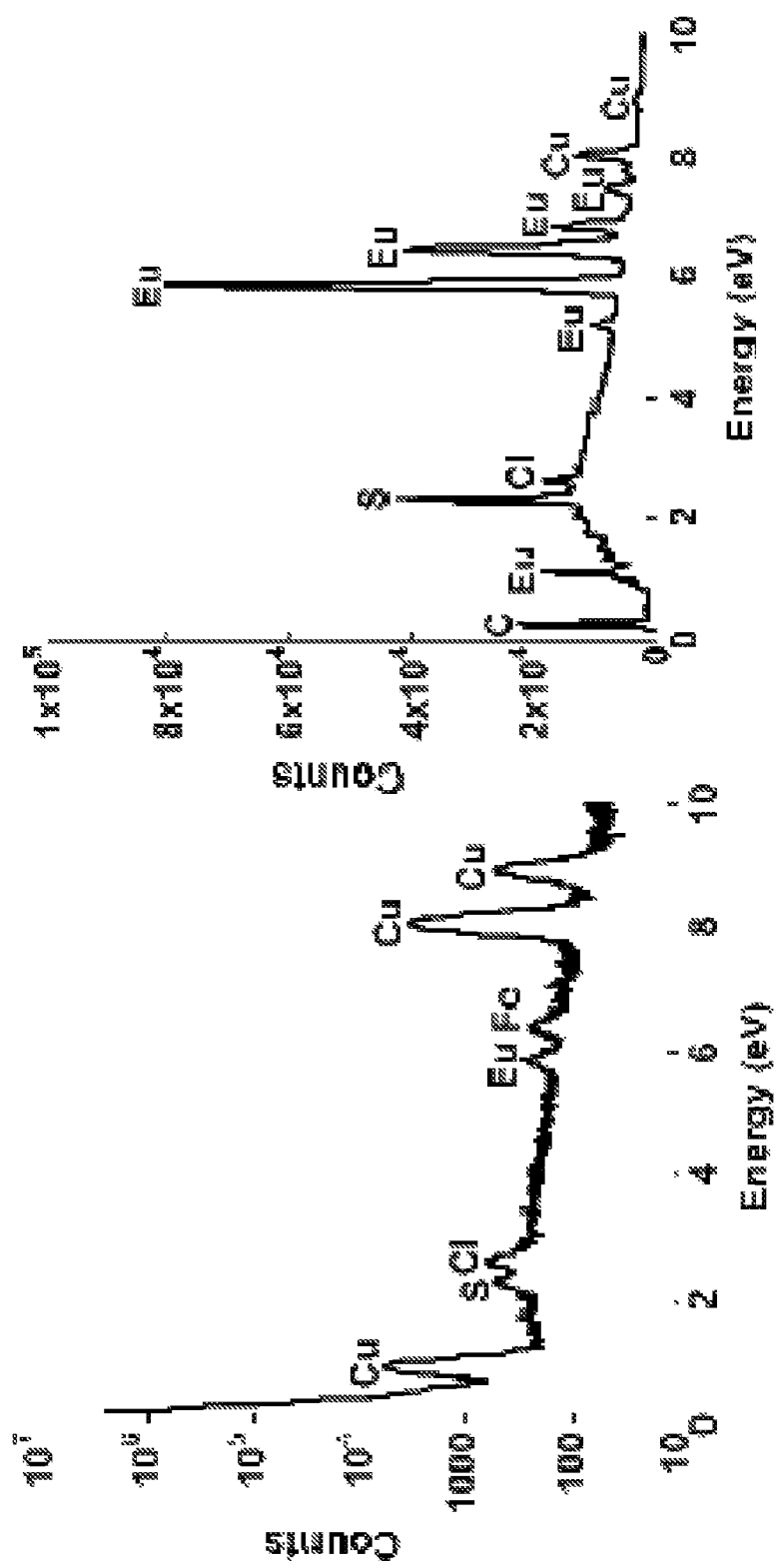

While partial reduction from dissolved Cu (II) to Cu (I) oxide was achieved at low pH, recovery of all RESEs was in an unreduced (trivalent; e.g., Eu(III)), oxide form, irrespective of pH. Oxides may form via two possible electrochemically-dependent routes with distinct oxygen sources: (a) dissolved molecular $O_2$ that is electrochemically activated, or (b) electrochemical water splitting to form $O_2$. To determine the contribution of each, two unconventional filtration experiments were conducted: one purged of dissolved $O_2$ (where oxide formation would be solely due to water splitting), and one purged of $O_2$ with the leads reversed (i.e., where the $O_2$ formed from water splitting, which occurs at the anode, would exhibit enhanced transport to the metal-capture surface at the cathode) (FIG. 11A-11C).

Eu recovery decreased in the absence of $O_2$, from 86±2% to 34±15%, indicating that dissolved molecular oxygen is an important source of $O_2$, but also that the back diffusion of $O_2$ derived from water splitting at the anode was also substantial (i.e., 40% of the total observed in normal operation) (FIG. 11A). To confirm the importance of the latter, the presence of $H_2$, a co-product of water splitting, was qualitatively confirmed through the observation of ignitable $H_2$ (g) evolution and quantitatively determined. Enhanced recovery of $H_2$ was observed when the leads were flipped (i.e., the anode on top and the cathode on the bottom to test for enhanced oxygen transport in the direction of the bulk fluid flow; FIG. 11B). Indeed, recovery of Eu was 56±15% (compared to the 34±15% with normal leads), further supporting the importance of water splitting as a source of $O_2$ for oxide formation and recovery.

Figure 10:
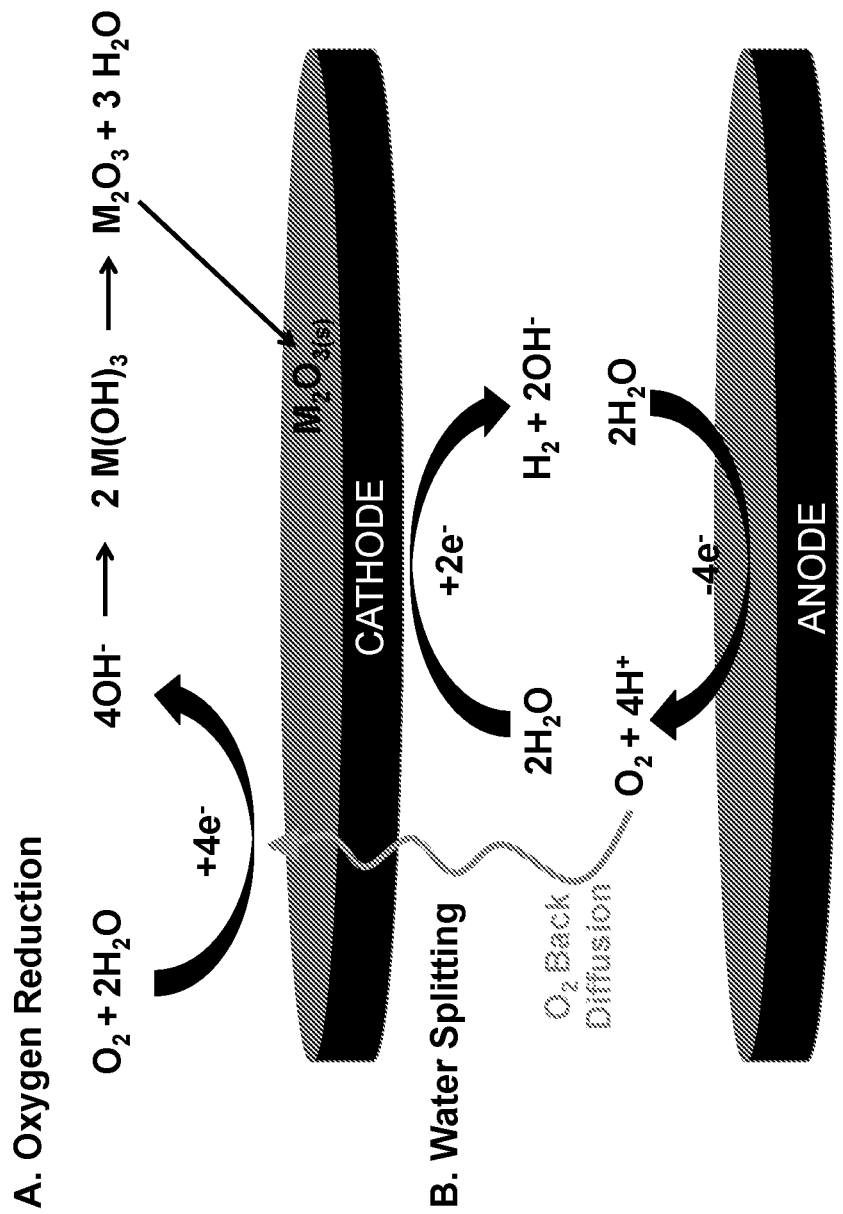
FIGS. 10A and 10B depict a possible mechanism for electrochemical deposition of metal oxides (e.g., $M_2O_3$) via a metal hydroxide intermediate (e.g., $M(OH)_3$ for trivalent RESEs).

While not wishing to bound by any particular theory, it is possible that the oxygen and water are being reduced in solution to hydroxide, forming metal hydroxide species, and then dehydrating to the insoluble metal oxide (Therese & Kamath, Chemistry of Materials 2000, 12, (5), 1195-1204) (FIGS. 10A and 10B). Previous work has shown that oxygen and water can be reduced in aqueous systems at the cathode (Equations 1 and 2) (Therese & Kamath, Chemistry of Materials 2000, 12, (5), 1195-1204; Bard, et al., Standard potentials in aqueous solution. CRC press: 1985; Vol. 6; Haynes, CRC handbook of chemistry and physics. CRC press: 2014), occurring at 0.19 $V_{Ag/AgCl}$ and −1.0 $V_{Ag/AgCl}$, respectively (Chaim, et al., Journal of the American Ceramic Society 1994, 77, (12), 3202-3208; Chaim et al., Journal of Materials Science 1994, 29, (23), 6241-6248).

Cathodic Sources of $OH^-$:

$$O_2 + 2H_2O + 4e^- \rightarrow 4OH^- \qquad (1)$$

$$2H_2O + 2e^- \rightarrow H_2 + 2OH^- \qquad (2)$$

Note that molecular $O_2$ (Eqn 1) can be sourced from both dissolved $O_2$ as well as back-diffusion of $O_2$ formed at the anode (Eqn 3).

Anodic Source of $O_2$:

$$2H_2O \rightarrow O_2 + 4H^+ + 4e^- \qquad (3)$$

This $O_2$ is sourced from the oxidation of water (−1.44 $V_{Ag/AgCl}$; Eqn 3). Here, it is possible that oxygen formed via water oxidation back-diffuses to the cathode, contributing to further hydroxide formation via oxygen reduction (Eqn 1). This hydroxide could encourage the formation of insoluble metal hydroxides, which could subsequently dehydrate to the observed metal oxides (FIGS. 10A and 10B). Note that a similar metal oxide formation mechanism has been described superficially, but not rigorously demonstrated or detailed, in battery systems were water splitting is known to occur (Xia, et al., Nat Chem 2015, 7, (6), 496-501).

The pH dependency supports this hypothesis: in general, RESE recovery behaved according to hydroxide solubility (e.g., Ga has high recovery at pH 6 and Eu at pH 10, where the hydroxide forms dominate; see FIGS. 22A-22D and 23A-23B) (Brown & Ekber, In Hydrolysis of Metal Ions, Wiley-VCH Verlag GmbH & Co. KGaA: 2016; pp 225-324; Ames & Rai, Radionuclide interactions with soil and rock media. United States Environmental Protection Agency, Office of Radiation Programs: 1978; Vol. 1; Cheng et al., Applied Clay Science 2012, 56, 90-96), consistent with the formation of a metal hydroxide intermediate. Arsenic, which forms no insoluble metal hydroxides (and only very soluble oxides), was not recovered at any pH or voltage. Interestingly, the reduction potential of Cu(II) to Cu(0) is similar to the reduction potential for $O_2$ (Eqn 1), 0.13 $V_{Ag/AgCl}$ and 0.19 $V_{Ag/AgCl}$, respectively. In this case, there are competing processes: Cu (II) to Cu(I) reduction, followed by oxide formation, prevailed at low pHs, but the oxygen-mediated mechanism outcompeted this reduction at high pH, where $OH^-$ was abundant (and anodic water splitting should have been enhanced).

Many applications utilize metal oxides as starting materials and critical components; e.g., $Eu_2O_3$ is used a phosphor in electronic screen displays, $Nd_2O_3$ is used as a catalyst, and $Cu_2O$ and $Ga_2O_3$ are proposed for potential use in the semiconductor industry (Stepanov, et al., Rev. Adv. Mater. Sci 2016, 44, 63-86; Emsley, J., Nature's building blocks: an AZ guide to the elements. Oxford University Press: 2011; Tsui & Zangari, In Electrodeposition and Surface Finishing: Fundamentals and Applications, Djokić, S. S., Ed. Springer New York: New York, N.Y., 2014; pp 217-239). Thus, the recovery of metal oxides across the entire pH range could be encouraging for direct reuse in manufacturing processes. Further, while recovery changed over the range tested, the metal speciation did not. This is uncommon in traditional metal recovery systems: pH greatly affects metal speciation and usually requires further purification processes to change the metal into a homogeneous, consistent, single form. While promising, manufacturing process streams and end-of-life waste streams are comprised of multiple metals of interest, and the selectivity of this system for individual metals (i.e., separation) remains to be shown.

Example 2: Selective Recovery from a Mixed Stream

The materials and methods employed in these experiments are now described.

Materials & Methods

Figure 5:
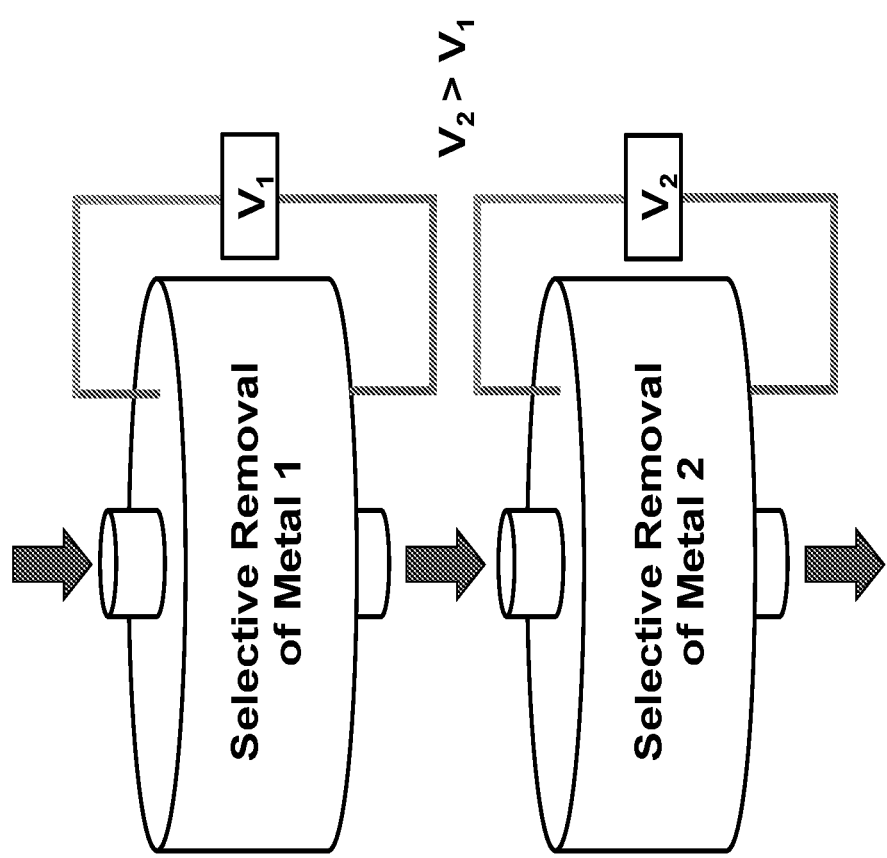
FIG. 5 is a schematic of two filtration chambers in series. A mixed metal stream is pushed through the system where the top and bottom filters are set at $V_1$ and $V_2$, selecting for metal 1 and metal 2, respectively, and where $V_1 < V_2$.

After assessing the behavior of single-metal solutions, a two-chamber filtration apparatus was assembled to determine whether or not multiple metals could be purified and separated using this technology (FIG. 5). Cu and Eu were prepared together and the mixed influent solution was pumped into the system containing two filtration chambers in series. The upstream filtration chamber had an applied voltage of 1.5V to select for Cu and the downstream chamber had an applied voltage of 3.0V to select for Eu. The flow rate was held constant at 1 mL min$^{-1}$ and pH was not adjusted (measured pH: 5.4). In this study, effluent was collected and quantified from both filtration chambers to calculate recovery.

The results of the experiment are now described.

The prior optimization exercise using pure, single-metal solutions informed the possibility of highly selective recovery of two metals from a mixed metal solution, which is necessary for relevant process wastes, such as semiconductor manufacturing, or e-waste treatment. In this study, a mixed metal solution of Cu and Eu was prepared and tested in a stacked-chamber apparatus with two filters in series (FIG. 5), where the upstream filtration chamber was set at 1.5V, selecting for Cu, and the downstream filtration chamber was set at 3.0V, selecting for Eu.

For these metals, separation and retention was achieved: 96±2% Cu was retained on the first filter and 65±12% Eu was retained on the second filter (FIG. 11A). Characterization of the recovered material revealed almost full separation of the deposited Cu and Eu (with EDX mapping (FIG. 11A); the purity of the recovered Cu is qualitatively evident in the color map (FIG. 11B). Note that the EDX spectra (FIG. 11C) indicate some contribution of Eu on Filter 1 and Cu on Filter 2).

As observed for the high purity solutions of a single target metal, Cu crystals were deposited across the upstream filter surface and layered amorphous Eu was observed on the downstream filter (FIG. 11A). Elemental mapping (FIG. 11B) revealed almost full separation of Cu (green) and Eu (red), with only a small amount of Eu on the first filter. Counter ions were also captured on the filter (FIG. 11C), which included sulfur and chlorine (likely as sulfate and chloride, respectively) from the electrolyte and metal salts. Again, the metals were recovered as metal oxides, and the proposed mechanism of oxide formation via hydroxide intermediates prevailed in mixed solution.

Figure 7B:
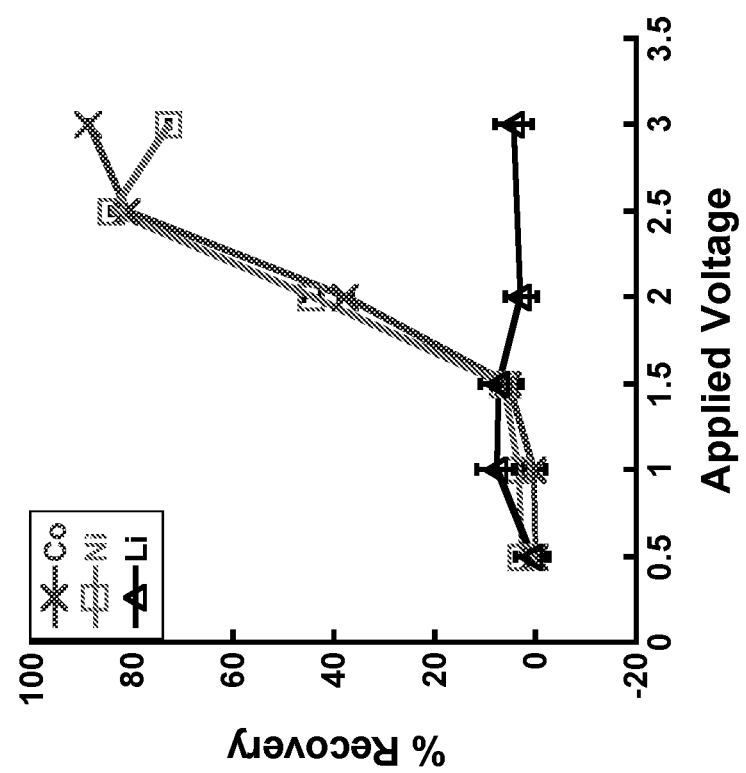
Figure 16:
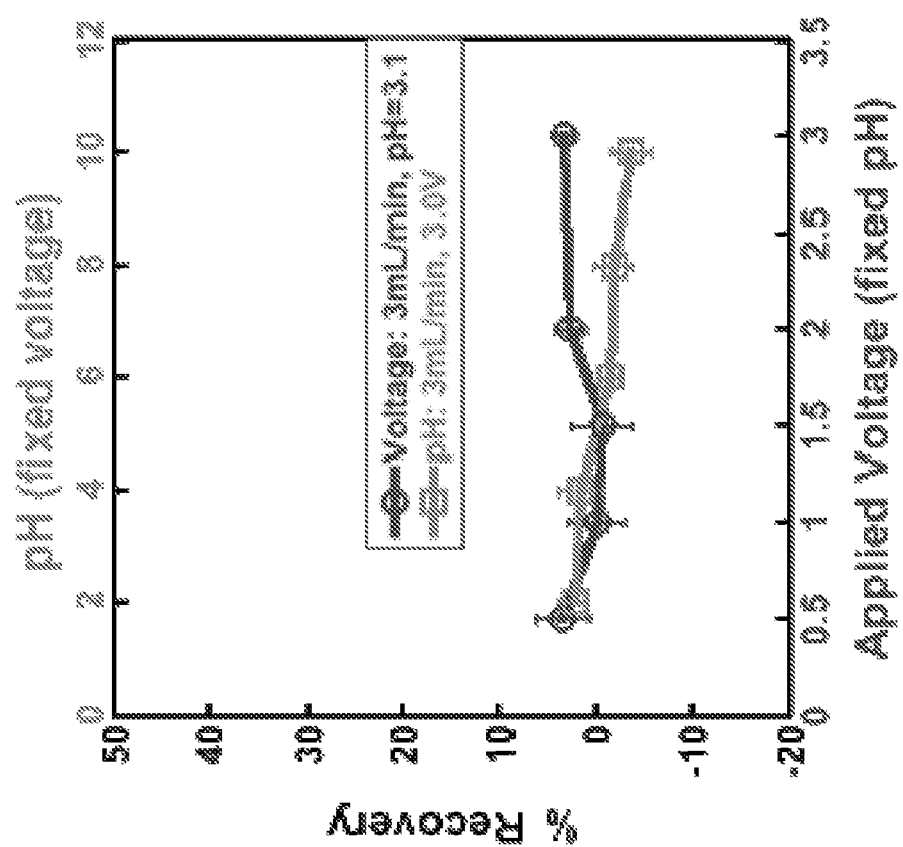
FIG. 16 is a plot of As recovery as a function of pH with fixed voltage and applied voltage with fixed pH.

At high voltages (e.g., those needed for any metal with a high reduction potential), where both water splitting and oxygen reduction generate hydroxide ions, the application of the method may favor those materials that form stable, insoluble hydroxides. Since no such hydroxides are formed for arsenic (neither As(III) nor As(IV)), it is unsurprising that As was unretained at all tested pHs and voltages (FIG. 16). Nevertheless, GaAs is commonly used in the semiconductor industry in a variety of applications, including integrated circuit chips, diodes, and solar cells, and separating Ga from As could be of value for both commercial and environmental objectives (Szweda, Gallium Arsenide, Electronics Materials and Devices. A Strategic Study of Markets, Technologies and Companies Worldwide 1999-2004. 3 ed.; Elsevier: 2000). Ga may be effectively retained using electrochemical precipitation, but As may remain solubilized and pass with the permeate. Subsequent treatment methods to remove As could then be used for the purification of As from the waste stream (Mohan & Pittman Jr, Journal of Hazardous Materials 2007, 142, (1-2), 1-53). Testing of Ga and As using the filtration system of the present invention has shown that Ga recovery at 3.0V is 77±0.4%, while recovery of As at 3.0 V is only 3±1% (FIG. 7B).

The filter has shown some differences in recovery when a preliminary e-waste stream was processed in our system. Here, an electronic component from a cell phone was acid digested, pH adjusted, and run through two filters set at different voltages, reclaiming bulk metals on the first in series at a low voltage, and RESE on the later, higher voltage stage. This initial trial worked well, separating most of the bulk metals from the RESE, with an approximate purity of 68% on the second stage (FIG. 17A-17C). Together with the bulk metals and RESE, As was also retained on the second filter. This was unexpected, as As had close to zero percent recovery in the proof-of-concept studies (FIG. 16).

(For example, which would be of particular interest to the semiconductor manufacturing industry for in-stream separation capability)

In conclusion, single metals were successfully recovered from solution using a novel electrochemical deposition method, forming micro crystals and large-area platelets. Two metals were also recovered and separated from a mixed metal stream in a proof-of-concept case. The ability to separate easy-to-reduce bulk metals from RESE presents an encouraging new route for metal recovery. This could be commercially important, particularly in nanomanufacturing waste streams where small but valuable levels of metal are being lost with current recycling technologies. In addition, the technology might be useful for the treatment of high volume legacy wastes rich in metals, such as coal combustion residues.

Example 3: Influence of Electron Mediators

In the absence of electron mediators, the mechanism of recovery using the filtration apparatus of the present invention is an oxygen reduction mechanism, which is augmented by both dissolved molecular oxygen and oxygen derived from water splitting. These two reduction reactions occur at high applied voltages (>1.5 V in this system) and might be avoided if electron transfer were possible at lower voltages. In other words, if electrons could be carried through the solution to the RESEs prior to hydroxide-trapping, then they might be reduced to their zero-valent forms. To overcome this challenge and reclaim zero-valent metals instead of metal oxides, molecular additives (e.g., electron mediators) are used to increase collection efficiency by facilitating faster electron transfer via a the mediator molecule. Specifically, a class of additives called redox mediators (Sander, et al., Environmental Science & Technology 2015, 49, (10), 5862-5878), or electron-shuttling molecules, is investigated (Table 3). Note that some of these mediator molecules may act as metal ligands, but would not necessarily interact with dissolved molecular oxygen, and so they might be able to facilitate direct electron transfer to the desired metals.

TABLE 3

Electron mediator structures, reduction potentials vs standard hydrogen electrode (SHE), and number of electron transferred.

| Redox Mediator | Structure | $E_H^\circ$ (V) | ne$^-$ |
| --- | --- | --- | --- |
| 2,2'-Azino-bis(3-ethylbenzothiazoline-6-sulfonic acid) (ABTS) | | +0.70 | 1 |
| 2,6-Dichloroindophenol (DCIP) | | +0.25 | 2 |

TABLE 3-continued

Electron mediator structures, reduction potentials vs standard hydrogen electrode (SHE), and number of electron transferred.

| Redox Mediator | Structure | $E_H°$ (V) | ne⁻ |
|---|---|---|---|
| Riboflavin 5'-monophosphate (RMP) | | −0.18 | 2 |
| Ethyl viologen (1,1-bis(ethyl)-4,4'-bipyridyl) (BEBP) | | −0.45 | 1 |

Briefly, redox mediators are small, often biologically-derived organic molecules that facilitate redox processes away from the surface of an organism in the liquid phase, increasing the rate at which the reaction can occur. Similarly, in this system, these molecules are used to carry the reduction from the filter surface to the bulk fluid to increase the rate of reduction, thus increasing metal recovery. Similar compounds have been used across many disciplines in applications such as lithium air batteries, dye-sensitized solar cells, and remediation/degradation of various organic pollutants present in industrial wastewaters (Lacey, et al., Electrochemistry Communications 2013, 26, 74-76; Saygili, et al., Journal of the American Chemical Society 2016, 138, (45), 15087-15096; Husain & Husain, Critical Reviews in Environmental Science and Technology 2007, 38, (1), 1-42).

Figure 24:
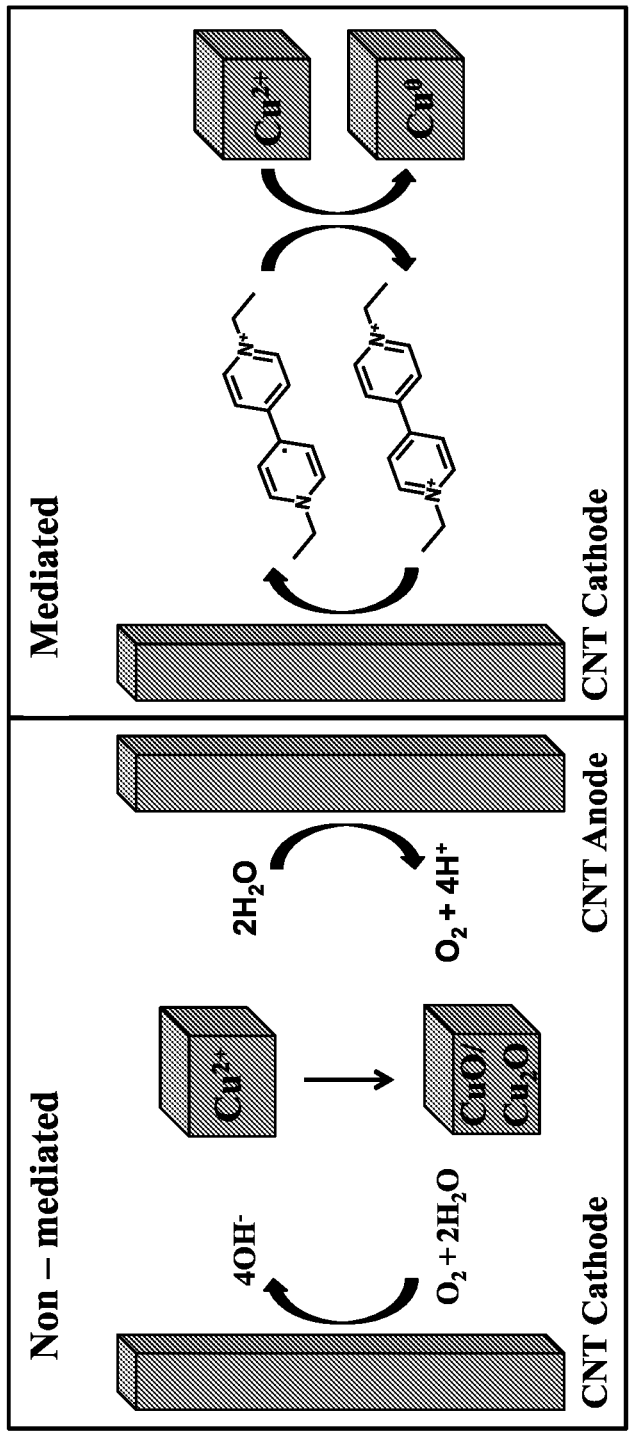
FIG. 24 depicts a comparison of non-mediated and mediated metal capture. Left: Non-mediated electrochemical metal capture through a dissolved oxygen and oxygen derived from water splitting reduction mechanism. Right: Mediated electrochemical metal capture with redox mediator BEBP. Here, the water-soluble redox mediator BEBP is added to solution to facilitate direct electron transfer to the metals in order to outcompete the oxygen mechanism for enhanced zero-valent metal capture.

Here, the redox mediators are added to encourage solution-phase reduction in order to increase the rate of reduction and potentially select for direct metal reduction, rather than oxide-mediated precipitation (FIG. 24). This modification may exert an influence by enhancing electron transfer between the metals and the filter surface via the solution, therefore enhancing zero-valent metal recovery.

Materials and Methods Copper chloride ($CuCl_2$; 99.999% trace metals basis (TMB)), europium chloride ($EuCl_3$; 99.99% TMB), 2,2'-azino-bis(3-ethylbenzothiazoline-6-sulfonic acid) diammonium salt (ABTS; ≥98%, HPLC Grade), 2,6-dichloroindophenol sodium salt hydrate (DCIP; BioReagent Grade), ethyl viologen dibromide (BEBP; 99%), and riboflavin 5'-monophosphate sodium salt (RMP; tested according to Ph. Eur.) were all purchased from Sigma-Aldrich (St. Louis, Mo.). Multi-walled carbon nanotube buckypaper filters encapsulated in polyvinyl alcohol were custom-made by NanoTech Labs (Yadkinville, N.C.). Hydrophilic polytetrafluoroethylene (PTFE; 5 μm pore size) membranes and sodium sulfate ($Na_2SO_4$; GR ACS grade) were purchased from EMD Millipore (Darmstadt, Germany).

Figure 25:
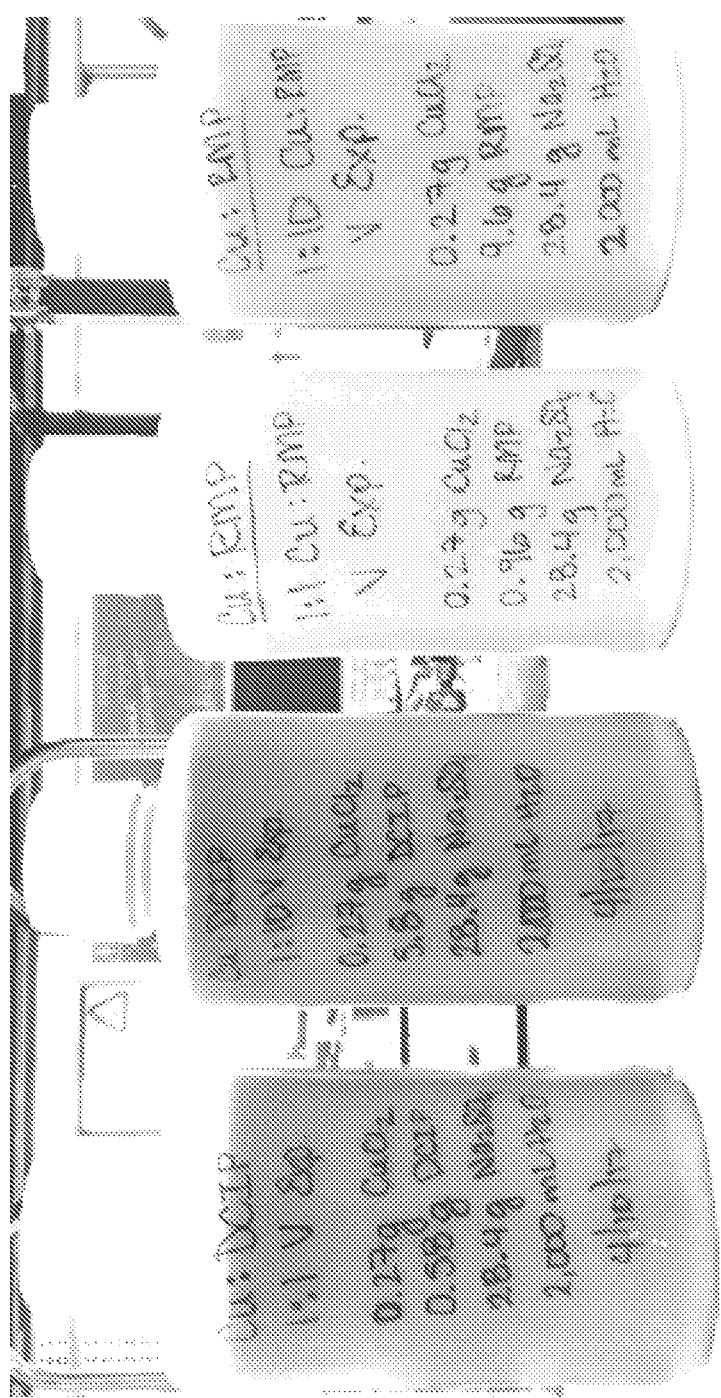
FIG. 25 is a photograph of original solutions of 1:1 and 1:10 Cu:DCIP and Cu:RMP. Note the low optical clarity of each solution and the immediate precipitate formed at the bottom of the RMP bottle, indicating strong affinity for Cu.

Filter design and operation is described elsewhere herein. All solutions for the electrochemical experiments were prepared in acid-washed glassware (washed for at least one week in 25% v/v HCl followed by one week in 50% v/v $HNO_3$), with 1 mM metal and 100 mM $Na_2SO_4$ (as an electrolyte) for Cu and Eu with BEBP, and 1 μM and 100 μM for Cu and Eu with RMP, DCIP and ABTS. Note that the lower metal concentration for RMP, DCIP, and ABTS experiments were necessary due to the visible decrease in optical clarity when Cu and Eu were added to solution at the 1 mM concentration, and a desire to keep the metal:mediator ratio consistent (1:1, following previous studies, or 1:10 to investigate an excess-mediator case; the optical clarity of 1 mM:1 mM and 1 mM:10 mM Cu:DCIP and Cu:RMP are shown in FIG. 25). The BEBP study was tested in triplicate, and the RMP, DCIP and ABTS studies were performed in duplicate. Effluents were collected and quantified for each metal using inductively coupled plasma mass spectrometry (ICP-MS; Perkin-Elmer ELAN DRC-e), absorption measurements were performed using a UV-visible spectrophotometer (UV-Vis; Agilent 8453) and cyclic voltammetry experiments were performed using an electrochemical potentiostat (CHI604E) with a glassy carbon working electrode, a platinum counter electrode, and a silver-silver chloride (Ag/AgCl) reference electrode (BASi).

Recovery experiments were performed across a wide voltage range with the electron mediators BEBP, RMP, DCIP and ABTS to determine if enhanced metal capture was possible in the presence of mediator molecules. Cu and Eu were tested with 1:1 and 1:10 molar ratios with each mediator added to solution. The voltage range tested was 0.0 V-2.0 V and 0.0 V-3.0 V, respectively. In addition, cyclic voltammetry experiments were performed with Cu at 1:1 and 1:10 molar ratios with each of the mediators. Here, the metal and mediators were tested in a conventional three-electrode system with 100 mM $Na_2SO_4$ and performed at a scan rate of 0.1 V/s and at a potential range of −1.5 V to 1.5V for BEBP and −1.0 V to 1.0V for RMP, DCIP, and ABTS.

To determine if the mediators were physically absorbing to the CNT filter and/or if the high voltages used in the system were degrading the mediators, UV-Vis absorption measurements were taken of each influent and effluent solution from the mediator-amended capture recovery experiment and pre- and post-sorption samples. For the sorption experiment, 1:1 and 1:10 molar ratios of metal:mediators in biological oxygen demand (BOD) bottles were prepared with one, pre-wet (i.e., soaked in milliQ water for at least two weeks) CNT filter added to each. These solutions were capped with no headspace, stored under a water layer and wrapped in parafilm, and left in the dark for 16 days until equilibrium was established. All absorbance measurements were taken in a quartz cuvette with a 1 cm path length across the UV and visible range (i.e., 200-800 nm).

The results of the experiments will now be discussed

Four mediators were tested (Table 3), all with unique reduction potentials (ranging from +0.70 $V_{SHE}$ to −0.45 $V_{SHE}$) and number of electrons transferred (1 or 2) in order to facilitate faster or more efficient reduction between the metals and the CNT surface and to enhance metal capture.

Of the four molecules tested, ABTS is the mediator with the highest reduction potential at 0.49$V_{Ag/AgCl}$ and has a one-electron transfer. When added to solution with Cu and tested across the voltage range, the metal capture increased slightly at 2.0V for the 1:1 Cu:ABTS ratio to 87±0.2%, compared to 83±0.3% as seen with no mediator. Increasing the mediator abundance to 1:10 metal:mediator ratio gave slightly lower recovery at 78±0.4% (FIG. 26A), consistent with a mechanism wherein the mediator is not limiting (i.e., electrochemically destroyed or present in insufficient molar equivalence). At lower voltages, Cu with no mediator outcompetes both the 1:1 and 1:10 ratio from 0.1-1.0V, but then all three have similar recoveries between 1.0-1.5V. Overall, there was no mediator-based enhanced recovery of Cu for the ABTS system at any voltage or mediator loading.

Following ABTS, DCIP and RMP have the second and third highest reduction potentials at 0.04 $V_{Ag/AgCl}$ and −0.39 $V_{Ag/AgCl}$, respectively both with a two-electron transfer. Here, a very similar trend to ABTS is shown for the mediators where the recovery is lower for both 1:1 and 1:10 ratios compared to the non-mediated case from 0.1-1.0 V (FIGS. 26B and 26C). At 1.0 V, the recovery increased to 91±0.2% and 90±0.2% for 1:1 and 1:10 Cu:RMP, as well as with the 1:1 and 1:10 DCIP resulting in 79±0.5% and 82±0.6% recovery, both against the non-mediated case at 75±0.5%. The recovery then levels out or is slightly lower at the highest voltages, 1.5 and 2.0 V. Thus, the minor recovery enhancement provided by the mediator is only discernable over a narrow voltage range (1.0-1.5 V).

The final mediator tested was BEBP with a reduction potential of −0.66 $V_{Ag/AgCl}$ and a one-electron transfer. Both the 1:1 and 1:10 ratios resulted in unique trends compared to the other redox mediators. Here, recovery was enhanced in the presence of the mediator at the lowest voltages (i.e., 0.1-1.0 V), then rapidly decreased at 1.5 V to 43±1.3% and 37±1.4%, compared to the non-mediated case of 76±1% recovery. The 1:10 Cu:BEBP then surpasses the non-mediated case again at 2.0V, with 99±0.02% to 87±0.6%, respectively, while the 1:1 case remained low at 64±0.7% (FIG. 26D). Note that the significantly higher recovery of metal in the presence of 1:10 Cu:BEBP as compared to 1:1 Cu: BEBP was also observed at 1.0 V. This non-monotonic behavior of BEBP (and all of the other mediators) was further investigated by standard control experiments, such as cyclic voltammetry, sorption, and mediator destruction tests (as assayed by UV-vis spectrophotometry).

Note that in the 1 μM solutions, significant passive removal of the Cu was observed at zero voltage with the mediators and in the non-mediated case, and this was likely due to coordination of the $Cu^{2+}$ ions with the surface chemical functionality of the PVA-amended CNTs. (In the 1 mM $Cu^{2+}$ case (FIG. 26D), the removal is trivial relative to the starting concentration). Nevertheless, voltage still enhances recovery via some electrochemically-mediated mechanism.

To elucidate the underlying mechanisms for the irregular voltage dependence of the recovery profiles in the presence of mediators, cyclic voltammetry was performed for 1:1 and 1:10 molar ratios for Cu:ABTS, Cu:DCIP, Cu:RMP, and Cu:BEBP (FIG. 27A-27D). For ABTS, a redox potential of 0.49 $V_{Ag/AgCl}$ was evident in the ABTS-only case, agreeing with the theoretical value (Sander, et al., Environmental Science & Technology 2015, 49, (10), 5862-5878), as well as in the 1:1 and 1:10 Cu:ABTS mixtures (FIG. 27A). Notably, the Cu reduction peaks (corresponding to the one and two electron reduction of Cu at −0.05 $V_{Ag/AgCl}$ and 0.11 $V_{Ag/AgCl}$, respectively) were present in the Cu only case and remained apparent in the 1:1 Cu:ABTS case. However, they were not evident in the 1:10 Cu:ABTS solution (FIG. 27A). This is due to the difference in starting concentration of the Cu in the 1:10 case compared to the 1:1 ratio, where the ABTS peak obscures the Cu reduction peak due to the differences in abundance.

The DCIP and RMP cyclic voltammograms (CVs) reveal potentials at 0.048 $V_{Ag/AgCl}$ and −0.43 $V_{Ag/AgCl}$, respectively, both in accordance with expected values. Here, in the presence of Cu, DCIP shows an interesting peak shift at 0.5 $V_{Ag/AgCl}$ for both 1:1 and 1:10 molar ratios. RMP behaves similarly to ABTS where the Cu peak disappears at the 1:10 ratio due to the difference in starting concentration (FIGS. 27B and 27C). Overall, all three redox mediators show alike behavior where the Cu peaks are (a) either shifting in the presence of mediator at both molar ratios or (b) the disparity in peak height due to concentration differences makes it difficult to interpret the behavior. This observed peak shift is consistent with Cu binding with these organic molecules. Note that the scan rate for all CVs was the same, but the potential range was not. The potential range would have to be the same to draw accurate intercomparisons. Nevertheless, it is possible that the shifts persist when the experiments are repeated over the same potential range.

BEBP gives rise to an entirely different behavior compared to the other three mediators (FIG. 27D). The BEBP-only and Cu-only CVs show expected reduction potentials corresponding to the one electron reduction of BEBP at −0.65 $V_{Ag/AgCl}$ and the two-electron reduction of Cu at 0.10 $V_{Ag/AgCl}$. When 1 mM Cu was added to 1 mM BEBP, the BEBP and Cu peaks are still evident, in addition to two new peaks with reduction potentials of −0.25 $V_{Ag/AgCl}$ and 0.84 $V_{Ag/AgCl}$. Previous work has shown that methyl viologen (MV) produces a radical upon reduction (Rieger and Edwards, The Journal of Organic Chemistry 1988, 53, (7), 1481-1485), and the reduction of ethyl viologen (EtV; i.e., BEBP) is analogous to the reduction of MV (Lacey, et al., Electrochemistry Communications 2013, 26, 74-76; Equation 4):

$$EtV^{2+} \rightarrow EtV^{+}. \qquad (4)$$

Further, oxygen has also been shown to react with viologen cation radicals to form superoxide (Bird and Kuhn, Chemical Society Reviews 1981, 10, (1), 49-82; Nanni, et al.

Journal of the American Chemical Society 1981, 103, (14), 4268-4270; Equation 5) and mediate the reduction of superoxide to peroxide (Yang, et al., Chemical Communications 2015, 51, (9), 1705-1708; Equation 6):

$$2MV^+ + O_2 + H_2O \rightarrow 2MV^{2+} + HO^{2-} + HO^- \quad (5)$$

$$EtV^+ + HO^{2-} + H^+ \rightarrow EtV^+ + H_2O_2 \quad (6)$$

Here, the two peaks that emerged in the CV of 1:1 and 1:10 Cu:BEBP corresponded to the one electron reduction potential for $O_2/HO^2$. and the two electron reduction potential for $HO^2/H_2O_2$, consistent with the onset of the mediated reduction of oxygen to superoxide and superoxide to peroxide (Eqns 5 and 6). One additional peak was seen in the 1:10 Cu:BEBP CV scan, at a reduction potential of −0.91 $V_{Ag/AgCl}$, corresponding to the reduction of water to hydrogen (Haynes, W. M., CRC Handbook of Chemistry and Physics. CRC press: 2014). One might expect augmented formation of rare earth and specialty element oxides (RESEOs) with the enhanced production of excess electrochemical hydroxides. This was confirmed via visual observation and XPS, indicating capture of a mix of $Cu_2O$, $CuO$, and $Cu(OH)_2$ (FIGS. 28A and 28B).

When adding ABTS to a solution of Eu, the recovery was lower at 3.0 V for both the 1:1 and 1:10 Eu:ABTS ratios, to 91±0.6% and 86±1% at 3.0V, respectively, compared to 98±0.1% without a mediator. For the lower voltages, the 1:10 ratio has higher recovery than 1:1 from 1.0-2.5 V, but similar recovery to the no mediator result (FIG. 29A). DCIP and RMP showed the same trend, where there was a lower recovery at the lower voltages and the 1:10 recoveries are enhanced relative to those in the 1:1 cases, and nearly the same recovery was observed at the highest voltages, compared to the non-mediated cases. (FIGS. 29B and 29C).

Figure 30B:
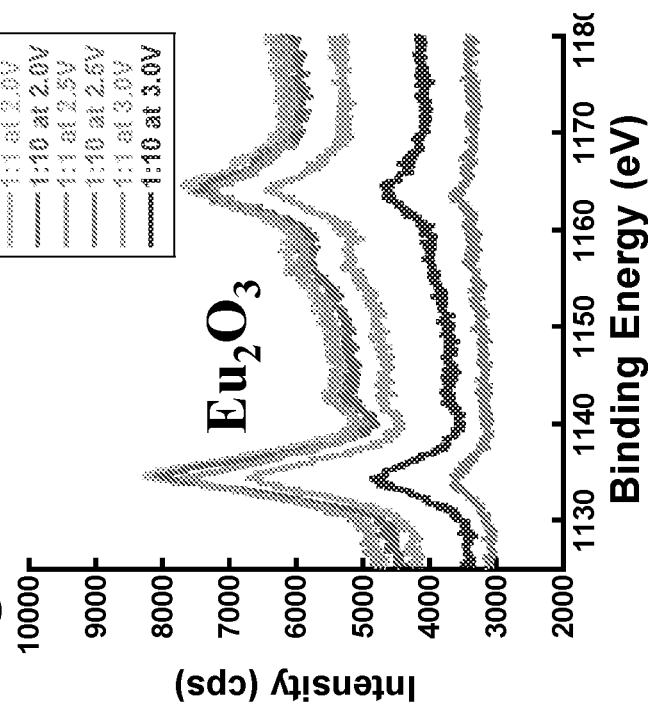
FIGS. 30A and 30B depict the capture of Eu$_2$O$_3$ in Eu:BEBP experiments.
Figure 30A:
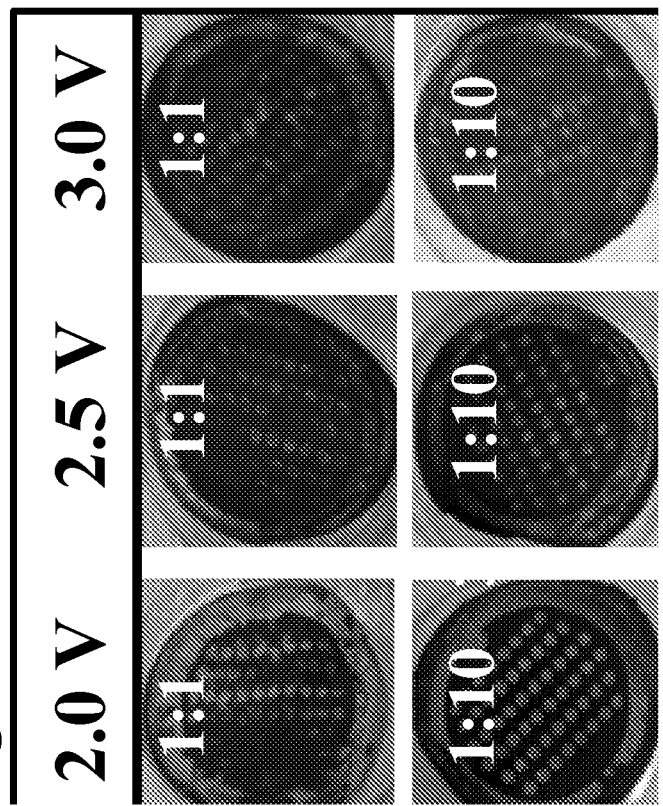

As was the case for Cu, BEBP had very different behavior than ABTS, RMP, and DCIP. Here, the recovery was enhanced at 1.5 V, to 19±1% and 30±1% for the 1:1 and 1:10 ratios, compared to only 5±1% with no mediator added. A slight decrease is seen at 2.5 V for both ratios, but the 1:10 Eu:BEBP molar ratio exhibited systematically higher recovery over all voltages above 1.0 V (FIG. 29D). XPS data indicates that we captured $Eu_2O_3$ at 2.0, 2.5, and 3.0 V for both 1:1 and 1:10 Eu:BEBP (FIGS. 30A and 30B). Note that CVs are not shown due to the low reduction potential of Eu (−2.20 $V_{Ag/AgCl}$), where water splitting obfuscates any visible Eu peaks.

To determine whether or not there were significant losses due to sorption of the mediator or mediator-metal complex or electrochemical breakdown of the mediator, the influent and effluent solutions were interrogated using UV-vis spectrophotometry. The absorbance measurements were taken for the original starting solution, the effluent from the sorption experiment, and the effluents from each of the different voltages tested at both the 1:1 and 1:10 ratios, including the 0 V control case (FIGS. 31A-31B and FIGS. 32A-32B). From these absorbance spectra, the $\lambda_{max}$ values for each mediator were determined (FIGS. 33A-33B and FIGS. 34A-34B).

A peak shift is observed for ABTS, RMP, and DCIP when Cu and Eu are added to solution, compared to the free redox mediator signal (FIGS. 33A-33B and 34A-34B). These data suggest both metals could be binding to these redox mediators, further supporting the Cu CV data and interpretation. In contrast, the BEBP signal does not shift, reinforcing the interpretation of the electrochemical behavior with Cu seen in the CV, which is consistent with no metal complexation, but the formation of an ethyl viologen (BEBP) radical promoting superoxide and peroxide formation. While these shifts in $\lambda_{max}$ do suggest metal complexation for ABTS, DCIP, and RMP, it should be noted that all of these peaks are ambiguous (i.e., the peaks represent both the free mediator and the metal-mediator complex combined, making it difficult to interpret with complete confidence).

Figure 31B:
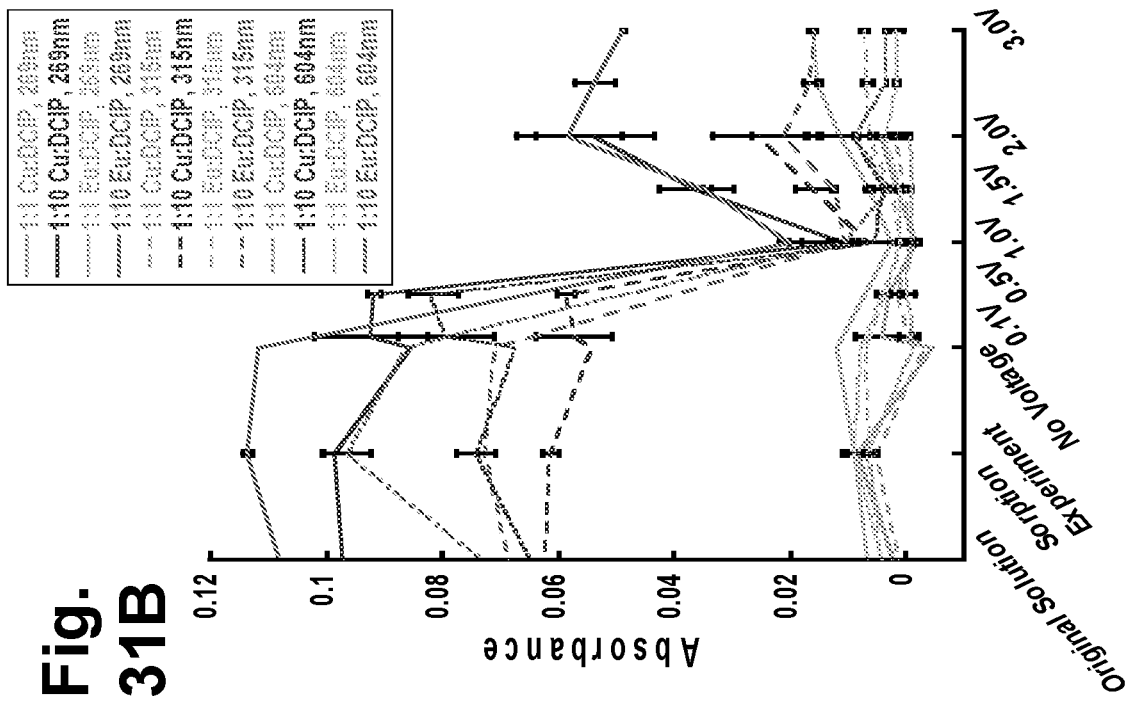
FIGS. 31A and 31B depict the results of mediator-amended absorption measurements.
Figure 31A:
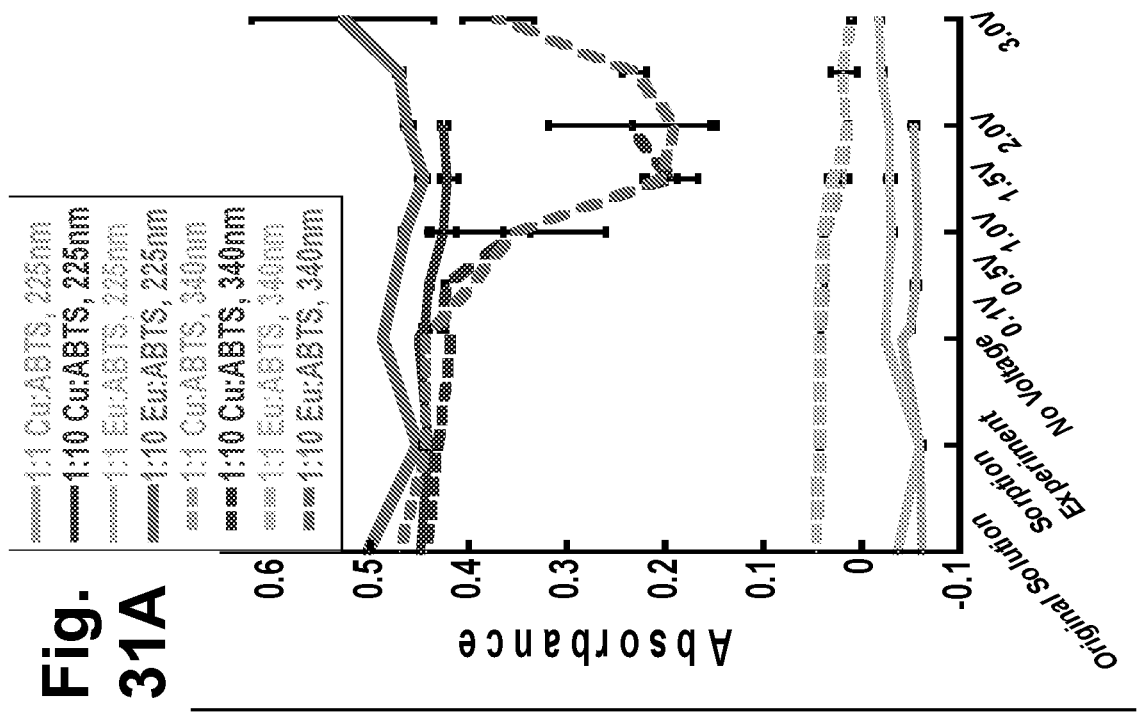

For ABTS, there is evidence of sorption after 16 days, especially in the Eu:ABTS solutions (11% and 6% absorbance signal loss compared to the original solution for 1:1 and 1:10, respectively), but no evidence of sorption in the no voltage case (FIG. 31A). This result suggests that the bulk fluid flow transit times past the filter were fast relative to sorption, which should occur over longer time scales (e.g., at least 3 days for a compound the size of toluene). Over the tested voltage range, the absorbance at 340 nm (the peak corresponding to the free mediator and the Eu- or Cu-bound mediator) drops dramatically from 1.0 V to 2.0 V for both Cu and Eu, and this starts to increase again from 2.0 V to 3.0 V for Eu. In contrast, the absorbance at 225 nm remains the same over the entire range, indicating the mediator itself is not breaking down. Here, it may be possible that the Cu:ABTS and Eu:ABTS metal-ligand complexes are captured on the filter surface where the mediator absorbance decreases (i.e., is captured on the filter when the mediator is turned "on" or in its reduced form), until the oxygen mechanism starts to outcompete the mediator, thereby separating the metal from the mediator.

The DCIP results show no evidence of sorption in the no voltage flow-through case or in the 16-day batch equilibrium experiment (FIG. 31B). As a function of voltage, the observed trend was similar to ABTS, where the absorbance drastically decreases at 1.0 V and then starts to increase again at 1.5 V-3.0 V for Eu and Cu, indicating that no electrochemical breakdown of the mediator itself occurred. These data, combined with the peak shift in the absorbance spectra and the CV in the presence of metal, imply that the Cu and Eu are captured as the metal-mediator complex when the mediator is turned on at 1.0 V, but are then outcompeted by the previously demonstrate oxygen-capture mechanism at higher voltages. XPS might be able to corroborate the change in captured metal speciation from 1.0 V to 1.5 V and above, but the metal mass and deposition horizon (i.e., within the filter as opposed to on the surface of the filter) prohibits direct interrogation of the captured metal material due to mass and access limitations.

Figure 32B:
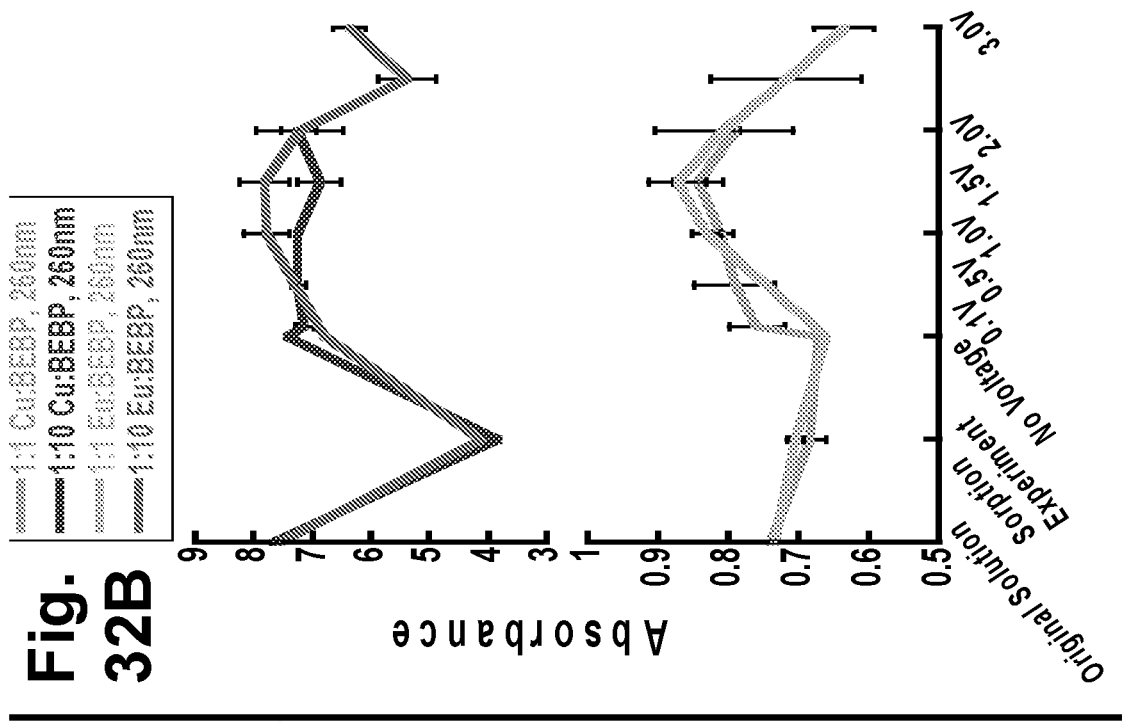
FIGS. 32A and 32B depict the results of mediator-amended absorption measurements.
Figure 32A:
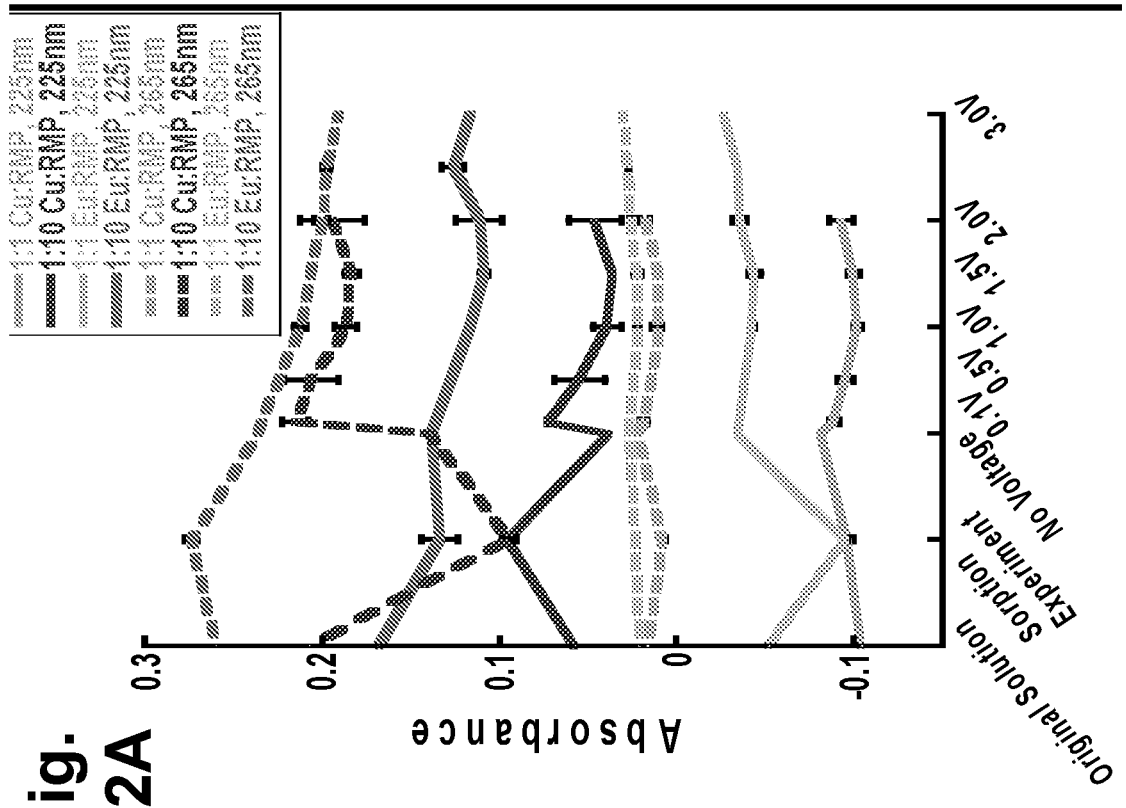

The data for RMP suggest sorption is occurring over 16 days and in the no voltage case (FIG. 32A). The solubility of RMP is 100 g/L and the concentration was 0.005 g/L in the 1:10 solution (i.e., the experiment was operating at 0.005% saturation, so losses at this concentration should not be expected; solubility values for ABTS, RMP, and DCIP are listed in Table 4). This loss at the no voltage stage is due to RMPs possible stronger affinity for Cu and Eu compared to ABTS and DCIP, confirmed through visual observation during the solution prep of 1 mM:1 mM Cu:RMP where immediate precipitate was formed. Note: even at the higher concentration of 1 mM Cu and 10 mM BEBP, aqueous saturation of BEBP is only 5%). Similar to ABTS and DCIP, the RMP voltage absorbance data exhibit a less drastic decrease in mediator signal around 1.0 V, and then a steady increase from 1.0 V to the highest voltages. These data suggest the Cu and Eu are being captured as a metal complex with RMP when the mediator is reduced (i.e., "turned on"), but is competing with the oxygen mechanism at higher voltages. In mediator-free experiments, RESEOs were observed starting at 1.5 V, confirming this region of applied voltages is consistent with a predominant oxygen capture mechanism. These data also imply no electrochemical breakdown is occurring across the voltage range tested.

TABLE 4

Solubility values for the redox mediators in water.

| Redox Mediator | Solubility in water |
|---|---|
| ABTS | 10 mg/mL |
| DCIP | 10 mg/mL |
| RMP | 100 g/L |

BEBP absorbance data indicate high sorption is occurring over equilibrium timescales (i.e., in the 16-day experiment), but there is no evidence of sorption when transport past the filters is fast (i.e., in the no voltage control experiment) (FIG. 32B). This is similar to ABTS, where sorption is only evident over longer time scales. Although BEBP has the lowest molecular volume of the four tested mediators, the strongest sorption is likely driven by the lack of polar moieties (i.e., no permanent dipole, discouraging favorable interactions with water) and lower polarizability of BEBP. The absorbance over the voltage range did not indicate any mediator was being captured on the surface or that there was a transition to an oxygen-dominated capture mechanism, supporting the hypothesis of the radical enhanced oxygen mechanism is responsible for the recovery of Eu and Cu. Further, BEBP has no free lone pair electrons centered on sterically available heteroatoms, and thus, should not be able to coordinate a metal.

Figure 35:
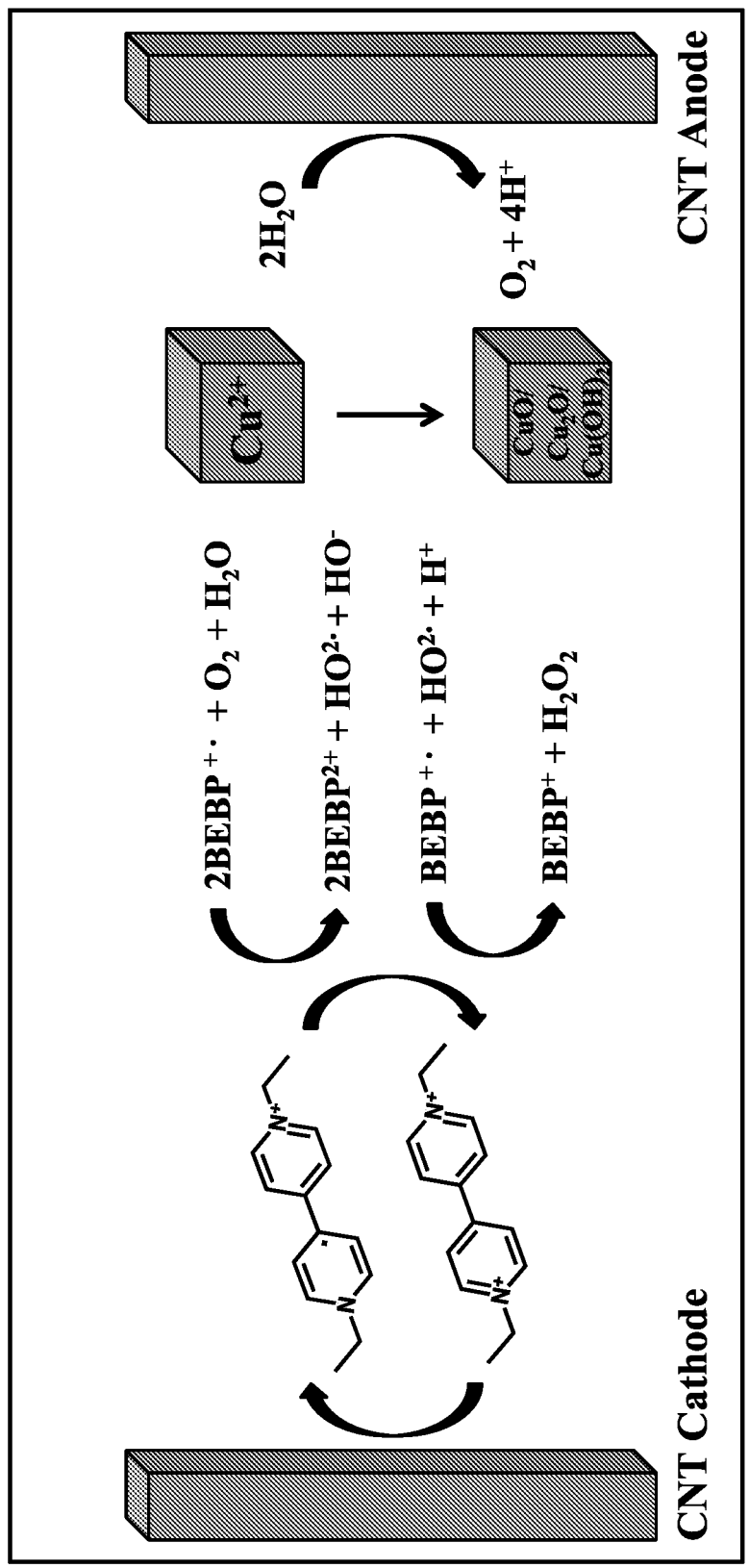
FIG. 35 is a depiction of the influence of BEBP on metal capture. BEBP facilitates a radical enhanced oxygen reduction mechanism, capturing Cu as Cu oxides. Higher metal capture is seen at lower voltages for Cu and Eu with this mediator added compared to the non-mediated case.

Overall, while not immediately obvious, the recovery trend for Cu:BEBP can be explained jointly considering radical formation and electron transfer reactions (FIG. 35). Here, what was observed was an increase at 1.0 V for both 1:1 and 1:10 molar ratios, a decrease at 1.5 V for both ratios, and then an increase at 2.0 V for the 1:10 Cu:BEBP molar ratio only. From the radical enhanced oxygen reduction mechanism described in section 4.3.2. (Eqns 4-6), it is possible that the mediator is enhancing oxygen reduction at 1.0 V. At this same voltage in the non-mediated case, there was no recovery of Cu because the oxygen reduction was not yet active, suggesting BEBP is indeed increasing recovery through the radical enhanced mechanism. To explain the decrease in recovery at 1.5 V, the following may be possible: at 1.5 V, the Cu reduction mechanism is turned on (i.e., reduction of Cu (II) to Cu (I) or Cu (0); such that recovery of Cu in the non-mediated solution can be observed). Here, it is also still competing with the ongoing radical initiated oxygen mechanism, likely yielding a mix of Cu oxide and reduced Cu, the latter being a kinetically limited or slower process, which leads to the decrease in recovery. Taken together, the competition between the reduction of Cu and reduction of oxygen was likely responsible for the decrease in overall recovery.

The 1:10 ratio then shows an increase at 2.0 V where the mediated oxygen reduction mechanism dominates again with help from water splitting (only occurring at high voltages). This is supported by reduction of hydrogen seen in the 1:10 Cu:BEBP CV (FIG. 27D). The systematic lower recovery at the 1:1 ratio at 1.0 V and 2.0 V is likely a result of insufficient molar equivalence, where not enough mediator was present to support high recovery, as was achieved at the 1:10 molar ratio.

Eu:BEBP shows a very similar trend to Cu:BEBP, indicating the same phenomenon is occurring where the mediator is enhancing oxygen reduction at the lower voltages (compared to the non-mediated case), and the 1:10 molar ratio outperforms the 1:1 ratio due to an insufficient amount of mediator in the 1:1 case. Unfortunately, as mentioned earlier, these data cannot be supplemented by CV data as water splitting obstructs any Eu peaks in the voltammograms. Nevertheless, the voltage data combined with the UV-vis data suggest the same radical enhanced oxygen mechanism is at play as shown with Cu.

Figure 36:
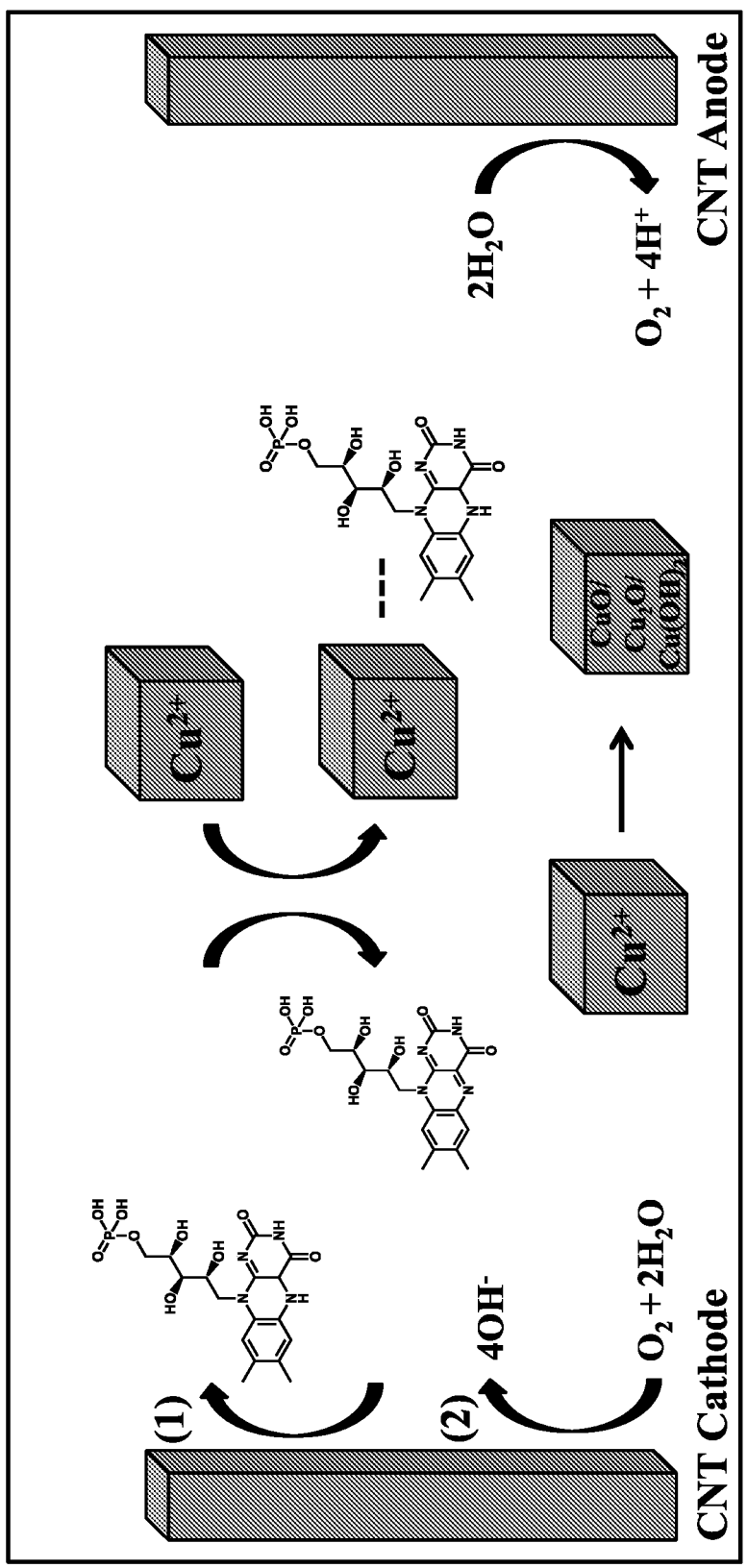
FIG. 36 is a depiction of the influence of ABTS, DCIP, and RMP on metal capture. (1) ABTS, DCIP, and RMP facilitate metal-mediator capture at lower voltages due to metal complexation when the mediators are "turned on", or in their reduced state. (2) The oxygen reduction mechanism outcompetes the mediator capture at higher voltages, thus rendering the mediators ineffective.

As for ABTS, RMP, and DCIP, the combined data suggest that these mediators are binding to both Cu and Eu, supported by the shifts we see in the CVs and max values in the UV-vis spectra. This helps explain the behavior across the voltage ranges (FIG. 36): the decreased recovery at lower voltages with the mediators added, compared to the non-mediated cases, is likely due to the mediators binding to the metals, thus inhibiting metal capture until these mediators are activated around 1.0 V, where it is possible that metal capture then increases due to metal-mediator precipitation on the filter surface (FIG. 36 (1)). This is supported by the decrease observed in mediator concentration in the UV-vis data (FIGS. 31A-B and 32A-B). A rebound in mediator concentration at the highest voltages is observed, where the oxygen mechanism starts to dominate, capturing the metals as metal oxides (FIG. 36 (2)).

Stability constants could not be calculated for the Cu complexes because the Cu peaks were obstructed by mediator peaks in some of the 1:10 CVs. In addition, chemical speciation studies (e.g., via x-ray photoelectron spectroscopy (XPS)) on these precipitates have not yet been conducted, primarily because the formation of precipitates in these experiments was on the internal surface of the filter (e.g., co-located with the electrochemical production of hydroxide) and/or because in all 1 µM Eu and Cu experiments, the amount of solid formed was insufficient to allow for targeting of the precipitate via XPS.

For BEBP, the addition of redox mediators was partially successful with enhanced capture seen with Cu and Eu at lower voltages through a radical enhanced oxygen mechanism; i.e. a third pathway to generate reactive oxygen was likely and is consistent with literature observations. The other three mediators, ABTS, DCIP, and RMP, did show some enhanced metal capture with Cu, but it may be possible that the enhanced capture was due to the metal binding to the mediators themselves, not from direct electron transfer as expected.

Example 4: Recovery of Metal from Filter

The novel electrochemical filter technology of the present invention can separate bulk metals from RESE and capture more than 65% of those separated metals on individual filters as solid metal oxides. However, these materials must be recovered for direct manufacturing processes (i.e., supplanting the need for primary metals by substituting secondary sources). If the recovered metals can be effectively removed from the filters as solid targets by mechanical scraping (e.g., if sufficient material is collected on the top surface of the filters and mechanical integrity of the filter allows repeated scraping events) or combustion of the filters, it may enable such direct reuse. In contrast, metals deposited on interior filter surfaces (e.g., on the internal surface of the filter but outer surface of the CNTs) may require acidic flushing of the filter in order to recover the metals in a concentrated aqueous stream.

Thus, the most effective method to recover these metal oxides off the CNT filters was identified, in order to produce usable material for industrial manufacturing. Multiple approaches were examined, including acid rinses, exploring the effect of acid concentration and counter ion choice, as well as total combustion approaches. With these combined results, this work seeks to provide a secondary source of RESE for the critical applications in the clean energy and electronics sectors, helping mitigate the issue of material criticality to enable a closed-loop economy in the electronics sector.

Materials and Methods

Copper chloride ($CuCl_2$; 99.999% trace metals basis (TMB)), europium chloride ($EuCl_3$; 99.99% TMB), hydrochloric acid (HCl; TraceSELECT®), nitric acid ($HNO_3$; TraceSELECT®) and acetic acid ($CH_3COOH$; ReagentPlus®, ≥99%) were all purchased from Sigma-Aldrich (St. Louis, Mo.). Multi-walled carbon nanotube buckypaper filters encapsulated in polyvinyl alcohol were custom made by NanoTech Labs (Yadkinville, N.C.). Hydrophilic polytetrafluoroethylene (PTFE; 5 μm pore size) membranes and sodium sulfate ($Na_2SO_4$; GR ACS grade) were purchased from EMD Millipore (Darmstadt, Germany).

Filter design and operation is discussed elsewhere herein. All influent solutions for the electrochemical experiments were prepared in acid washed glassware (washed for at least one week in 25% v/v HCl followed by one week in 50% v/v $HNO_3$), with 1 mM metal and 100 mM $Na_2SO_4$ (to normalize the ionic strength). All filters tested for recovery with these influent solutions were prepared at the same conditions to reduce inter-filter variability in the metal deposition. These conditions were: 150 mL total volume at 5 mL/min with 1.5 V for Cu and 3.0 V for Eu. Effluents were collected and quantified for each metal using inductively coupled plasma mass spectrometry (ICP-MS; Perkin-Elmer ELAN DRC-e) to obtain overall capture. After the initial metal capture, the filters were left to dry in individual petri dishes on the bench top for at least 24 hours, and were then tested using the different recovery methods that include acid flushing and surface washing with three different acids, total filter digest, and mechanical removal. Liquid extracts and solid digests (details to follow) from these experiments were quantified using ICPMS.

The solution-based extraction techniques experimental matrix included HCl, $HNO_3$, and $CH_3COOH$ at three different "rates" (1 mL/min, 5 mL/min, and surface washing), and three different acid concentrations (1%, 10%, and 50%). The acid flushing experiments were performed with each sample's original cathode and anode at either 1 or 5 mL/min and 150 mL of acid at the specified concentration. The surface washing experiments were performed with 150 mL of acid poured over the surface of the filter manually from a beaker into a plastic effluent bottle. The pH of each starting acid solution was measured using a Hanna Instruments field probe (pH measurements ranged from 0-1 for HCl and $HNO_3$ and 1.5-2.5 for $CH_3COOH$).

For the total filter digest experiments, the samples were folded and placed into 10 mL quartz beakers and oxidized in a small muffle furnace under a low constant flow of compressed air (estimated 10 mL/min) over the following temperature program: 450° C. for 3 hours, ramped to 550° C. for 3.75 hours, followed by 650° C. for 30 minutes. Filters were allowed to cool overnight and then refluxed with 1 mL 16M $HNO_3$ for 30 minutes, followed by 5 mL of 12M HCl for 30 mins. The mechanical removal experiment was performed with the dull edge of a metal razor blade. The razor blade was used to gently scrape the filter to remove the metal deposited. Records of the filters' mechanical integrity were noted in response to the manual scraping event.

The results of the experiments will now be discussed

Figure 37A:
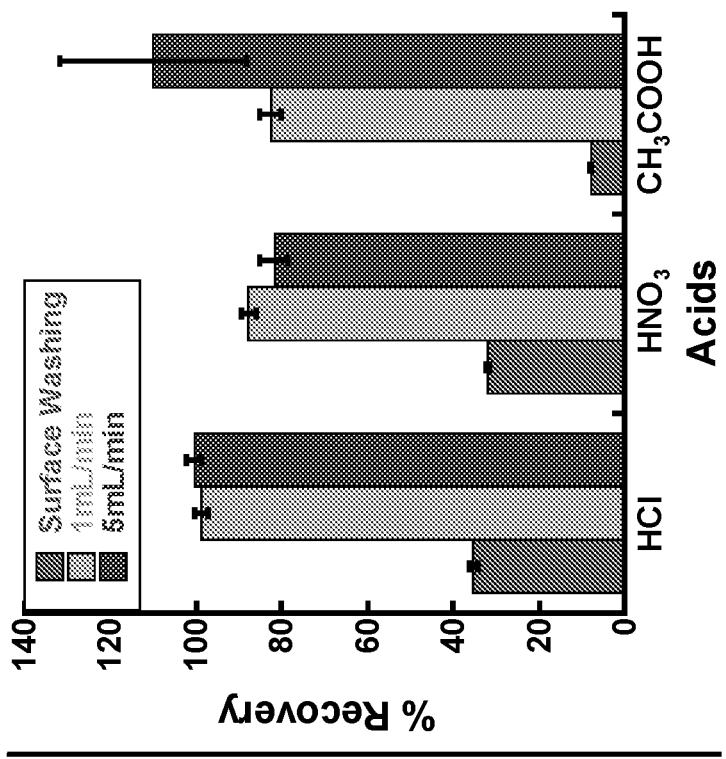
FIGS. 37A and 37B depict the results of copper recovery experiments.
Figure 37B:
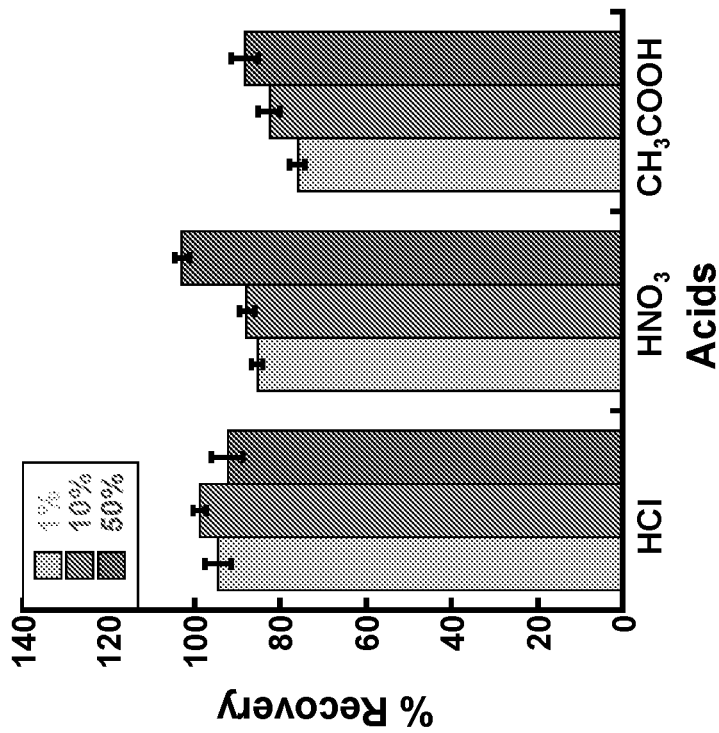

Out of the three acids used to recover Cu from the CNT filters, HCl was the most effective at 1% and 10% v/v at 1 mL/min, recovering over 95±3%. $HNO_3$ and $CH_3COOH$ also worked well at this flow rate, recovering greater than 88±3% of Cu at the highest concentration of both acids (FIG. 37A-B). Notably, the recovery of Cu with HCl remained high (101±2%) at the faster flow rate, indicating recovery off the filters with this acid would remain high if scaled to faster flow rates. Results were similar for $HNO_3$ and $CH_3COOH$, with more than 82±3% recovery at 5 mL/min. Interestingly, surface washing did not work well, resulting in only 4±0.09-44±0.8% recovery for the three acids (FIG. 37A-B). This result may be due to metal depositing within the filter itself, where surface washing could not reach it, and is potentially influenced by the low contact time of the surface-deposited metals with the acid being poured over the filter surface (estimated pour rate of 75 mL/min). This further supports the mechanism described elsewhere herein, wherein a mixture of Cu(I) and Cu(II) deposit and the reduction would likely occur within the filter, whereas the oxide deposition might occur preferentially on the surface of the filter when oxide precipitates are formed in the bulk solution and deposited in the direction of flow. (Note that oxide precipitates could also be generated on the internal CNT fibers, which are not accessible to surface washing). Overall, high recovery of Cu was obtained with all three acids, with HCl being the most efficient at the lowest concentration (where concentration is a driver for cost; full matrix of results Table 5).

TABLE 5

Full matrix of recovery experiment results including all flow rates and acid concentrations.

| Hydrochloric Acid | | | |
|---|---|---|---|
| | 1% HCl | 10% HCl | 50% HCl |
| Surface Washing | | | |
| Cu | 11 ± 0.2% | 35 ± 1% | 30 ± 1% |
| Eu | 30 ± 0.5% | 27 ± 1% | 23 ± 2% |
| Cu Acid Flushing | | | |
| 1 mL/min | 95 ± 3% | 99 ± 2% | 92 ± 4% |
| 5 mL/min | 79 ± 1% | 101 ± 2% | 97 ± 1% |
| Eu Acid Flushing | | | |
| 1 mL/min | 33 ± 1% | 43 ± 2% | 49 ± 4% |
| 5 mL/min | 47 ± 6% | 56 ± 6% | 48 ± 2% |
| Nitric Acid | | | |
| | 1% HNO3 | 10% HNO3 | 50% HNO3 |
| Surface Washing | | | |
| Cu | 44 ± 0.8% | 32 ± 0.4% | filter destroyed |
| Eu | 42 ± 0.7 | 60 ± 2% | filter destroyed |
| Cu Acid Flushing | | | |
| 1 mL/min | 85 ± 1% | 88 ± 2% | 103 ± 2% |
| 5 mL/min | 75 ± 1% | 82 ± 3% | 112 ± 4% |
| Eu Acid Flushing | | | |
| 1 mL/min | 75 ± 2% | 45 ± 0.7% | 55 ± 1% |
| 5 mL/min | 33 ± 0.6% | 52 ± 0.8% | 46 ± 0.8% |
| Acetic Acid | | | |
| | 1% CH3COOH | 10% CH3COOH | 50% CH3COOH |

TABLE 5-continued

Full matrix of recovery experiment results including
all flow rates and acid concentrations.

| Surface Washing | | | |
|---|---|---|---|
| Cu | 6 ± 0.09% | 8 ± 0.2% | 4 ± 0.09 |
| Eu | 8 ± 0.1% | 14 ± 0.1% | 3 ± 0.06 |
| Cu Acid Flushing | | | |
| 1 mL/min | 76 ± 2% | 83 ± 2% | 88 ± 3% |
| 5 mL/min | 77 ± 1% | 110 ± 22% | 93 ± 2% |
| Eu Acid Flushing | | | |
| 1 mL/min | 71 ± 2% | 73 ± 3% | 52 ± 3% |
| 5 mL/min | 67 ± 0.9% | 67 ± 0.8% | 70 ± 1% |

Eu recovery exhibited a higher dependence on the type of acid than Cu, with highest recovery obtained for $CH_3COOH$ and $HNO_3$. Here, more than 71±2% of Eu was recovered off the filters at the lowest concentration of both acids, whereas only 33±1% was recovered with HCl (FIG. 38A-B). Encouragingly, $CH_3COOH$, a potentially more environmentally benign alternative to HCl or $HNO_3$, gave the best results with more than 70% recovery at both 1% v/v at 1 mL/min and 50% v/v at 5 mL/min (Table 5). Again, surface washing gave the lowest recovery with HCl and $CH_3COOH$, but was similar to 1 and 5 mL/min for $HNO_3$, recovering 60±2% of the Eu.

The acid-ligand dependent recoveries are consistent with the stability constants for Eu and Cu (Table 6). In general, Eu has a stronger affinity for $NO_3^-$ and $CH_3COO^-$ (log K values of 1.22 and 2.13, respectively), agreeing with the data, showing higher recovery for Eu with these two acids compared to HCl (log K value of −0.15). The Cu data also agree, showing high recovery with all three acids, but the highest recovery with HCl. Here, Cu(II) only has a log K value of 0.41, but Cu(I) has a value of 2.7. Discussed elsewhere herein is the evidence of the half-reduced form of Cu deposited on the surface, agreeing with the high recoveries seen with HCl, and the high affinity Cu (I) has for the chloride ion.

TABLE 6

Stability constants for acid ligands. Note these are the binding
constants for the formation of the 1:1 metal:ligand complex

| Stability Constants | | | |
|---|---|---|---|
| | $Cl^-$ | $NO_3^-$ | $CH_3COO^-$ |
| $Cu^+$ | 2.7 | | |
| $Cu^{2+}$ | 0.41 | 0.5 | 1.83 |
| $Eu^{3+}$ | −0.15 | 1.22 | 2.13 |
| $Fe^{3+}$ | 1.48 | 1.00 | 3.38 |

A few notable results from these acid flushing and surface washing experiments include: (1) The selectivity shown with HCl and Cu, compared to HCl and Eu. Here, this could be used for enhanced selectivity or purification of products when separating Cu and Eu, applying HCl to recover Cu, and $CH_3COOH$ to recover Eu. Note, this separation based on acid alone would not be perfect, but on CNT filters that already have predominantly separated product on them, this could further purify the final product by removing any residual unwanted metal. (2) The leaching of iron (used as catalyst for the production of CNTs and present at approximately 4 wt % in the filter material) from the CNT filters. Here, iron (Fe) leached out at every acid concentration, regardless of which acid was being used (FIG. 39A-D). Encouragingly, $CH_3COOH$ recovered the lowest amount of Fe at 10% acid and 5 mL/min, where we saw the high Eu recovery, suggesting $CH_3COOH$ would yield optimum recovery of Eu with minimal Fe contamination. Future design of the CNTs used for the filters should avoid the incorporation of Fe-metal in the starting materials.

Very generally speaking, $CH_3COOH$ minimized contamination of the leachate with filter-derived Fe. For example, for 10% v/v concentrations, over 2 mg of Fe were removed from the filters for both 1 and 5 mL/min with HCl and $HNO_3$, more than twice the amount of Fe obtained for the same conditions with $CH_3COOH$ (0.8±0.01 mg Fe in the case of the Cu filter experiments). Note that the same conditions can yield a wildly variable amount of Fe: for the Cu and Eu filters flushed with 10% $CH_3COOH$ at 1 mL/min, Fe recovery was 0.8±0.01 mg or 2.5±0.05 mg, respectively. This high degree of heterogeneity is not uncommon in fabrication of powdered CNTs (the starting materials used for the CNT polymer filter), where there is a heterogeneous distribution of metal catalyst within the powder itself. While this high degree of variability in background Fe limits confidence in the Fe extraction results, it is generally held that $Cl^-$ is a better ligand for Fe than $NO_3^-$ (Table 6). The use of $CH_3COOH$ to leach the target metals will come at a small sacrifice of Cu recovery (reduced from 99±2 to 83±2% as compared to HCl), but is optimal for Eu recovery (improved from 43±2 to 73±3% as compared to HCl). The choice of $CH_3COOH$ brings other advantages; HCl and $HNO_3$ slightly damaged the filters at 10% and severely damaged the filters at high acid concentrations (i.e., 50%) in the 1 mL/min and 5 mL/min cases, and completely destroyed the filters during surface washing at that concentration (FIG. 40A-B).

Figure 41A:
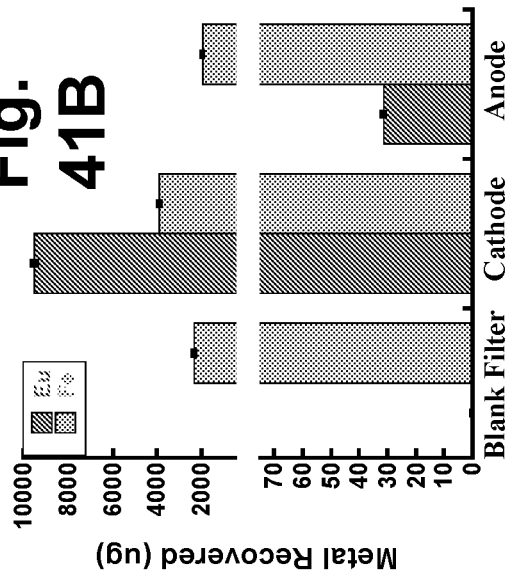
FIGS. 41A to 41C depict the metal recovery results from total filter combustion and subsequent ash digestion.
Figure 41B:
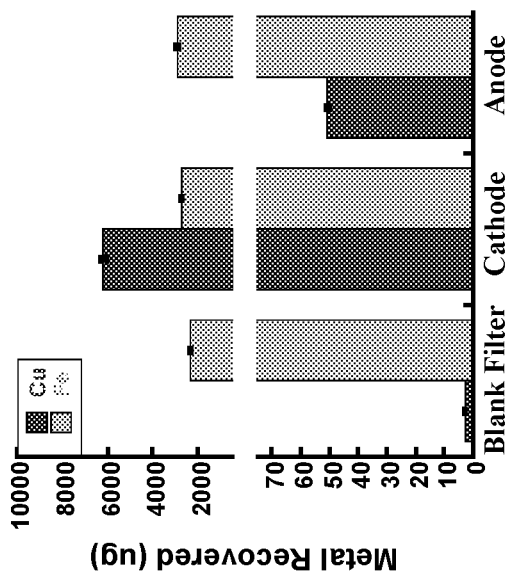
Figure 41C:
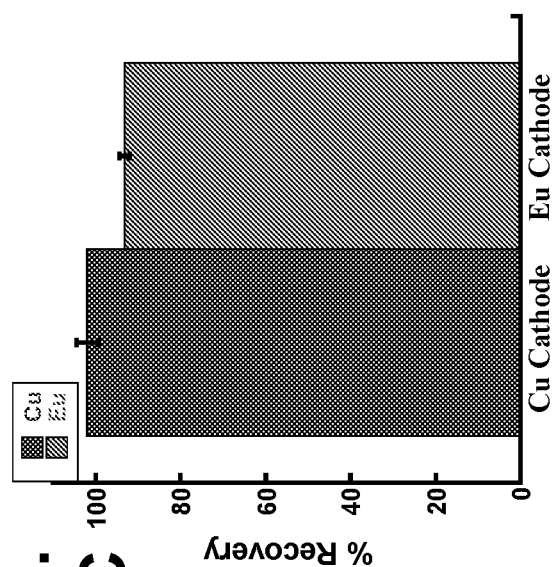

Total filter destruction, while presenting its own environmental impact concerns associated with emissions, was very effective for comprehensive metal recovery from the filter. Here, filters were oxidized to remove the polymer binder and destroy the CNTs, followed by acid refluxing of the remaining metal ash. Overall, 102±3% of Cu and 94±1% of Eu that was captured in each respective experiment was recovered. The anodes were also combusted and digested, indicating a small amount of each metal was being captured on that stage during capture, 32±0.8 ug of Eu and 51±0.8 ug of Cu (a very small amount compared to the cathodic metal, 9504±97 ug Eu and 6180±132 ug Cu; FIG. 41A-C).

To ensure the Fe observed in the acid flushing and surface washing experiments was not contamination from outside sources, the Fe in each filter was quantified along with a blank CNT filter for comparison. In these complete digestion experiments, different amounts of Fe in each filter and in the blank were observed, similar to the acid flushing data showing differing amounts of Fe recovery. These results indicate the filters are quite heterogeneous, making the leaching data difficult to interpret for Fe. Overall, the takeaway message here is that the filters may need to be purified before use- or made from catalyst-free CNTs- to avoid Fe leaching and contamination in recovery products. Clearly, any technology designed to selectively recover metals from complex waste streams should not systematically contaminant those target recovered materials. The filters were not designed with this consideration in mind because the deposited materials were intended to be mechanically recovered, which would not entrain the metal catalysts used to synthesize the CNTs, and complete digestions and acid flushing give idealized recoveries and alternative metal leaching strategies, respectively.

Figure 42:
FIG. 42 is a photograph showing a Eu cathode after attempt at mechanical removal. The filter ripped when scraped with the dull edge of razor blade, and no Eu could be recovered.

From an operational perspective, mechanical removal is an ideal removal method because it does not involve harsh acids or solvents, or demand high-energy requirements, and it renders the material in a readily-useful form for manufacturing (e.g., a solid that could be pressed into a target for e-beam sputtering or other solid-derived deposition technique). However, the chemical stability of the CNT-enabled filters does not currently lend itself to this recovery technique. Recall that, as observed in the acid leachate recovery experiments, the use of HCl and $HNO_3$ reduced the mechanical integrity of the filters, where the impacts from HCl were not as severe as $HNO_3$, but nevertheless substantial. The solutions that were charged onto these filters (i.e., the ones simulating the metal waste streams that might come from industry), were prepared from chloride salts, where no nitrate counter ions were present, and had pHs of 5-6. While these pHs are higher than those for the leachate solutions, there was still a substantial mechanical integrity loss in the filter after filtration, and this was particularly detrimental at the anode. Oxidation processes at the anode may destroy the CNT filter material, potentially releasing small polymeric components and liberating CNT fibers. Indeed, in experiments to determine if CNTs were released during the regular operation of the filters, it was found that 0.5 μg was released (Nosaka, T., Unpublished CNT release data. In Arizona State University: 2016). The end result of this loss of mechanical integrity is that attempts to remove metal from the filter via mechanical removal were unsuccessful due to the low mechanical strength of the filter (FIG. 42). Upon scraping the filter, the filter immediately started to rip and no metal could be reasonably reclaimed.

The recovery methods tested here all had high success at recovering the metals from the filters, except for mechanical removal. Unfortunately, the favored strategy of mechanical scraping proved to be ineffective due to the low mechanical integrity of the filters, yielding no significant metal recovery. The other solid-based technique, total filter combustion, worked very well, recovering 102±3% Cu and 94±1% Eu. Likewise, the solution-based methods worked well, recovery high amounts of both Cu and Eu. Encouragingly, these metals showed some selectivity toward the different acids, indicating suggesting the enhancement of separation capabilities. Finally, out of the three acids tested, acetic acid gave the best results for Eu without destroying the filters, suggesting reuse of the CNT filters could be possible with this recovery technique. The last notable takeaway message was that the Fe catalyst in the filters was contaminating the final product in every method.

Example 5: Design Optimization for Large-Scale Separations

The bench-scale optimization of system parameters discussed elsewhere herein (i.e., flow rate, pH, and voltage) to achieve high metal capture and separation, as well as the bench-scale optimization for metal recovery off the CNT filters, identified many key design modifications needed to enable the successful scale up of this technology.

Figure 43A:
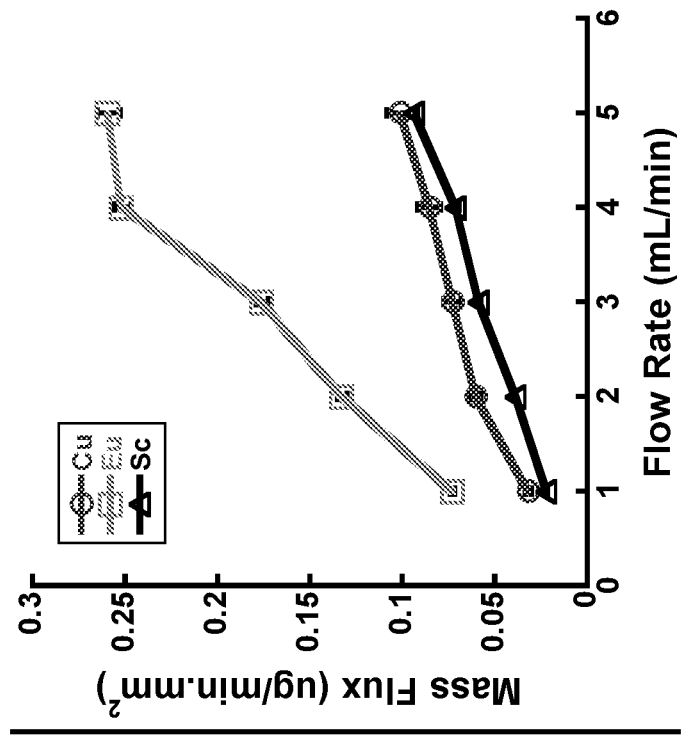
FIGS. 43A and 43B depict the molar and mass flux of the CNT filters as a function of flow rate.
Figure 43B:
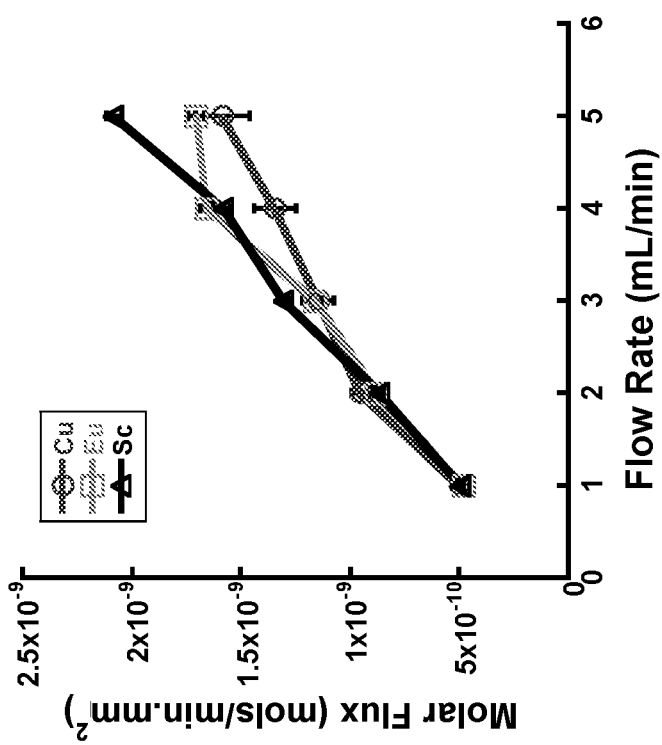

The bench-scale system currently uses 47-mm CNT filters for both the cathode and the anode. This scale limits the geometric filter surface area to 1735 $mm^2$. Previous results demonstrated that mass flux limitation per area were not yet exceeded (FIG. 43A-B), indicating that increasing the size of the CNT filter may further enhance metal capture.

Figure 44B:
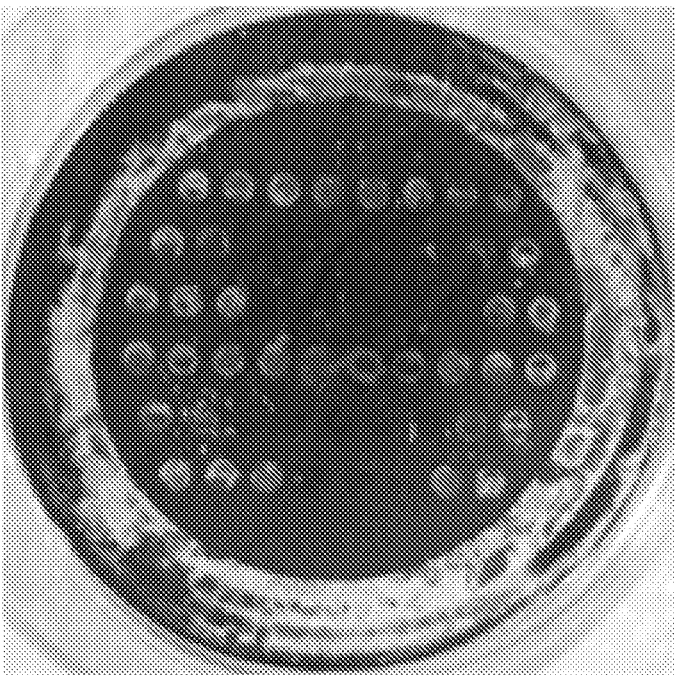
FIGS. 44A and 44B depict photographs of filters following various metal treatments.
Figure 44A:
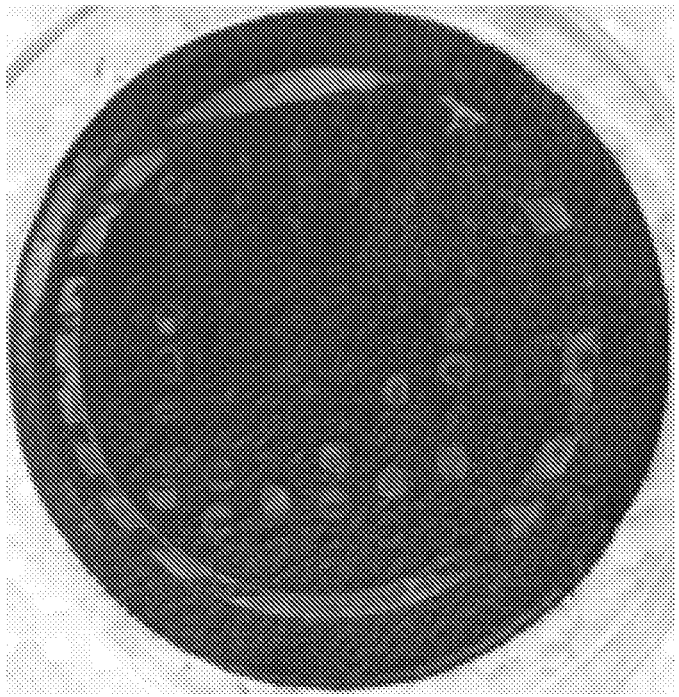

The second design modification to enhance metal capture via enhanced functional surface area is to replace the current Ti shim with a Ti or stainless steel mesh. Currently, the Ti shim has small punched holes in the fluid flows path, and this is where metal deposition occurs (FIG. 44A). The punch design is only further hindering our metal capture by decreasing the surface area of the CNT exposed to the fluid. Here, a Ti or stainless steel mesh still has enough contact with the conductive CNTs to distribute charge across the filter while increasing the surface area exposed to the fluid to enable higher capture.

Another design modification to enhance metal capture is to add a pressure release valve or $H_2$ separator. In exemplary operations discussed elsewhere herein, water splitting contributes to oxygen and hydrogen gas formation at the anode and cathode, respectively. This causes a decrease in recovery from the reduced surface area when the gas bubbles sit on the surface (FIG. 44B). Adding a pressure release valve allows the gas to escape, effectively increasing the surface area and therefore metal capture. Finally, when this added relief valve is outfitted with a $H_2$ separator membrane, a manufacturer could potentially utilize the $H_2$ as a fuel to offset the energy costs of the electrochemical filter operation or other institutional needs.

Some exemplary bench-scale systems are currently operational from 0 to 5 mL/min, due in part to the leaking that occurs from an increase in current and water splitting at the higher flow rates. This increase in water splitting contributes to enhanced gas evolution, which results in elevated backpressure in the system. Adding a pressure value to release the gas as it is evolving in the filter device allos for higher flows rates without the unwanted leaking associated with gas production in the system. This modification has a dual purpose and is critically important for successful scale up with aqueous treatment streams.

In exemplary acid flushing experiments, the mechanical integrity of the filters was inversely related to the concentration of the acid (FIG. 45). Replacing the current binder (Michelman Hydrosize® U6-01) with an acid-stable binder promotes recovery via the mechanical scraping method, which enables reuse of these filters in subsequent treatment runs (i.e., by enhancing the lifetime of the filter). Furthermore, if higher concentrations of metals are used in the filter influent, then a significant mass of solid is be recovered on the surface rather than on internal CNT fibers, enhancing the applicability of the mechanical recovery processes for direct material reuse.

The final design modification is a Fe purification or avoidance step. Results discussed herein showed high Fe removal from the filters during the acid flushing, surface washing, and total filter digest experiments, which effectively translates to contamination of purified waste streams. Acid-washing CNT powders to lower the bulk metal content prior to polymer coating can reduce Fe levels. Another option is to fabricate CNTs with a regular structure (i.e., vertical or horizontal alignment) from a substrate-affixed metal catalyst, which can then be easily delaminated or detached from the CNTs through chemical or mechanical cleaving. This modification does not decrease the overall metal capture and yields higher purity recovery products to enable direct reuse in industrial manufacturing.

Figure 46B:
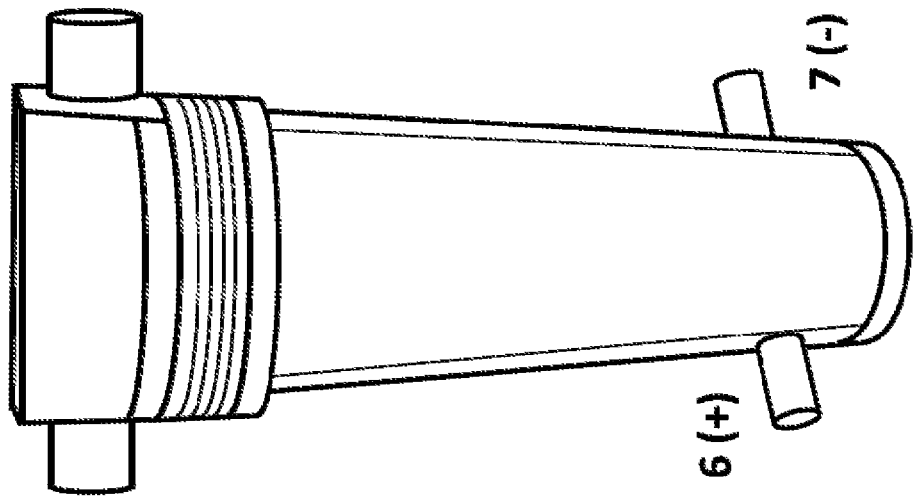
FIGS. 46A and 46B depict the design of an exemplary large-scale filtration system.
Figure 46A:
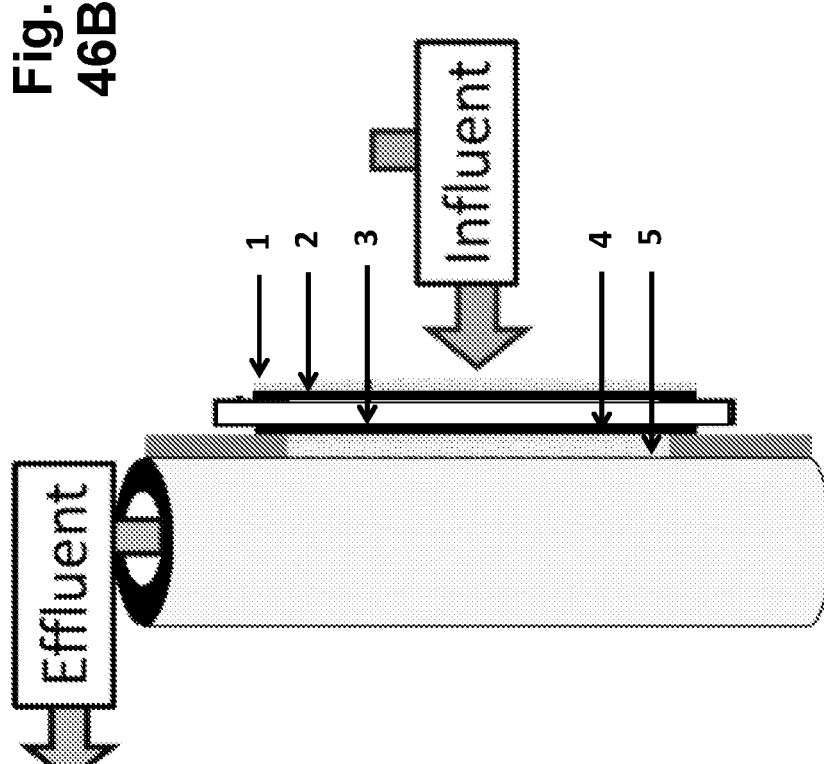

A spiral-wound membrane apparatus is constructed (FIG. 46A-B). Here, a commercial 30-cm height styrene acrylonitrile filtration casing (~3300 $cm^3$ of dead volume) and a polypropylene cartridge (pore size 0.45 microns, Shelco Filters) is modified for electrochemical deposition. The main components of the scaled-up electrochemical apparatus contain several layers of material wrapped around the center cartridge: (1) a stainless steel mesh, (2) CNT membrane cathode, (3) PVDF membrane acting as an insulating layer, (4) CNT membrane anode, (5) stainless steel mesh. Two holes are drilled at the bottom of the casing as openings for the (6) anodic electrode contact and the (7) cathodic electrode contact. Teflon and waterproof sealing paste are used to avoid leaking.

Benchmarks have been set for technology performance and economic viability (Table 7), which include % recovery and selectivity. At least 50% of the starting material in the synthetic waste stream is captured on the membrane. Selectivity is defined as the ability to separate metals from each other (i.e., the ability to separate the bulk and precious metals from each other, and to separate bulk and precious metals from RESE). Here, the selectivity threshold is ≥85% purity for each separated metal. Note: The Phase I objective is to separate bulk and precious metals from RESE, and collect RESE as a "mixed cake". This mixed cake of RESE has been determined to be valuable to manufacturers through personal communications with electronic companies.

TABLE 7

Factors determining technology performance and economic viability.

| Performance Variable | Factors influencing technology: Benchmark for technological and economic viability |
|---|---|
| % recovery | ≥50% for bulk, precious, and RESE metals |
| Selectivity | ≥85% for separated bulk, precious, and mixed RESE cake (i.e., bulk and precious metals will be separated individually, while RESE will be captured as a mixed cake) |

In the optimization of the process for scaled devices, a number of parameters are identified (Table 8):

TABLE 8

Experimental variables to be tested for recovery and separation of bulk, precious, and RESE metals from synthetic waste streams.

| Experimental variable | Anticipated range |
|---|---|
| Metal concentration | 100 ppb-100 ppm RESE, 100 ppb-1000 ppm bulk/precious metals |
| Applied voltage | 0.0-3.5 V |
| pH | 0-10 |
| Flow Rate | 1-20 L/hour |
| Metals | Nd, Fe, Al, Cu, Ag, Au, Pt, Co, Ni, Tb, Pr, Ga, As, Zn, Dy, Ce, Eu |

Flow Rate.

The influence of flow rate on metal recovery is determined. A flow rate where adequate recovery (i.e., 50% or greater) is achieved is identified by examining a range of flow rates from 1-20 L/hour. The maximum possible flow rate our filters can handle while maintaining high recovery rates and avoiding system pressure issues (e.g., leaking or filter breakage) is identified.

Voltage and pH.

A unique range of voltages and pH is identified for each metal (i.e., a voltage and pH that is sufficient to overcome the reduction potential of one or a few metals, but not all), to reach the selectivity benchmark of ≥85%. The recovery is measured for a variety of metals over a range of voltages from 0-3.5 V at 0.1-0.5 V intervals and pH from 0-10 at the optimized flow rate.

Concentration.

The mass limitation of the CNT membrane is quantified. Synthetic waste streams are passed across the flow rate range to calculate mass flux and molar flux. Using this method, the number of membranes needed for a particular waste stream is identified.

Procedures have been developed to enhance separation based on both difference in voltage (discussed elsewhere herein) and hydroxide stability. Differences in hydroxide stability can be exploited by manipulating the pH of the sample solution between filtration chambers. This method is outlined in FIG. 47A, with results in FIG. 47B FIG. 47C. The method is nearly identical to the one previously described with Cu and Eu, where different voltages were set for each of the two stages and where the bulk metals were captured on the first chamber and RESE on the second. Here, though, addition of a base to the sample solution between filtration chamber increased the recovery of RESE in the second filtration stage.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A method for the separation of metals from a sample, the method comprising:

passing a sample through a filtration apparatus comprising a plurality of filtration chambers, each having a CNT(−) filtering layer between an anode and cathode, each filtration chamber being housed in its own respective non-conductive casing, each casing having an inlet port and an outlet port, wherein the plurality of filtration chambers are arranged in series;

applying an electric potential between the anode and the cathode of each filtration chamber;

precipitating metal salts or free metals on at least one of the CNT(−) filtering layers; and isolating the precipitated metal salts or free metals from the at least one CNT(−) filtering layer.

2. The method of claim 1, further comprising the step of adding a chemical agent to the sample.

3. The method of claim 2, wherein the chemical agent is selected from the group consisting of an acid, a base, and a redox mediator.

4. The method of claim 1, wherein the step of applying an electric potential between the anode and the cathode of each filtration chamber comprises the steps of:

selecting an electric potential based on the metal to be captured in each filtration chamber; and applying a different electric potential to each filtration chamber in series.

5. The method of claim 1, wherein the step of isolating the metal salts or free metals from the at least one CNT(−) filtering layer comprises the step of passing an acid through the respective filtration chamber.

6. The method of claim 1, wherein the step of isolating the metal salts from the at least one CNT(−) filtering layer comprises the step of oxidizing the at least one CNT(−) filtering layer at a temperature greater than 400° C.

7. The method of claim 1, wherein the sample comprises a transition metal, a rare earth element, a specialty element, a metalloid, a lanthanide, or an actinide.

8. The method of claim 1, wherein the sample comprises waste from a manufacturing process.

\* \* \* \* \*